(12) United States Patent
Lewis et al.

(10) Patent No.: US 9,038,891 B2
(45) Date of Patent: *May 26, 2015

(54) BANKING MACHINE CONTROLLED RESPONSIVE TO DATA READ FROM DATA BEARING RECORDS

(71) Applicant: Diebold Self-Service Systems, division of Diebold, Incorporated, North Canton, OH (US)

(72) Inventors: David N. Lewis, Canal Fulton, OH (US); Jeffrey M. Enright, Akron, OH (US); Natarajan Ramachandran, Uniontown, OH (US); Mark A. Douglass, North Canton, OH (US); Tim Crews, Alliance, OH (US); Songtao Ma, Wadsworth, OH (US); Randall W. Jenkins, Orrville, OH (US); H. Thomas Graef, Bolivar, OH (US); Sathish M. Irudayam, North Canton, OH (US); Klaus Steinbach, Canton, OH (US)

(73) Assignee: Diebold Self-Service Systems Division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,273

(22) Filed: Apr. 8, 2014

(65) Prior Publication Data

US 2014/0217169 A1 Aug. 7, 2014

Related U.S. Application Data

(60) Continuation of application No. 13/862,614, filed on Apr. 15, 2013, now Pat. No. 8,690,052, which is a continuation of application No. 13/404,643, filed on Feb. 24, 2012, now Pat. No. 8,418,917, which is a (Continued)

(51) Int. Cl.
| | |
|---|---|
| G07F 19/00 | (2006.01) |
| G07D 11/00 | (2006.01) |
| G06Q 40/00 | (2012.01) |
| G06K 7/08 | (2006.01) |
| G06Q 20/32 | (2012.01) |

(52) U.S. Cl.
CPC ............ *G07F 19/201* (2013.01); *G06K 7/082* (2013.01); *G07F 19/20* (2013.01); *G07F 19/2055* (2013.01); *G06Q 20/3274* (2013.01); *G06K 7/084* (2013.01)

(58) Field of Classification Search
USPC .................................. 235/379, 486, 483, 475
See application file for complete search history.

(56) References Cited

U.S. PATENT DOCUMENTS

| | | | | |
|---|---|---|---|---|
| 4,609,957 | A * | 9/1986 | Gentet et al. ................... | 360/101 |
| 5,760,380 | A * | 6/1998 | May ............................... | 235/379 |
| 5,861,614 | A * | 1/1999 | Gardner ......................... | 235/379 |

(Continued)

*Primary Examiner* — Tuyen K Vo
(74) *Attorney, Agent, or Firm* — Black McCuskey Souers & Arbaugh, LPA

(57) ABSTRACT

A banking system operates responsive to data read from data bearing records. The system includes an automated banking machine comprising a card reader. The card reader includes a movable read head that can read card data along a magnetic stripe of a card that was inserted long-edge first. The card reader includes a card entry gate. The gate is opened for a card that is determined to be properly oriented for data reading. The card reader can encrypt card data, including account data. The card data is usable by the machine to authorize a user to carry out a financial transfer involving the account.

19 Claims, 36 Drawing Sheets

Related U.S. Application Data continuation-in-part of application No. 12/928,014, filed on Dec. 1, 2010, now Pat. No. 8,191,767, which is a continuation of application No. 12/075,332, filed on Mar. 11, 2008, now Pat. No. 8,146,802, which is a continuation-in-part of application No. 11/975,907, filed on Oct. 22, 2007, now Pat. No. 7,946,477, said application No. 13/404,643 is a continuation-in-part of application No. 13/396,026, filed on Feb. 14, 2012, now Pat. No. 8,978,971, which is a continuation-in-part of application No. 13/317,729, filed on Oct. 26, 2011, now Pat. No. 8,915,422, said application No. 13/396,026 is a continuation-in-part of application No. 13/134,654, filed on Jun. 13, 2011, now Pat. No. 8,573,479, which is a continuation-in-part of application No. 12/380,408, filed on Feb. 25, 2009, now Pat. No. 8,833,646, which is a continuation-in-part of application No. 12/008,348, filed on Jan. 10, 2008, now Pat. No. 8,146,801, said application No. 12/380,408 is a continuation-in-part of application No. 11/825,271, filed on Jul. 5, 2007, now Pat. No. 7,891,546, said application No. 12/380,408 is a division of application No. 11/638,975, filed on Dec. 14, 2006, now Pat. No. 8,870,063.

(60) Provisional application No. 61/446,744, filed on Feb. 25, 2011, provisional application No. 61/574,594, filed on Aug. 5, 2011, provisional application No. 61/628,513, filed on Nov. 1, 2011, provisional application No. 61/629,900, filed on Nov. 30, 2011, provisional application No. 60/918,453, filed on Mar. 16, 2007, provisional application No. 60/918,458, filed on Mar. 16, 2007, provisional application No. 61/463,313, filed on Feb. 15, 2011, provisional application No. 61/455,827, filed on Oct. 27, 2010, provisional application No. 61/354,778, filed on Jun. 15, 2010, provisional application No. 61/067,660, filed on Feb. 29, 2008, provisional application No. 60/994,742, filed on Sep. 20, 2007, provisional application No. 60/994,680, filed on Sep. 20, 2007, provisional application No. 60/879,991, filed on Jan. 11, 2007, provisional application No. 60/837,743, filed on Aug. 14, 2006, provisional application No. 60/837,742, filed on Aug. 14, 2006, provisional application No. 60/819,126, filed on Jul. 6, 2006, provisional application No. 60/819,127, filed on Jul. 6, 2006, provisional application No. 60/752,188, filed on Dec. 20, 2005.

(56) References Cited

U.S. PATENT DOCUMENTS

| | | | | |
|---|---|---|---|---|
| 6,491,216 | B1* | 12/2002 | May | 235/375 |
| 6,494,364 | B2* | 12/2002 | Shepherd | 235/379 |
| 2001/0025881 | A1* | 10/2001 | Shepherd | 235/379 |
| 2002/0030109 | A1* | 3/2002 | Farquhar | 235/475 |

* cited by examiner

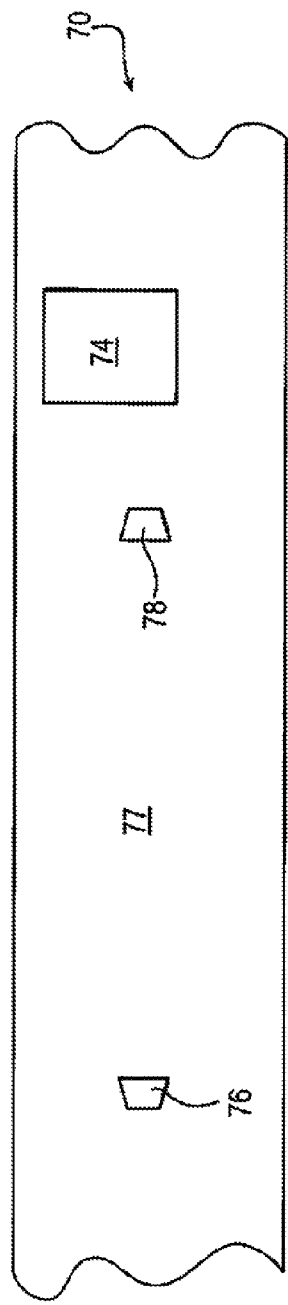
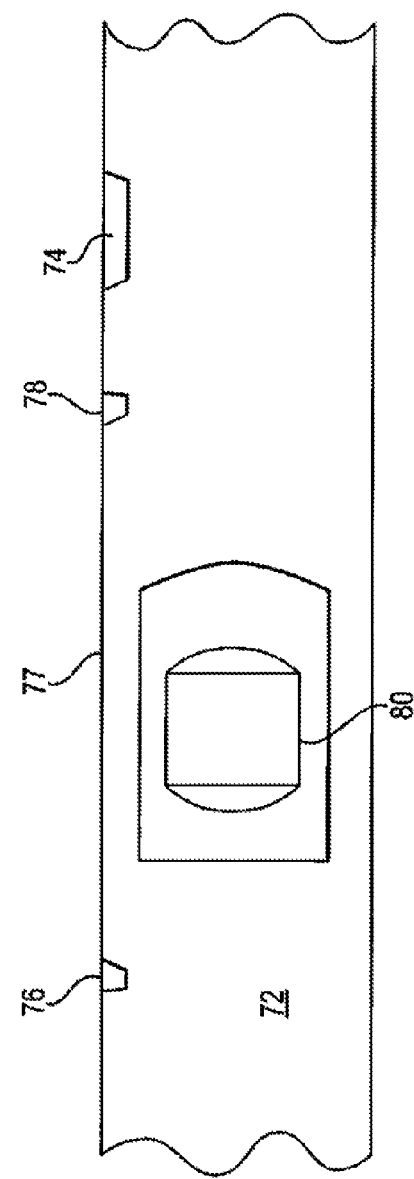

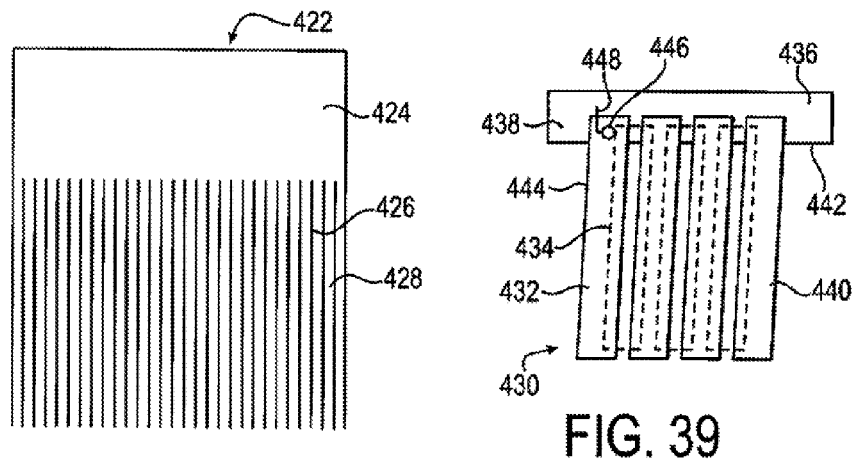
FIG. 38
FIG. 39
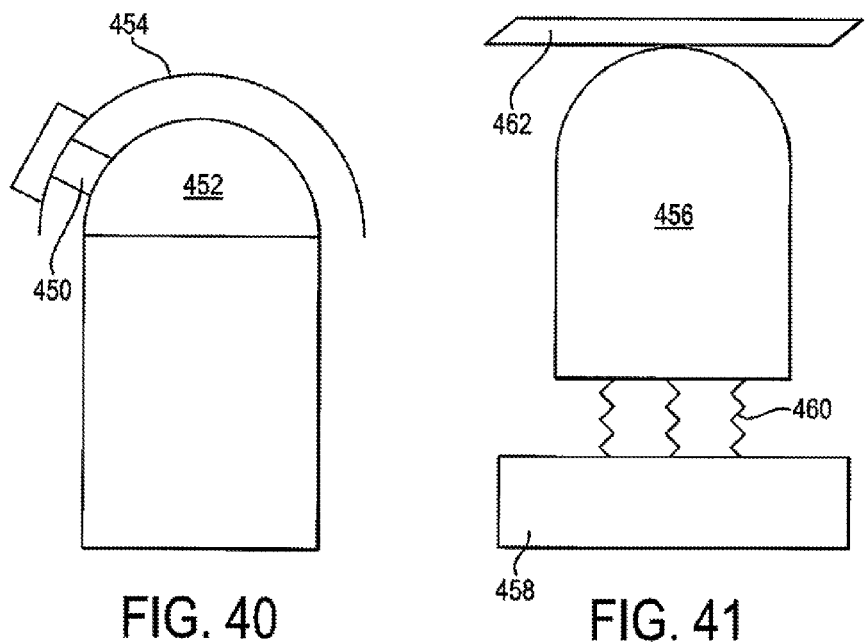
FIG. 40
FIG. 41

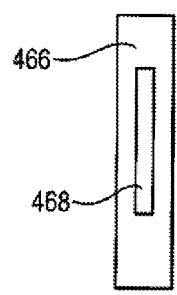
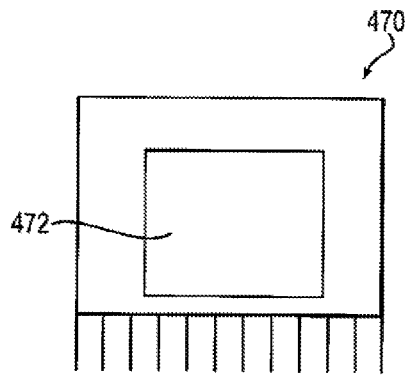
FIG. 42  FIG. 43
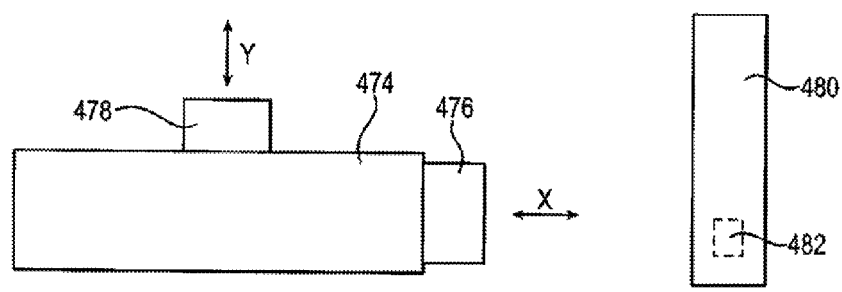
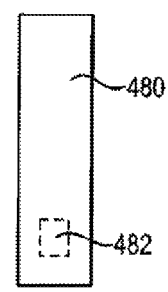
FIG. 44  FIG. 45

BANKING MACHINE CONTROLLED RESPONSIVE TO DATA READ FROM DATA BEARING RECORDS

CROSS REFERENCE TO RELATED APPLICATIONS

This application is a continuation of U.S. application Ser. No. 13/862,614 filed on Apr. 15, 2013, which is a continuation of U.S. application Ser. No. 13/404,643 filed Feb. 24, 2012, now U.S. Pat. No. 8,418,917. Application Ser. No. 13/404,643 claims the benefit of U.S. Provisional Applications 61/446,744 filed Feb. 25, 2011; 61/574,594 filed Aug. 5, 2011; 61/628,513 filed Nov. 1, 2011; and 61/629,900 filed Nov. 30, 2011.

Application Ser. No. 13/404,643 is also a continuation-in-part of U.S. application Ser. No. 12/928,014 filed Dec. 1, 2010, which is a continuation of U.S. application Ser. No. 12/075,332 filed Mar. 11, 2008, which is a continuation-in-part of U.S. application Ser. No. 11/975,907 filed Oct. 22, 2007, which claims the benefit of U.S. Provisional Applications 60/918,453, 60/918,455, and 60/918,458 each filed Mar. 16, 2007.

Application Ser. No. 13/404,643 is also a continuation-in-part of U.S. application Ser. No. 13/396,026 filed Feb. 14, 2012, which claims the benefit of U.S. Provisional Application 61/463,313 filed Feb. 15, 2011.

Application Ser. No. 13/396,026 is a continuation-in-part of U.S. application Ser. No. 13/317,729 filed Oct. 26, 2011, which claims the benefit of U.S. Provisional Application 61/455,827 filed Oct. 27, 2010.

Application Ser. No. 13/396,026 is a continuation-in-part of U.S. application Ser. No. 13/134,654 filed Jun. 13, 2011, which claims the benefit of Provisional Application 61/354,778 filed Jun. 15, 2010. Application Ser. No. 13/134,654 is a continuation-in-part of U.S. application Ser. No. 12/380,408 filed Feb. 25, 2009, which claims the benefit of Provisional Application 61/067,660 filed Feb. 29, 2008. Application Ser. No. 12/380,408 is a continuation-in-part of U.S. application Ser. No. 12/008,348 filed Jan. 10, 2008, which claims the benefit of U.S. Provisional Applications 60/994,742 filed Sep. 20, 2007; 60/994,680 filed Sep. 20, 2007; and 60/879,991 filed Jan. 11, 2007. Application Ser. No. 12/380,408 is a continuation-in-part of U.S. application Ser. No. 11/825,271 filed Jul. 5, 2007, which claims the benefit of Provisional Application 60/879,991 filed Jan. 11, 2007. Application Ser. No. 12/380,408 is a divisional application of U.S. application Ser. No. 11/638,975 filed Dec. 14, 2006, which claims the benefit of U.S. Provisional Applications 60/837,743 filed Aug. 14, 2006; 60/837,742 filed Aug. 14, 2006; 60/819,126 filed Jul. 6, 2006; 60/819,127 filed Jul. 6, 2006; and 60/752,188 filed Dec. 20, 2005.

The disclosures of each of the above mentioned applications are herein incorporated by reference in their entirety as if fully rewritten herein.

TECHNICAL FIELD

This invention relates to apparatus controlled responsive to data read from data bearing records to cause financial transfers, which is classifiable in U.S. class 235, subclass 379.

BACKGROUND OF INVENTION

Automated banking machines may include a card reader that operates to read data from a bearer record such as a user card. The automated banking machine may operate to cause the data read from the card to be compared with other computer stored data related to authorized bearers and/or financial accounts. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an automated teller machine (ATM) shall be deemed to include any machine that may be used to electronically carry out transactions involving transfers of value.

Automated banking machines may benefit from improvements.

OBJECTS OF EXEMPLARY EMBODIMENTS

It is an object of an exemplary arrangement to provide an automated banking machine.

It is a further object of an exemplary arrangement to provide an automated banking machine with an improved card data reader arrangement.

It is a further object of an exemplary arrangement to provide improvements to card readers used in automated banking machines.

It is a further object of an exemplary arrangement to enable card readers to be readily installed in existing automated banking machines to increase the machine's functionality.

It is a further object of an exemplary arrangement to provide an automated banking machine with a card data reader that requires less service.

It is a further object of an exemplary arrangement to provide an automated banking machine with a card data reader that requires less fascia space.

It is a further object of an exemplary arrangement to provide an automated banking machine that is capable of reading user card data in a contactless manner.

It is a further object of an exemplary arrangement to provide an automated banking machine with a contactless card data reader.

It is a further object of an exemplary arrangement to provide a method of reading bank card data with an automated banking machine.

It is a further object of an exemplary arrangement to provide a method for upgrading an existing machine to provide for improved card data reading.

Further objects of exemplary arrangements will be made apparent in the following Detailed Description of Exemplary Embodiments and the appended claims.

A popular brand of automated banking machine is manufactured by Diebold, Incorporated. Such automated banking machines are capable of receiving therein a banking card from a user of the machine. The card can have user information such as an account number encoded in a magnetic stripe on the card. A machine card reader is capable of reading the magnetic stripe. The information may correspond to a user's personal identification number (PIN). The user generally can enter the PIN through use of a machine keypad. The machine operates either by itself or in conjunction with one or more connected systems to determine whether the keypad-entered PIN corresponds to the card-entered data. Upon determination that the PIN and card data correspond, the user can be authorized to carry out one or more transactions with the machine. Such a transaction may include dispensing cash such as currency notes to the machine user.

Magnetic stripe cards can have the problem of wearing out. Magnetic stripe cards are also susceptible to being duplicated or reproduced by unauthorized persons. The contact head of a contact type card reader can be subject to excessive dirt accumulation or wear due to physical contact with cards. These conditions present the increased potential for fraud and/or requiring card reader maintenance which may place an automated banking machine out of service. The location and space required by a contact type card reader can also limit a machine from presenting additional banking features to a user.

The foregoing objects can be accomplished in an exemplary arrangement by providing an automated banking machine with a contactless card data reader. A contactless card reader may be installed in new automated banking machines or in existing machines without further substantial modifications to the machines. Security risks may be reduced. As service issues could be reduced without the wear due to card reader head/card contact, use of a contactless card reader enables enhanced machine reliability at a modest cost.

A Radio Frequency Identification (RFID) card and RFID card reader arrangement can be used instead of, or as an adjunct to, a conventional card and contact type card reader arrangement. A card data image and image reader arrangement can also be used.

BRIEF DESCRIPTION OF DRAWINGS

FIG. 6 shows a side view of an automated banking machine drive-thru arrangement.

FIG. 7 shows a top view of an automated banking machine drive-thru arrangement.

FIG. 38 shows an exemplary wiper comprising plural wiper arms.

FIG. 39 shows another a wiper arrangement which comprises rows of wiper arms supported by a common rack.

FIG. 40 shows a wiper that moves in a curved cleaning motion.

FIG. 41 shows spring loaded, movable read head assembly.

FIG. 42 shows a wiper having a plastic guide member.

FIG. 43 shows a wiper that includes a guide member and plural wiper arms.

FIG. 44 shows a wiper vibrator arrangement.

FIG. 45 shows a wiper arm that includes a test signal emitter.

DETAILED DESCRIPTION OF EXEMPLARY EMBODIMENTS

Figure 1:
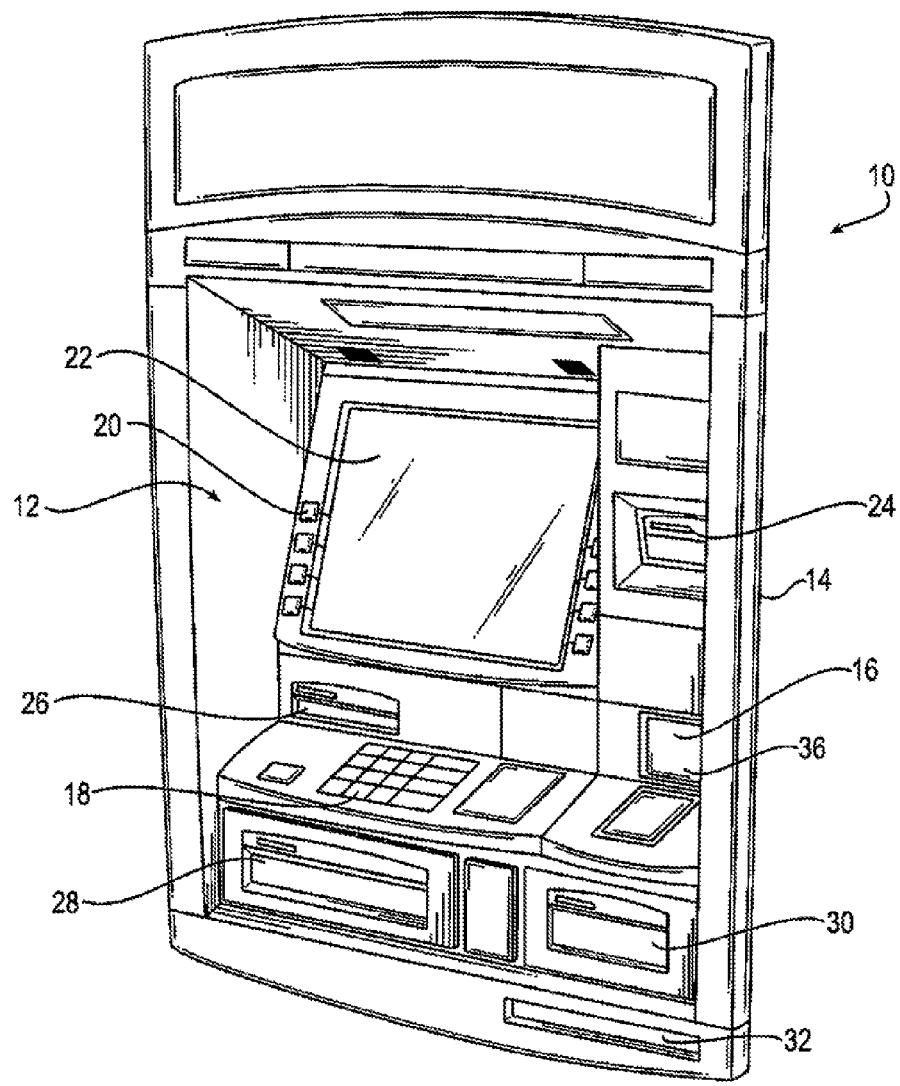
FIG. 1 is a side schematic view of an automated banking machine.

Referring now to the drawings and particularly to FIG. 1 there is shown therein an automated transaction machine (e.g., automated banking machine), generally indicated by numeral 10 used in connection with exemplary embodiments to carry out transactions. A banking system that is controlled at least in part by data bearing records includes the automated banking machine 10. The automated banking machine 10 can be a self-service machine, such as an automated teller machine (ATM). The automated banking machine can include one or more cash dispensers. A cash dispenser includes one or more mechanisms that operate to selectively dispense cash stored within the machine to users of the machine. The automated banking machine 10 includes a fascia 12 which serves as a user interface (or a customer interface). The automated banking machine 10 includes a housing 14 which houses certain components of the machine. The components of the machine can include input and output devices. The input devices may include a reader device schematically indicated 16. The reader device is operative to read data bearing records presented by machine users. Such records can include data corresponding to at least one of the associated user, one or more user financial accounts, and/or other data. In an exemplary arrangement the reader device 16 comprises a card reader that is operative to read data included on a customer's card. An exemplary card can include information about the customer thereon or therein, such as the customer's name, account number, and/or other data.

A card reader may comprise a magnetic stripe card reader which is able to read data from magnetic stripes of cards. However, in an exemplary embodiment the card reader is operative to read data from other types of cards or records, such as contactless cards. For example, the card reader 16 may comprise a contactless card reader. Such a card reader may be operative to read data on RFID cards. Of course, these approaches are exemplary.

The fascia can include a keypad 18, function keys 20, display 22, receipt outlet slot 24, mini account statement outlet 26, document (e.g., cash) withdrawal opening 28, document deposit opening 30, and a writing shelf 32. It should be understood that these transaction function devices and features of the described automated banking machine user interface are exemplary and in other embodiments the user interface may include different components and/or features and/or arrangements.

Figure 2:
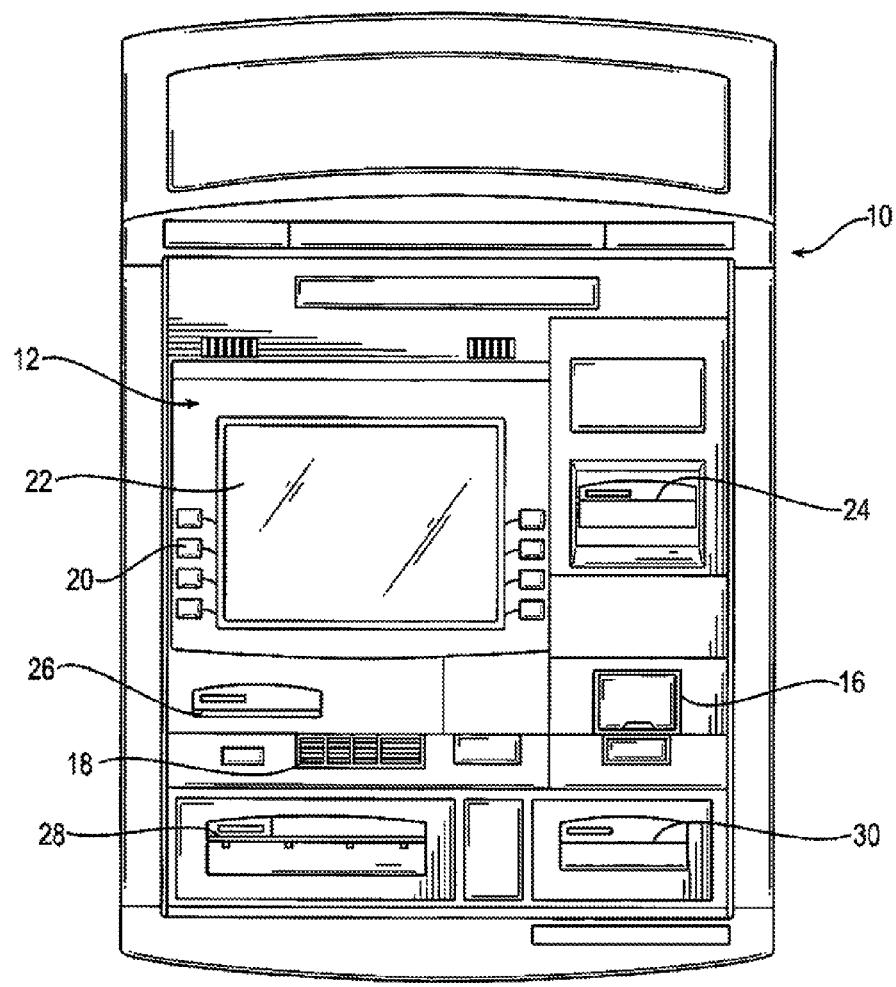
FIG. 2 shows a front view of the automated banking machine of FIG. 1.

FIG. 2 shows a front view of the automated banking machine 10 of FIG. 1. The keypad 18 can include a plurality of input keys which may be manually actuated by a customer to provide manual inputs to the machine. The function keys 20 can be used to permit a customer to respond to screen prompts.

The display 22 is viewable by an operator of the machine. The display enables outputs through a display screen. The display may also enable inputs through the display screen. Thus, the display can be a display type that enables both outputs and inputs. Therefore, the display can be both an input device and an output device. For example, the display 22 may be a touch screen display which enables outputs through displays on the screen and enables customers to provide inputs by placing a finger adjacent to areas of the screen. A combined input and output device, such as a touch screen display, can provide outputs to a user as well as receiving inputs from the user. The display 22 may include an LCD, plasma, CRT or other display type that is capable of providing visible indicia, such as still images or moving video, to a customer.

It should be understood that in various arrangements other types of input devices may be used, such as biometric readers that may be operative to receive customer identifying inputs such as fingerprints, iris scans, retina scans, and face topography data that provide data that is usable to identify a user. Combinations of devices (readers, sensors, detectors, etc.) can be used in identifying a machine user and/or authorizing a machine user to carry out a transaction (e.g., a cash dispense transaction). One or more camera devices may also be used to serve as input devices for biometric features and the like. Other input devices such as speech or voice recognition devices, facial recognition arrangements, inductance type readers, IR type readers, and other types of devices which are capable of receiving information that identifies (or can be used to identify) a customer and/or their account may also be used. An example of an automated banking machine that uses biometric input devices and other types of input devices is shown in U.S. Pat. No. 6,023,688, the disclosure of which is herein incorporated by reference in its entirety. Further output devices associated with the exemplary user interface can include a speaker. A headphone jack can also be used to serve as an output device. A headphone jack may be connected to a headphone provided by a user who is visually impaired to provide the user with voice guidance in the operation of the machine. Alternatively, the machine 10 may provide a headphone for a customer.

The automated banking machine 10 may also include a receipt printer which is operative to provide users of the machine with receipts reflecting transactions conducted at the machine. A printer device can be used that is operative to print receipts. Transaction receipts may be provided to users through a receipt delivery slot extending through a fascia portion. Exemplary receipt printers that may be used in some embodiments are shown in U.S. Pat. No. 5,729,379 and U.S. Pat. No. 5,850,075, the disclosures of which are herein incorporated by reference in their entirety.

Exemplary embodiments may also include other types of printing mechanisms such as statement printer mechanisms, ticket printing mechanisms, check printing mechanisms, and other devices that operate to apply indicia to media in the course of performing transactions carried out with the machine.

In other embodiments, output devices may include devices such as audio speakers, IR transmitters, or other types of devices that are capable of providing outputs which may be perceived by a user either directly or through use of a computing device, article, or machine. Exemplary automated banking machine features and systems which may be used in various embodiments are further shown in U.S. Pat. Nos. 6,705,517; 6,682,068; 6,672,505; 6,598,023; 7,156,295; 7,306,142; 7,314,163; 7,316,349; 7,322,481; 7,322,517; 7,333,954; and 7,337,955, the disclosures of each of which are incorporated herein by reference in their entirety. The machine 10 can also include a deposit acceptance area. The deposit acceptance area is an area through which deposits or deposit documents, such as deposit envelopes, to be deposited by users can be placed into the machine. The deposit acceptance area can include the document deposit opening 30. The deposit opening 30 is in operative connection with a deposit accepting device positioned in a secure chest area of the machine. Exemplary types of deposit accepting devices are shown in U.S. Pat. No. 4,884,769 and U.S. Pat. No. 4,597,330, the disclosures of which are herein incorporated by reference.

It should be understood that these input and output devices of the user interface are exemplary and in other embodiments, other or different input and output devices may be used. The automated banking machine 10 can include one or more internal computers, which may be alternatively referred to herein as controllers. These internal computers can include one or more processors. These processors may be in operative connection with one or more data stores. In some embodiments, processors can be located on certain devices within the automated banking machine so as to individually control the operation thereof. Examples such as multi-tiered processor systems are shown in U.S. Pat. No. 6,264,101 and U.S. Pat. No. 6,131,809, the disclosures of which are herein incorporated by reference.

In an exemplary arrangement to conduct transactions, the machine 10 can communicate with one or more computers remotely located from the machine. These remote computers are operative to exchange messages with the machine. For example, the remote computers may be used to authorize and record the occurrence of various transactions.

The machine 10 may communicate through a network with a transaction host, such as a bank or financial transaction entity. The host has at least one computer which is operative to exchange messages with the machine. For example, a bank may receive one or more messages from the machine requesting authorization to allow a customer to withdraw $200 from the customer's account. A computer at the bank can operate to determine that such a withdrawal is authorized. The computer, or another computer affiliated therewith, can then return one or more messages to the machine through the network authorizing the machine to allow the withdrawal transaction.

In an exemplary embodiment, at least one processor in the machine 10 is operative to cause the communication of data corresponding to data read from a user's card. The read card data can be sent from the machine to a remote (bank) computer as part of one or more messages. The machine may also communicate other data corresponding to user inputs to the remote computer, such as a personal identification number (PIN), a primary account number (PAN), and/or transaction request data. The remote computer can operate to compare the data corresponding to card data and/or PIN data to stored data, which corresponds to authorized users, in at least one data store associated with the remote computer. Responsive to the data corresponding to an authorized user and a permissible transaction request, the remote computer can communicate at least one message to the machine which corresponds to authorization to carry out the requested transaction.

After the machine 10 conducts the functions to accomplish a transaction, such as dispensing cash, the machine can send one or more messages back through the network to the bank indicating that the transaction was successfully carried out. Of course, these message types are merely exemplary and other transaction messages may be used.

It should be understood that in some embodiments the machine 10 may communicate with other entities and through various networks. For example, in an exemplary embodiment the machine can communicate with computers operated by machine service providers. Such service providers may comprise entities which are to be notified of status conditions or malfunctions of the machine, as well as entities who are to be notified of corrective actions. A service provider may be able to service a malfunctioning machine. An example of such a system for accomplishing this is shown in U.S. Pat. No. 5,984,178, the disclosure of which is herein incorporated by reference.

Other third parties may also receive notifications from the machine 10. These other parties may include entities responsible for delivering currency to the machine to ensure that the currency supplies in the machine do not become depleted. Further entities may be responsible for removing deposited items from the machine.

Additional entities may be notified of actions at the machine. These additional entities may include entities which hold marketing data concerning consumers and who provide messages which correspond to marketing messages (e.g., advertisements) to be presented to consumers. These additional entities may also be able to communicate with the machine 10 to provide marketing messages to machine users.

Various types of messages may be provided to remote systems and entities by the machine depending on the capabilities of the machines in various embodiments and the types of transactions being conducted. Furthermore, machine communication with the various entities can be separate and independent of any machine communication with the transaction host. That is, communication may occur (directly) between the machine and a third party without involving the transaction host. Thus, the machine 10 can keep non-financial transaction communication separated from financial transaction communication. The two (or more) open communication paths can also be operated independently simultaneously, with no path contingent on another. In an exemplary embodiment discussed in more detail herein, an automated banking machine may use contactless reading devices or arrangements or techniques to obtain information from or about a customer. A non-contacting card reading device can be used. Unlike conventional contact type card reading which involves physical contact, the exemplary embodiments permit card reading to occur without requiring physical contact between the card reading device and the card.

For example, a customer bank card may include an indicator member or device such as a non-contact transponder to communicate with the automated banking machine. Radio frequency (e.g., radio waves) can be one manner in which to communicate in a non-contact relationship, e.g., communication not based on physical contact. Radio frequency (RF) type readers and/or RF transmitters can be used. Other types of remote communication may also be used.

A customer bank card can have one or more radio frequency identification (RFID) tags (or devices or indicator members). RFID tags may also be referred to as "smart labels." The tags can contain data indicative or reflective of customer information. RFID tags may operate on the RF backscatter principle. Data communication can occur between an RFID tag and a card reader 16 of an automated banking machine. An RFID reader can be arranged to interrogate the RFID tag to obtain information therefrom. RFID readers may also be referred to as "interrogators." In exemplary embodiments, an RFID tag may be of a type that does not need a power source (e.g., battery), but operates based on RF energy provided by a reader. A tag may also have an internal antenna embedded in an RFID chip. An RFID reader can be equipped with the power necessary to activate the chip and receive the stored information therefrom. The RFID tags and readers discussed herein may have RFID Industry Standards developed by ANSI (American National Standards Institute) or the International Standards Organization (ISO) or other standard developing organizations. For purposes of this disclosure, an RFID tag will be considered to include any device which provides data output via RF signals, whether separate from or integral with another article, such as for example, a card.

A customer bank card in an exemplary embodiment may include information in noncontact RFID tags instead of or in addition to information in magnetic stripes and/or information in a programmable memory of a smart card. That is, magnetic stripe (or magnetic strip) cards and smart cards may further include customer RFID tags. One or more tags may be removably attached or mounted to a card (e.g., thereon or therein). Alternatively, tags may be permanently affixed to a card, such as embedded in a (plastic) portion of a card.

In an exemplary embodiment, an RFID tag is operative to store information therein representative of or corresponding to a customer, such as the customer's account number, PIN, name, primary bank, affiliated banks, and/or preferences. In an exemplary embodiment, tags can contain much more customer-related data than can be represented by a magnetic stripe (or magnetic strip) type of arrangement. For example, tags may also contain information reflective of additional security features, customer profile data, card age, display preferences, etc. A tag may also carry a unique customer identification number of 32 bits or longer. In the exemplary embodiment tags enable a card to store more information in a smaller space in comparison to prior art magnetic stripe cards.

RFID tags do not require physical contact (e.g., mechanical or electrical contact) with a card reader component. In an exemplary embodiment a customer can pass or wave their card adjacent to or over a card scanning area 36 associated with the card reader device 16 to have the card data (and user information) remotely read. The scanning area 36 can comprise a surface area of the automated banking machine fascia. A card reader and an RFID card can be remotely (and wirelessly) separated during reading of the card. The contactless arrangement can prevent damage or deterioration (such as dirt accumulation, wear and tear) to a card reader, and may further reduce machine down time associated with maintenance and service. In an exemplary embodiment RFID cards are more difficult to counterfeit in comparison to prior art magnetic stripe cards.

In exemplary embodiments, RFID tags can have read-only or rewritable memory for storage of customer information. RFID tags can have a memory which can be changed or modified by authorized personnel or devices. The tag memory may be programmable. For example, an employee or machine associated with a bank may have a device operative to communicate with an RFID tag to change and/or insert data contained therein. A hand-held RFID tag communication device can be used. An automated banking machine can incorporate a device for changing RFID data. For example, communication between an automated banking machine and a machine user's RFID card may occur, such as during an automated banking machine transaction (e.g., cash withdrawal transaction).

Alternatively, a tag may have unchangeable data. In such alternative situations, a combination of plural read-only tags may need to be assigned or attached to a particular card to fully represent its information content. A card may also have a combination of read-only and programmable tags.

An RFID reader device of an exemplary automated banking machine can be equipped to remotely read a user card. The reader is operative to read card data while the card is not in physical contact relationship with the machine. Thus, a card can be spaced from the card reader device during card reading. For example, a card reader device can be arranged to read RFID card data as a customer passes their card adjacent to a card scanning area associated with the card reader device. It follows that communication between a bank card and an automated banking machine card reader can occur without physical contact, which would occur with the use of conventional contact type (e.g., magnetic stripe) card readers.

Because the physical aspects of a through-the-fascia portion of a contact type card reader interface can be avoided, the service and/or reliability issues for an RFID card reader compared to other contact type readers can be reduced and/or eliminated. Also, the wear of components (e.g., contact read head, mechanical card transports, and card sensors) associated with conventional contact type card readers can be eliminated. Furthermore, wear to a user's card can also be reduced.

In an exemplary embodiment, when a card having an RFID tag is within range of an automated banking machine card reader, the reader device circuitry of the card reader can interrogate the tag to receive information corresponding to the particular card/user. The reader circuitry may comprise a circuit card assembly. The information exchanged between a card RFID tag and a card reader may be encrypted to provide additional security. Thus, a card reader, RFID data from the card, and/or an associated device may comprise a decoder in decoding circuitry.

The use of RFID reader technology permits an automated banking machine to have a card reader located at a previously unacceptable position. The physical space of an RFID card reader and any RFID card reader interface (e.g., card scanning area) can be located at an area of the fascia different from the area previously required for a contact type card reader. Also, in some embodiments all or a portion of the RFID card reader device can be remotely mounted adjacent to the automated banking machine. That is, an RFID card reader device need not be mounted on the fascia or the machine, but may be disposed from the machine. An RFID card reader device can be positioned so as to free up fascia space for additional transaction devices, thus increasing a machine's functionality. The freed up space allows other devices to be added to the valuable customer access area. For example, the additional fascia space may be used for installation of a cash acceptor, a stamp dispenser, check acceptor and/or an event ticket printer. Alternatively, in some embodiments the ability to eliminate the conventional card reader on the fascia can be used to produce more compact machines and/or user interfaces.

Figure 3:
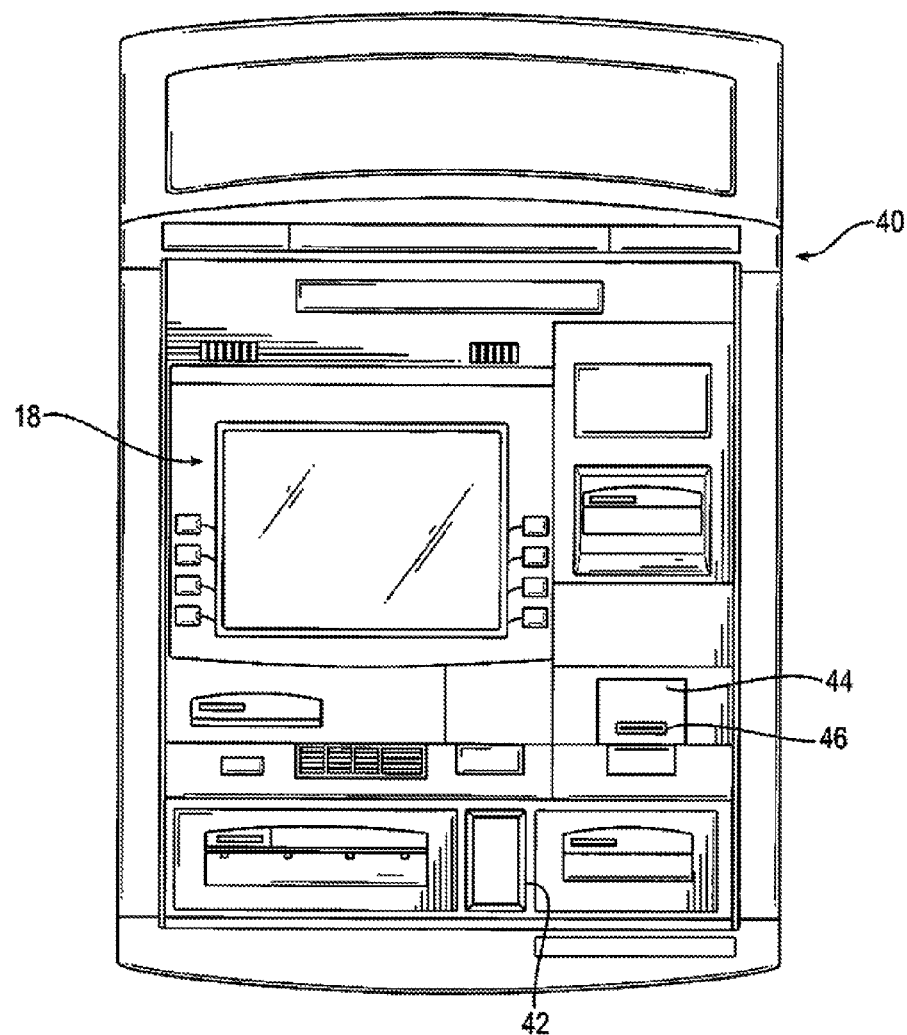
FIG. 3 shows an alternative fascia of an automated banking machine.

FIG. 3 shows an automated banking machine 40 similar to the automated banking machine of FIG. 1. However, the machine fascia 48 is shown with an RFID card reader 42, stamp dispenser 44, and a stamp dispenser outlet 46. In comparing FIGS. 2 and 3, the fascia area previously assigned to a card reader (FIG. 2) is now allocated to a stamp dispenser (FIG. 3). The card reader location was allocated to a lower part of the fascia (FIG. 3). The ability to use an RFID card reader permits an additional transaction device (e.g., stamp dispenser) to be used at a valuable fascia location instead of a contact type card reader. That is, the space previously needed for a contact type card reader can now be used by an additional transaction device, such as a stamp dispenser. Likewise, the ability to relocate an existing RFID card reader can also permit use (or relocation) of additional transaction devices. Thus, the use of a non-contact transaction device(s) (e.g., RFID card reader) enables a wide assortment of transaction device arrangements to be implemented with regard to user interface ergonomics.

Figure 4:
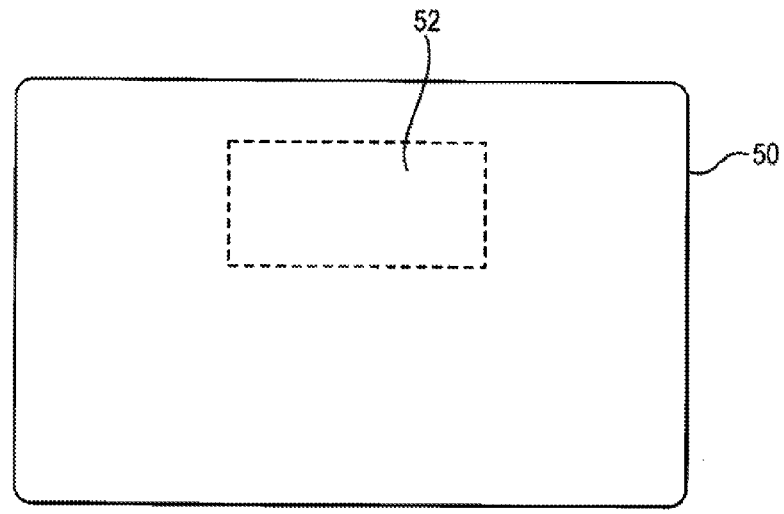
FIG. 4 shows a card including an RFID tag.
Figure 5:
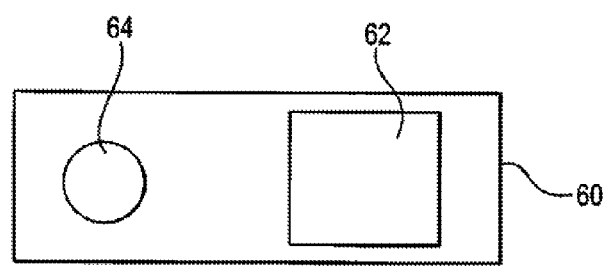
FIG. 5 shows an alternative RFID card.

FIG. 4 shows a card 50 having an RFID tag 52 embedded therein. The RFID card 50 may also contain conventional card markings and indicia (e.g., raised numbers/letters) thereon. The card may be similar to a conventional automated banking machine banking card or other debit or credit card, except having an RFID tag instead of or in addition to a magnetic stripe. FIG. 5 shows an RFID card 60 having an RFID tag 62 thereon and a key hole 64. In an exemplary embodiment, a user card only needs to be of a size large enough to hold an RFID data tag (or tags). In comparison to conventional automated banking machine cards, the size of an RFID machine card can be reduced. For example, an RFID card (as shown in FIG. 5) may be of a size enabling its attachment to a key chain.

A card may have more than one RFID tag. The tags may be of different sizes and include different information. A card may have one or more tags embedded therein and/or one or more tags thereon.

The exemplary RFD cards 50, 60 are usable with the automated banking machines 10, 40 having the RFID card reader devices 16, 42. In such use there may be no need for a customer to insert their RFID card into an automated banking machine. Nor does the machine need a card entry slot. Because the user card is not inserted into the machine, the card cannot be "lost" in a fascia opening (e.g., card entry slot) or the machine. User stress related to fear that their card will not be returned by the machine can be eliminated. Potential users previously reluctant to use an automated banking machine because of such fear can now use such a machine without the worry of their card being lost in or captured by the machine. Thus, an automated banking machine using an RFID card/card reader arrangement can be more user friendly. Because an automated banking machine card can remain with the user at all times, the arrangement can also reduce or eliminate fraudulent schemes to trap a card or skim card data. Thus, an automated banking machine using an RFID card/card reader arrangement can also provide enhanced security.

The use of an RFID tag arrangement can permit quicker automated banking machine response time. For example, an automated banking machine can automatically read the tag information, process the information, and prompt the user by name to enter a PIN number. The time previously necessary for the user to correctly insert their card into the machine and have the card transported to/from the (contact type) card reader can be eliminated. The use of an RFID tag and RFID tag reader arrangement can reduce the average time a user spends at an automated banking machine. Thus, an automated banking machine equipped to read an RFID data tag can increase usage efficiency of the machine.

In other exemplary arrangements an automated banking machine card (banking card) can have an RFID tag with a programmable memory. The tag memory is able to store data corresponding to one or more recent account transactions. The automated banking machines have a writer device for updating the card's tag memory with the latest transaction data (e.g., bank name, cash withdrawal amount, and date). The writer may be part of a combined RFID tag reader/writer device. The transaction data can act as a transaction receipt or a series of receipts.

The card owner may have a (personal) computer that can wirelessly read the RFID tag to obtain the transaction data from the card memory. The computer can have the transaction data automatically downloaded into a home financial computer program, such as Quicken™. The financial program can apply the transaction data to update the user's account. The machine writer device can supplement or overwrite the data stored in tag memory. If necessary, the card owner can erase the tag memory after reading the data through operation of their home computer.

In other arrangements which are described in more detail hereinafter, the transaction data in the RFID tag can be automatically read from a distance. For example, a card memory may be read without its removal from its stored location (e.g., a user's wallet or purse). A user may have a smart house in which the RFID memory data can be read by a tag reader and automatically delivered to the user's PC for input to a financial computer program. The structure of a smart house may enable the card memory data to be read upon the owner (with the card) entering the house, and then load the transaction data into the financial program. In alternative embodiments this can be done with a reader attached to the PC and the user bringing the card adjacent the reader at an appropriate time during operation of the financial program.

An automated banking machine RFID data tag may also be inserted onto (or combined with) a typically non-automated banking machine card (e.g., merchant charge card, ID card, drivers license, library card, etc.). The hiding of automated banking machine information in a typically non-machine card can increase the level of user information security.

Other arrangements can have an automated banking machine RFID data tag on a multiuse card having plural distinct RFID tags. For example, the same card may have several RFID tags, each only usable for a specific purpose. One tag can be an automated banking machine tag which is readable by a machine, whereas another tag is a fuel purchase tag readable by a fuel pump, whereas a further tag is a credit card tag. Also, a multi-use card may have a generic RFID data tag which is readable by a plurality of RFID reading devices. The generic RFID data tag can include information which can be used in conjunction with data provided by or stored in one or more other tags on the multi-use card.

In certain exemplary RFID card reader arrangements an RFID card can be remotely read without the need to wave or place the card adjacent to or in close proximity of a machine card reader. For example, an RFID card reader can have an increased (e.g., in power) reading range capable of reading an RFID card while the card is still in a wallet/purse.

In alternative arrangements the automated banking machine RFID data tag need not be on/in a card, but may be associated with a non-card item. For example, an RFID tag may be associated with a wallet or purse. The tag could be embedded in the wallet. Other items such as eye glasses, keys, and clothing may also be used to hold (or hide) an RFID tag. The tag may be positioned at any location associated with a customer that enables its reading thereof by an RFID tag reader associated with an automated banking machine.

A vehicle (e.g., an automobile) may also be equipped with an automated banking machine RFID data tag. The RFID tag may be positioned on the auto at any location enabling its reading by an appropriately placed RFID reading device of the machine. For example, an RFID reading device may be situated to read a tag positioned on a window, mirror (e.g., rear view mirror), or license plate of an auto. The machine can automatically read the tag information as the auto is approaching the user fascia, process the information, and prompt the user by name to enter a PIN number. That is, the speed of one or more computers associated with an automated banking machine may be able to present a welcome display screen to a particular named customer prior to (or simultaneously with) that customer actually arriving (or stopping or parking) at the machine. The use of a RFID data tag on an auto can enhance speed and efficiency of drive-thru automated banking machine banking.

FIG. 6 shows a side view of an exemplary automated banking machine drive-thru arrangement 70. An automated banking machine 74, RFID reading devices 76, 78, and a wall 77 are also shown. FIG. 7 shows a top view of the arrangement of FIG. 6 with the addition of a vehicle 80 in a drive-thru lane 72. The vehicle 80 is approaching the machine 74. The reading devices 76, 78 are operative to respectively read an RFID tag located in a front or rear view of the vehicle. The reading device 76 is positioned to read a tag from the rear of the vehicle, whereas the reading device 78 is positioned to read a tag from the front of the vehicle. The reading devices are in connection (e.g., wire or wireless connection) with the automated banking machine to provide information thereto.

In other exemplary embodiments, an automated banking machine is able to recognize and prioritize a plurality of customers in a queue via (automatic) reading of their machine RFID tags. The automated banking machine can create a temporary memory list of users currently awaiting access to the machine. The memory can be stored in a first in first out (FIFO) method. The RFID reader of the machine can be equipped to automatically read all machine RFID tags within a predetermined distance of the reader/machine. For example, the reader may be arranged to obtain (and provide to an machine processor) information on all users in a queue within ten (or twenty) feet of the machine.

This information can be used to determine personalized presentations to be made to the particular user once they reach the automated banking machine. This may be done in a manner like that shown in U.S. Pat. No. 7,039,600, the disclosure of which is incorporated herein. Alternatively or in addition, the reader may be arranged to obtain information on a predetermined number of users. For example, machine memory may only concurrently hold information on three users. An automated banking machine may also periodically scan for potential users to update the user queue memory. A machine can be programmed to provide a special display message (e.g., apology, discount information) or dispense a coupon to a user who has waited a predetermined amount of time. Other items or services, either through machine display or through machine dispensing, may also be provided to customers that had a lengthy wait. Such other items or services may further include credits, rebates, tickets, refinance discount, free car wash, currency, special offer, or other form of benefit.

An automated banking machine may also have a user option of canceling a (wrong named) user who has left the queue subsequent to the latest queue update. That is, if the welcome display screen (which can refer to a particular user name) presented to a user corresponds to the wrong user (e.g., a user who has left the queue without detection by the machine), then the user who currently has access to machine can notify the machine of the situation. For example, the display screen may have an initial user message welcoming a specific user along with a smaller message such as "If you are not the named user then please press the exit button." If the exit button is activated, then the automated banking machine is able to quickly change the welcome screen to the user next listed in the queue memory. In some embodiments the queue data may be rechecked by the machine scanning for signals of cards in proximity to the machine. Thus, if the RFID signal associated with a particular user is no longer sensed, that user may be eliminated from the queue in machine memory. One or more machine computers in operative connection with one or more RFID tag readers can maintain the queue data in real time.

The ability of an automated banking machine to recognize and prioritize a plurality of customers can permit a facility to offer additional customer amenities. A prioritizing automated banking machine can be equipped with speakers and a speech program to enable the machine to announce the name of the next customer granted access to the machine. Of course other features may be used to anonymously identify the next customer. For example, a customer may have the option of selecting a personalized announcement number uniquely corresponding to their card.

A customer waiting area may be provided with seats (e.g., chairs) or tables enabling customers to sit and relax (or perform work) while they temporarily wait. The waiting area may also have a wall mounted display screen that is viewable to the entire waiting area. The automated banking machine can display the name and/or picture of the next customer on the screen. Other methods of notifying the next machine user can also be used. For example, the machine (or the machine's network host) may notify the user via a page or phone call to a cell phone. In other arrangements the waiting area may have computers providing (free) access to the Internet. The automated banking machine can proclaim the next user via the provided Internet computers. In still other arrangements the machine can notify the next user via their hand-held personal device (e.g., PDA, laptop computer, etc.). Alternative manners of prioritizing machine usage may take into consideration other factors about the customer. For example, a machine (or host computer) affiliated with a casino may identify a customer as special (e.g., a "high roller") and grant priority access thereto over other casino customers.

Figure 8:
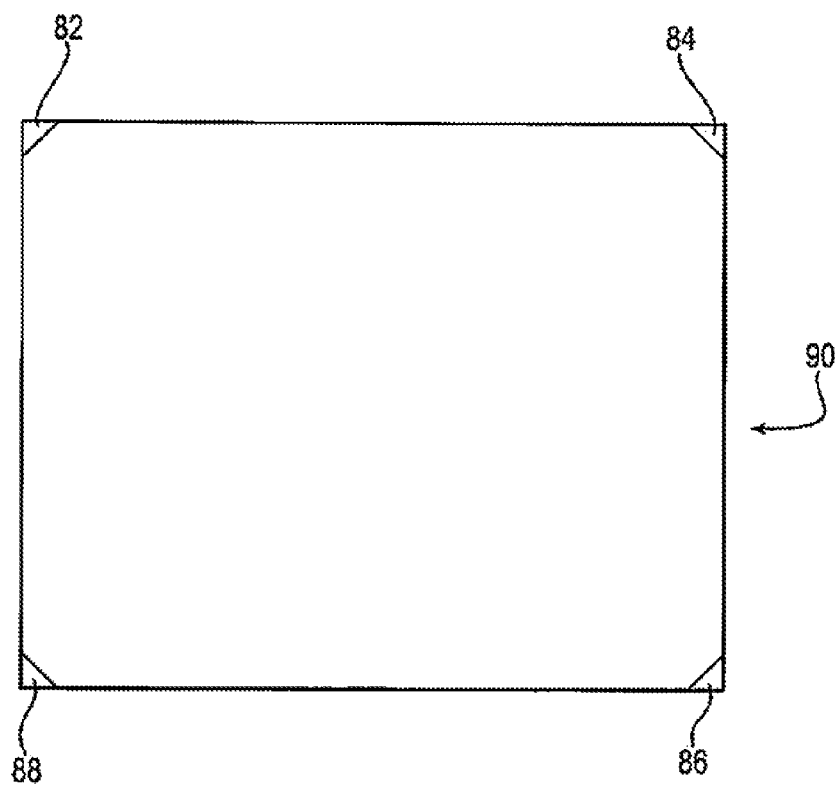
FIG. 8 shows a facility having plural RFID tag reading devices.

In other exemplary embodiments a prioritizing automated banking machine may be used in waiting facilities where many people are normally expected to simultaneously congregate and wait, such as doctors' offices, hair stylist centers, and motor vehicle registration centers (e.g., DMV, BMV). A prioritizing machine may also be provided in a restaurant, such as a fast-food facility. The prioritizing device(s) can be operatively connected to one or more remote tag readers to automatically read all RFID tags in a predetermined area of the waiting facility. For example, the tag readers may be strategically positioned to generally surround the waiting area. FIG. 8 shows a waiting facility 90 having RFID tag reading devices 82, 84, 86, 88 positioned in a surrounding relationship. The reading devices are operatively connected to a prioritizing device (e.g., processor). The reading devices may be sequentially or simultaneously operated.

In an exemplary embodiment, contactless (e.g., wireless) technology can also be used by an automated banking machine to communicate not only with RFID tagged items (e.g., automated banking machine cards), but also with other user devices, such as smart cards, PDAs (personal data assistant), cell phones, pagers, and laptop computers that utilize RF and/or RFID technology to send/receive data.

It should be understood that exemplary embodiments of automated banking machines may include a magnetic stripe reader in addition to RFID readers and/or writers. For example, an automated banking machine can have both an RFID tag reader and a magnetic stripe reader. The RFID tag reader can be combined with or positioned adjacent to the magnetic stripe reader. Such an arrangement enables two different types of cards to be read at generally the same location. The ability of an automated banking machine to read data from different types of data cards can be beneficial to implement the capabilities of reading more types of cards or during a transitional period of switching from magnetic stripe cards to all RFID cards.

An automated banking machine can have a user card input slot (or card reader inlet) for insertion therein of a card by a user of the machine. The card insertion slot is able to receive both magnetic stripe cards and RFID cards. That is, the slot can be a dual use input opening. The slot can be aligned with a magnetic stripe reading device. The magnetic stripe reader can communicate with the slot via a pathway. The magnetic stripe reading device can include a housing that is able to receive the card therein. The slot can be a fascia opening and/or an entry into the magnetic stripe reader housing. The RFID tag reader can be positioned adjacent to the magnetic stripe reader, either in or out of the housing.

Figure 9:
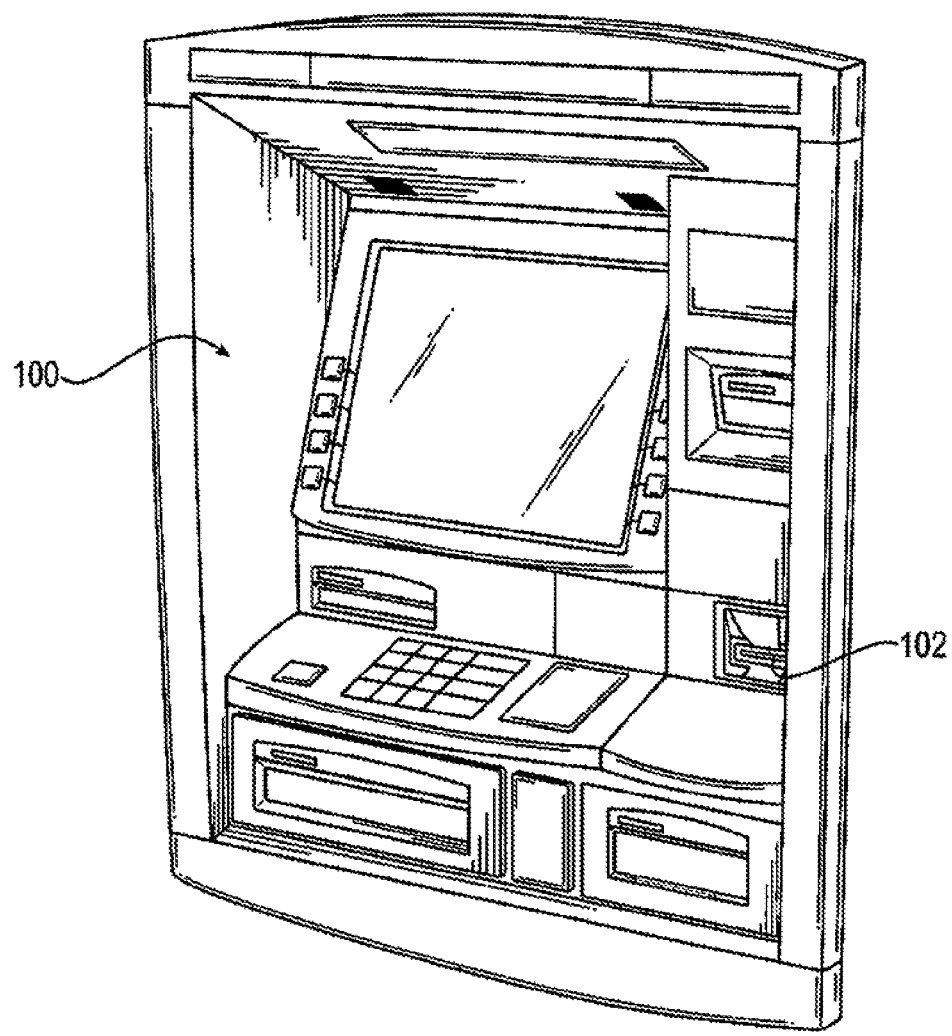
FIG. 9 shows an automated banking machine having a dual use card reader slot.
Figure 10:
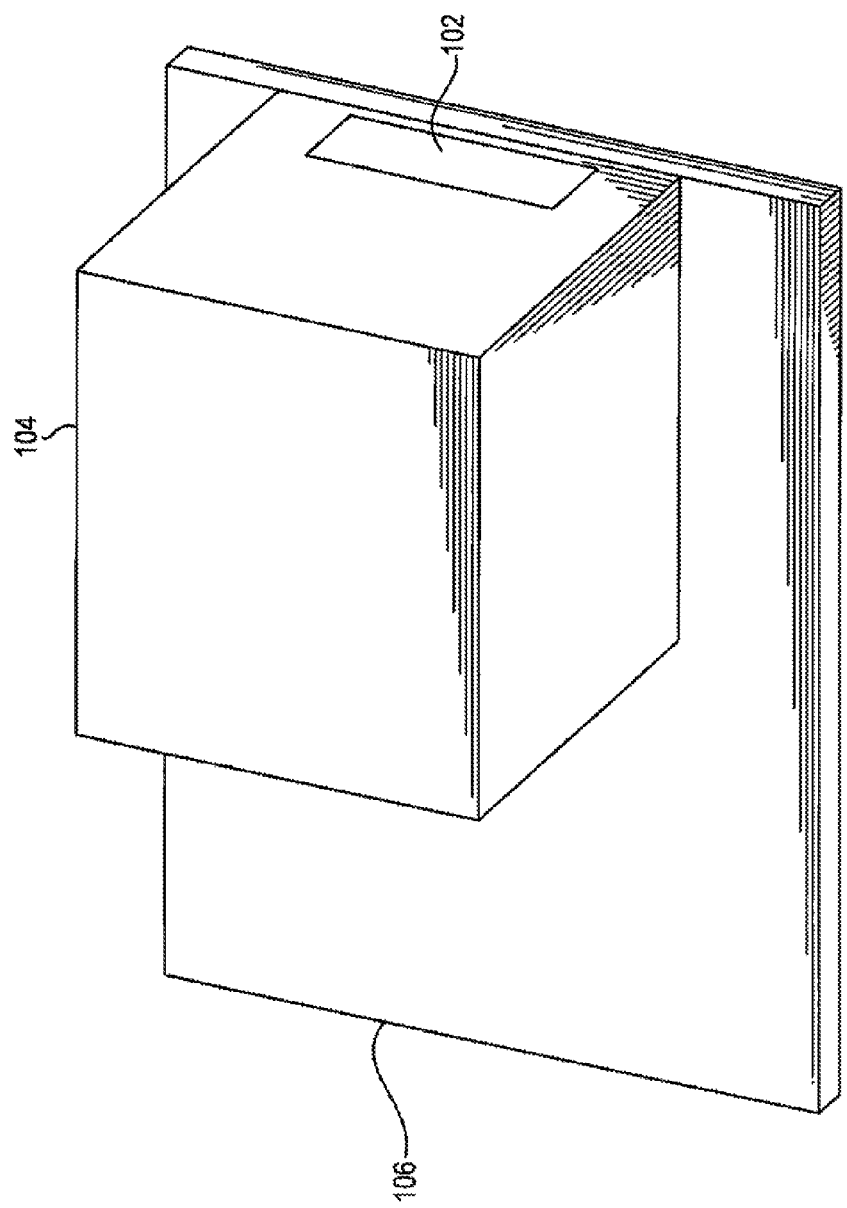
FIG. 10 shows an RFID reader is positioned adjacent to a magnetic stripe reader.

In an exemplary arrangement the RFID reader is positioned outside of the magnetic stripe reader housing. The housing can be of a structure (e.g., open or slotted) and/or of a material (e.g., plastic) that enables the RFID tag to be read exterior of the housing. FIG. 9 shows an automated banking machine 100 having a user card insertion slot 102 into which both magnetic stripe and RFID user cards can be inserted for reading by the machine. FIG. 10 shows cut away angled view of the card insertion slot 102 in relation to a magnetic stripe reader housing 104. An RFID reader 106 is positioned adjacent to the magnetic stripe reader housing 104 in the automated banking machine 100.

The card reading processes can be prioritized based on programming associated with one or more controllers in the automated banking machine. For example, the RFID tag reader can be controlled to operate first in attempting to read a card. Upon a successful read by the RFID reader, the magnetic stripe reader is not active. However, if the RFID reader's attempted read was unsuccessful, then the magnetic stripe reader is operated in a second attempt to read the card. If the second attempt is unsuccessful, then the card is returned to the user. In another reading program, the magnetic stripe reader can be operated first and the RFID reader second. In other card reading processes the magnetic stripe reader and the RFID reader can both be simultaneously operated to read a card.

In other exemplary embodiments the RFID reader may be positioned adjacent to the read head or other magnetic stripe reading device. In such embodiments the RFID tag and magnetic stripe data may be read generally simultaneously. Alternatively or in addition, the RFID data may be read as data is read from a chip on a smart card. These approaches are exemplary.

In some embodiments it may be advantageous to read the RFID data from the card while the card is within the machine. In such machines it may be advisable to insulate the interior of the machine and/or the reader with RF signal blocking materials (for example conductive elastomers), such that RFID signals read from the card cannot be intercepted by unauthorized reading devices attached to or near the machine. Likewise such capabilities may be used to prevent interception of data being programmed onto an RFID tag. In addition or in the alternative, the fascia of the machine may include intrusion sensors adapted to sense radiation output by unauthorized RFID reading devices attached to the outside of the machine. The controller of the machine may be programmed responsive to detecting potential unauthorized RFID sensor signals to analyze the nature of the signals to determine if they correspond to those likely associated with an unauthorized reading device. The sensing of unauthorized reading devices, for example, is shown in U.S. Pat. No. 7,240,827, the disclosure of which is incorporated herein by reference.

In response to determining that such signals correspond to an unauthorized reading device, the controller may cause the machine to take actions in accordance with its programming. Such actions may include, for example, stopping operation of all or certain operations of the machine, such as cash dispensing operations. Actions may also include capturing a card from which data may have been intercepted. Actions may also include capturing image data from a camera. This may be accomplished, for example, in the manner shown in U.S. patent application Ser. No. 09/991,748 filed Nov. 23, 2001, the disclosure of which is incorporated herein by reference. Alternatively, such actions may include giving notice to a remote entity in a manner such as is done in U.S. Pat. No. 6,768,975, the disclosure of which is incorporated herein by reference. The controller may also be operative to cause an emitter to output signals that are operative to jam, saturate or provide false data to an unauthorized RFID reading device. Of course, these actions are exemplary of actions that may be taken.

In some exemplary embodiments the data from an RFID tag may be used to authenticate other data on a user card or other item or feature used to operate an automated banking machine. For example, data recoverable from memory on an RFID tag may be used to verify data recoverable from another source, such as a stripe or a chip on a card. For example, data read as part of RFID data may have a corresponding or other predetermined relationship to all or portions of magnetic stripe data, chip data, and/or customer input data. The presence of such a relationship can be determined through programmed operation of one or more controllers operating in the machine. The determination that the relationship is present for the particular card or transaction may be used to provide greater assurance that the card is genuine and/or that data on the card has not been tampered with.

In some embodiments RFID tags can be embedded in cards or other items. In other embodiments an RFID tag may be attached to items. For example, a customer may be provided with a thin RFID tag that includes self-adhesive material. The user may be provided by a card issuer, bank, or other entity with the RFID tag and given instructions to apply it to an associated magnetic stripe or other card. Data readable from the RFID tag can then be read by the automated banking machine when the card is used, and such data compared to magnetic stripe and/or customer input data, or portions or combinations thereof for a determined relationship. The existence of the relationship serves to reduce the risk that the input card is genuine and is not a fraudulently produced duplicate card. The existence of the predetermined relationship can be required by the controller in accordance with its programming before machine transactions, such as dispensing cash, can be conducted at the machine.

In some embodiments the card issuer may provide replacement or additional self-adhesive RFID tags to a card holder. The card holder may remove the existing RFID tag from the card and replace it with the new tag. The new tag may have different or additional data that can be utilized at the machine controller to authenticate the card, the user, or other data, in another manner. Automated banking machines may be programmed such that if the original tag is not replaced with the replacement tag, the card will no longer operate the machine. Alternatively, the additional tag may need to be applied to the card while the first tag remains. The machine controller may use data from both tags in the determination that the card should be accepted and the machine operated to carry out one or more transaction functions.

Of course, these approaches are exemplary of approaches that may be used. Further, while the exemplary embodiment is used in conjunction with an automated banking machine, it should be understood that similar principles may be used in conjunction with other credit card terminals, debit card terminals, vending devices, and other devices that employ such cards for operation.

In still other embodiments an issuer of a card may provide a user with an RFID tag or other item that is not attached to or connected with the card. For example, the user may be provided with an item that includes an RFID tag that the user will always be expected to be carrying when the user conducts automated banking machine transactions. This may include an item such as a card holding sleeve that the user can keep in a wallet, a tag that can be attached to a key ring, or a self-adhesive label a user can attach to a key, watch, wallet, pen, jewelry or other item generally carried by the user. When the user conducts a transaction at the automated banking machine, a reader in or operatively connected with the automated banking machine reads RFID data from items in proximity to the machine. If the proper RFID data is not detected, the machine will not operate to perform at least some transactions. Thus even if a user's card data, card, and/or PIN has been taken by a criminal, the criminal may be prevented from accessing the user's account if the user does not have the personal item bearing the RFID data. Of course this approach is exemplary and in some embodiments other approaches may be used.

Further in some embodiments RFID tag data may include data usable for verifying the origin and/or authenticity of data or messages. For example, RFID data may include digital signatures and/or digital certificates. Such digital signatures and digital certificates could be used to authenticate data input via a card or through an input device, and/or could be used to authenticate a message originating from an automated banking machine or other device and/or to verify the authenticity of data. Digital signatures and certificates can be used in ways similar to those described in the incorporated disclosures to verify the source of messages, to encrypt and decrypt data, and to configure an automated banking machine. In some embodiments signature and/or certificate data may be wholly stored in an RFID memory, while in others only portions of such data, or data than can be used to resolve such signature or certificate data, can be stored in memory associated with an RFID source.

In other embodiments, data stored in connection with an RFID tag can be used to verify authenticity of a card and/or a user. For example, as previously discussed, a card issuer may provide a user with an RFID tag containing data. Such a tag may be a self adhesive tag to attach to the card or otherwise. Such a tag may include data that can be used by a controller in the machine to verify stripe or other card or user input data (PIN, biometric input, or other input, for example). Alternatively or in addition, the tag may have associated memory included therewith that includes data that can be used by the automated banking machine to verify that the user is the authorized user of the card.

For example, the RFID tag may have stored thereon several items of information that only the authorized user is likely to readily know. These might include, for example, the last digit of the user's Social Security number, year of birth, first digit in residence address, first letter of street on which the user lives, first letter of mother's maiden name, first letter of mother's first name, first letter in father's first name, and other similar data. Automated banking machines may be programmed to ask a customer a random (or in a predetermined order) one of these questions when a transaction session is initiated or at another time in a transaction session at the machine. The input of the customer in response to the question is compared through operation of the controller in the machine to the data read from the RFID tag. Only if the input data corresponds is the customer permitted to conduct a transaction or a selected transaction function.

In the exemplary approach, even if a customer's magnetic stripe data and PIN have been intercepted by a criminal, the criminal does not obtain sufficient information to use the card to conduct automated banking machine transactions. In addition, even if the user's input in response to a question presented in response to one random question output by a machine is intercepted, it has no value unless the criminal has been able to steal the card with the RFID tag or otherwise obtain the separate tag. Further, even if the criminal has the original RFID tag, because the exemplary machine has a controller that is programmed to output the numerous questions randomly, the customer's response that a criminal has been able to observe is not likely to be the correct response when the criminal presents the card at a machine. Further, because the machine can be programmed to capture the card in response to a set number of incorrect responses by a user, there is a significant chance the card will be captured and invalidated by a machine before the criminal may use it in carrying out a transaction.

Similar approaches may be used with programmable RFID tags. In an exemplary approach, rather than having numerous possible answers to questions selected randomly stored in connection with the RFID tag, the RFID tag memory can be selectively programmed with data the customer may input through input devices on the automated banking machine. For example, the machine controller may be programmed to advise the customer that the time after the next time (or at some other later time) when the customer uses the card the customer will be asked to input particular data. This might be, for example, the first letter of the user's mother's first name. Data corresponding to the question and/or appropriate response would be input by the user to the machine and be stored on the RFID tag through operation of the controller and RFID tag writer device. In an exemplary embodiment, the user can provide the question, answer, and/or a code for storage on the RFID tag. Then when the card is used on the corresponding subsequent occasion, the controller in the machine would operate to present the question and verify the answer input by the user based on the RFID data, and enable at least one transaction or function with the machine in response to receiving the correct input. Thus, even if a criminal stole the card, RFID tag (if separate from the card), PIN and the response given by the user, the criminal could not conduct a transaction at the machine with the card, because the criminal would not know the correct response to the question the machine would pose upon the next transaction (because it was input by the user during a prior transaction the criminal did not observe). Of course, this approach is merely exemplary.

It should be mentioned that some of these exemplary embodiments for verifying a user and/or a card or other item may be carried out locally at the automated banking machine. This may avoid the need to modify the nature of transaction messages transmitted to and from the machine in a financial network to carry out transactions. Of course other embodiments may use remote communication to facilitate secure operation. For example, a remote computer (connected to a data store) may provide one or more values or codes that are stored in RFID data. Such data (which may be in a card) may be looked for or used the next time the card is used, and its absence or variation identified to indicate a false or stolen card. Of course this approach is merely exemplary.

In alternative embodiments a user may be provided with a RFID tag that a user can install in or attach to an item such as a PDA with wireless communication capabilities or a cell phone. The PDA or cell phone associated RFID data may be read to initiate a transaction or a particular function at an automated banking machine. For example, the RFID data may include data usually found on a card that corresponds to a user or user's account.

The automated banking machine controller may be programmed to prompt the user after reading the RFID data to provide an input through the PDA or cell phone. For example, the machine's display could prompt the cell phone user to call a number associated with the machine or a remote computer. The telephone connection could prompt the user to input the user's PIN through the cell phone. This could be used to reduce the risk of interception. Alternatively, the user could be instructed to change the user's usual PIN in a particular way for this transaction. For example, the user might be told via the phone connection to substitute a particular digit or symbol for the usual first PIN digit. The user would then input the modified PIN through the machine, and the machine would carry out the transaction. If a PDA is used, communication could be conducted wirelessly between the PDA and machine such as through Bluetooth® or other wireless communication. As can be appreciated, because the acceptable PIN could be varied with each transaction, a criminal observer of the input PIN would not have the user's actual PIN and the ability to conduct a transaction at a machine.

Further, this exemplary approach could be combined with other approaches previously described to provide enhanced security. Of course these approaches are exemplary of many approaches that may be used.

An exemplary automated banking machine also has the ability to read non-card RFID devices. These RFID tags can be embedded in or associated with transaction items such as currency (e.g., bills and coins), checks, securities, account passbooks, certificates of deposit, tickets, coupons, gift certificates, etc. Documents such as present and next generation currency (e.g., plastic bills and plastic coins) can contain RFID tags. An RFID tag associated with a currency note can hold a plurality of information representative of the note, including but not limited to the note's value (e.g., $50), serial number, and issue date. The automated banking machine can have an RFID tag reader that can read the note's RFID tag information. The machine can also read the note's value, serial number, and issue date from one or more surfaces (faces) of the note. The machine can perform a note validation process based on the read information. The note validation process can include checking whether the note face information read directly from the note matches the note face information read from the RFID tag. In alternative validation arrangements, the two sets of read note face information can be transmitted from the machine to a machine network host where the note validation process can be carried out.

Furthermore, an automated banking machine, an machine host, one or more remote computers, and/or networks can transmit bank note validation information to a central processor arranged outside of the banking network in order to have the note validation process performed. The central processor can constitute one or more connected computers that comprise a main or central computer that maintains a data store containing data on all new (e.g., U.S.) currency bills. The data store includes note face information corresponding to particular RFID tag ID numbers and/or other data. The main computer may be a government (e.g., Treasury Department or Federal Reserve) computer.

In an example of a verification process, a bank note is received by an automated banking machine in an attempted deposit transaction. The note has an RFID tag that only includes a tag ID number. The RFID tag can be non-programmable. Thus, the ID number is permanently assigned to that note. The machine reads the note's face information. The machine uses an RFID document tag reader to read the tag's ID number. The machine gives the ID number (along with the information read from the face of the note) to the machine host. The host passes the ID number and the note face information to the main computer. The main computer uses the ID number to obtain the note face information corresponding to that particular ID number from the data store. The main computer then compares the two sets of note face information to determine whether the note is valid. The main computer informs the machine's host on the determined validity of the particular note. The host can then instruct the machine on whether to deposit, hold as suspicious, or return the note.

The use of RFID tags in currency permits tracking (or at least partial tracking) of currency. Tags can be used to track the flow of money into and out of a banking network. For example, a banking network can use RFID tagged currency notes to monitor the activity of individual currency notes within the network. The monitoring can be used to enhance cash management. Cash can be reallocated to segments of the network in order to maintain a proper balance or to prevent a cash shortage situation. A network database can be used to store currency note inventory data. The database can be used to track the currency notes received into the banking network (e.g., deposits into automated banking machines, etc.) and the currency notes that have been removed from the banking network (e.g., cash withdrawals, etc.). The inventory tracking may be carried out in real time. On a broader scale, the governmental main computer can be in communication with a plurality of banking network databases to access a real time inventory of cash over a wide segment of the banking industry. The main computer can be used by the Federal Reserve to reallocate cash throughout the different Federal Reserve regions.

The main computer can also be used to track currency for research. For example, the main computer can attempt to follow a currency note throughout its life cycle. The life of a currency note may include its creation at a mint, distribution by the Federal Reserve, passage through several banking systems, and multiple uses at several automated banking machines. The tracking can be used in note travel analysis.

The tracking can also be used in detecting counterfeit currency, such as when a non existing serial number is detected or when two of the same serial numbers are detected in questionable situations. For example, a serial number read on the Eastern coast of the U.S. two hours after having been read on the Western coast would create a questionable situation. RFID tags in currency can also be used in statistical analysis to calculate or create normal patterns of currency deposit/withdrawal. A pattern may include several factors, including a total deposit amount over a predetermined time period. A normal deposit pattern can be assigned to an individual automated banking machine, a specific number of machines, and/or an entire network of machines. Patterns involving segments of an automated banking machine network may also overlap. A normal deposit pattern can be created after performing a lengthy study (via RFID tags on currency) of deposits made to the machines assigned to the pattern's particular coverage area. For example, the pattern factor comprising the normal range of deposits per time period is calculated and assigned to that particular pattern. A pattern can be continually adjusted to compensate for different business activities (e.g., new housing) occurring within the pattern area.

The monitoring of deposit patterns (via RFID tags in currency) can be used to ascertain questionable deposit activity. The monitoring may be carried out in real time or near real time. In a pattern monitoring example, the pattern of currency entering an automated banking machine network is compared to the normal deposit pattern for that network. A discovery is made that the current deposit pattern differs from the norm by an unacceptable range (e.g., 25%). The non normal pattern may be the result of an unusually large amount of currency having been deposited into several network automated banking machines within a relatively short period of time. Deposit patterns out of the norm are automatically flagged and may be investigated for illegal activity, such as money laundering. The previously discussed ability to use RFID tags to track deposited currency to a particular customer at a particular time can be used in the review of the flagged pattern to determine whether the deposit transactions were legitimate.

Other uses of currency with an RFID tag may also be used in exemplary embodiments. For example, an RFID tag with a programmable memory can be used to enhance the security of bank notes in an automated banking machine. The machine can operate an RFID writer to reprogram the RFID tag to change the status of currency between first and second identifier states (e.g., active and passive states). For example, a tag in a passive or non-flagged state may represent that the currency note was legally dispensed and is valid for public usage. A tag in an active or flagged state represents that the currency note is (or should be) under the jurisdiction (or current possession or ownership) of a particular entity or financial organization, such as a bank. An active note outside of the bank's currency system is an indication that the note was taken without permission (e.g., stolen) from the bank, such as via breaking into an automated banking machine or during transport. Currency can be deactivated during its dispense from a machine. Currency can be activated during its reception as a proper deposit. Active/passive (e.g., bank/public) in an RFID tag memory can be represented by identifiers or codes (e.g., numbers, letters, etc.). Of course this approach is merely exemplary.

The use of active and passive tags can prevent the laundering of a stolen note back into the banking system, such as via a deposit into an automated banking machine. A machine of the banking system can read the RFID tag of a note that is trying to be deposited, identify the note as active (suspicious or stolen), and notify the proper authorities of the situation. Of course on a broader scale a banking system may be linked with other banking systems to share RFID tag information. Each bank may have a unique bank code that is represented in their active state of a tag. Each bank system can recognize not only their own currency but also that currency belonging to other banks via reading the bank code. A note without a tag may not be accepted for deposit. The serial number of a non-tagged note may be checked via a data store to determine if the note previously had a tag. A non-tagged note may be an indication that the tag was purposely removed or the note is counterfeit. Such tags may also be used to identify the particular individuals associated with transfers of particular bills.

In other programmable RFID tag arrangements a tag can be embedded in specialized currency. For example, programmable tags may be used in newly minted limited edition currency, large bills, or large securities. The tag can store an owner-chosen or other type data such as an encrypted PIN. The PIN may serve as an additional security feature to verify that the current possessor is the actual legal owner. Only specific entities (e.g., banks, security dealers) may have access to the authorized readers that are necessary to decrypt and read a PIN. A provided or entered PIN can be compared with the PIN stored in the RFID tag of the bill or security. Upon ownership transfer of a security, the PIN can be changed by the new owner.

The capability of an automated banking machine to use an RFID tag to recognize an individual item and associate the particular item to a particular customer/account can also be applied to financial checks. A check may include an RFID tag. The check's RFID tag can be programmable. A check's RFID tag can initially contain information representative of the maker's name, account number, and bank name. As previously discussed, the machine can have an RFID tag reader/writer. The machine can add information to the tag, modify the tag, or reprogram the tag. For example, additional information that may be added to the tag by the machine may include the check amount, date, payor, payee, transmitting bank, routing number, and/or bank account or other data or numbers. The machine prepares the tag memory so that all the necessary information is available in the RFID tag to allow the Federal Reserve to read the tag and process (clear) the check.

In an exemplary embodiment the component modules/devices (e.g., input and output devices) inside of an automated banking machine use contactless (e.g., wireless) processes to communicate with each other and/or to the machine's internal computer(s). The internal machine controller(s) can serve as a local host computer to each of the components in the machine. It should also be understood that the local host computer can also constitute a machine component. As previously discussed, automated banking machine components may include (but are not limited to) transaction function devices such as any of a card reader, keypad, function keys, display, receipt printer, journal printer, account statement printer, currency dispenser, and currency acceptor. Wireless communication can be used to make the individual components independent of any hard-wired signal communication relying on wiring or distribution hubs. That is, the components can have wireless communication that is not dependent on any fixed hard wiring between components. Interface hub wiring (e.g., USB hubs) for multiple device interfaces can be reduced or eliminated.

A wireless communication arrangement frees up additional room inside of a machine housing and makes component placement more flexible. Thus, additional functionality and/or more devices/components can be added to an automated banking machine. The number of module/device interfaces and locations can be increased in the machine. The number of devices is not limited by the number of individual hard-wired signal/communication wires, distribution hubs, or their physical locations inside the machine. Some components that do not have to be located adjacent a fascia opening may be randomly positioned in the machine, due to their exact position being irrelevant. Troubleshooting, component/machine downtime, and replacement of faulty hard wiring associated with communication wiring between the machine's internal computer and a component can also be reduced or eliminated. Power supply to devices can also be provided in some embodiments by providing RF energy within the housing from one or more emitters. Multiple transaction function devices may receive power from the RF emitter(s) as necessary for operation and/or communication.

A wireless communication arrangement may also be used to add an additional layer of security to an automated banking machine by reducing the opportunity to tamper with a machine and/or its components. Elimination of component hard-wiring removes the ability of a person to physically alter wiring to provide unauthorized access to the machine banking network and/or to control a machine component. With the absence of wiring, then any capacity to bypass original hard wiring with false wiring between a local host computer and the components for the purpose of overriding original programming has been eradicated.

Communication among the components and the host computer can utilize encryption codes as an additional security layer. Likewise, communication involving an RFID device can be encrypted. The encryption codes can be utilized as an additional security layer in sensing, indicating, and/or reporting when suspected tampering is occurring.

A component's RFID device can be activated by another component (or an RFID device of that component) during an attempt to communicate. When activated the RFID device can automatically power up its component in order to receive data and/or transmit requested data. A component can be arranged such that it is only powered up (i.e., "on") when its RFID device is in an active state. An RFID device can also be used to automatically power down its component upon an instruction (e.g., deactivation signal) or during absence of activity. Power consumption of a component can be reduced by installing a "sleep" mode in the component.

Figure 11:
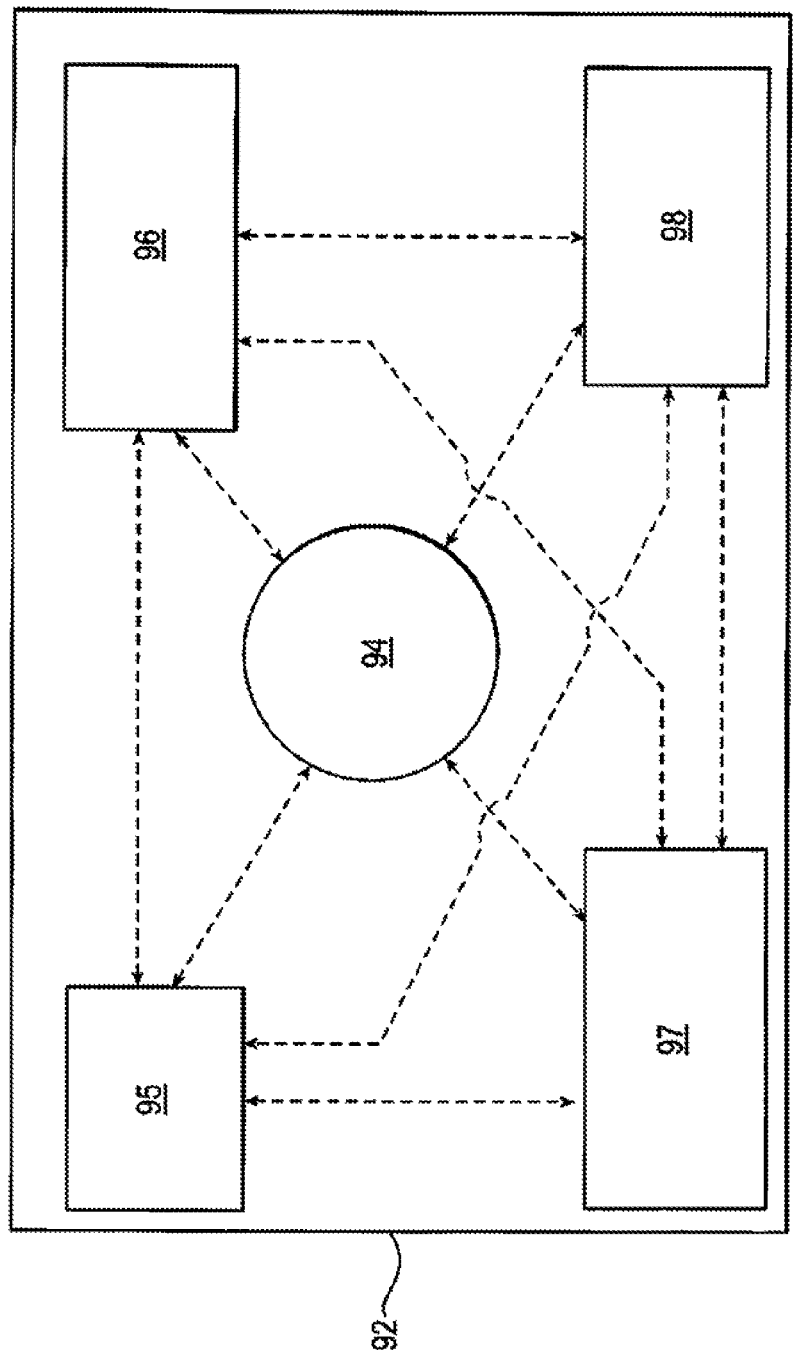
FIG. 11 shows an interior portion of an automated banking machine with components arranged in wireless communication.

The automated banking machine housing can be shielded with RF blocking materials to prevent interference, interception, or outside manipulation of the communications among the components and the host computer. A shielding structure may include conductive elastomer. FIG. 11 shows a rear view of components and a local host computer 94 arranged in an interior portion of an automated banking machine 92. The components and local host computer are devoid of wired communication with each other, but can communicate \\ith each other wirelessly. Components such as a card reader 95, display 96, currency dispenser 97, and currency acceptor 98 are shown.

As previously discussed, the use of RF can eliminate mechanical contact between cards and card readers. Of course the use of radio frequency is one example of non-contacting remote communication. It should be understood that other types of non-contacting information communication may be used in other exemplary embodiments instead of (or in additional to) radio frequency or radio waves.

In another exemplary embodiment, a user card can be replaced by a hand-held mobile device. The user card data (or information) is stored electronically within the mobile device. The process replaces user card insertion at an automated banking machine (e.g., a self-service machine, a self-service automated machine, etc.). The mobile device/machine relational arrangement sets forth a secure mode of providing data normally found on a user card to a machine. The user card data may include any of a personal account number (PAN), a card verification value (CVV), a customer name, a bank identifier number (BIN), etc. The mobile device (or portable device) may include a portable computing device. The mobile device can comprise a phone (e.g., a cell phone), personal digital assistant (PDA), notebook computer, Blackberry device, BlueTooth device, Ipod device, a mobile communication device, etc.

The card information can be used to carry out transactions at mobile device-compliant automated banking machines, including cash withdrawal transactions and other services. The exemplary arrangement enables a machine user to provide card data needed to perform a transaction, yet without use of a tangible card. As a result, machine customers can be protected from card-related machine frauds, such as card reader skimmers. The arrangement reduces the effectiveness of card skimming devices by allowing input of card data without card insertion.

In an exemplary arrangement, instead of inserting a card at an automated banking machine and using a conventional magnetic stripe card reader, a customer can start a transaction by pressing an "Enter" key (or some other designated key or keys) located on a user interface of the machine. The machine (or machine host) includes a computer in which one or more software applications are operative. The software can cause a time-variant random code (or random number) to be generated in response to the designated key being activated. The random code is alternatively referred to herein as a random value.

It should be understood that a third party random number generator or some other remotely located entity computer can be used to generate and provide a random code to an automated banking machine (or machine host). A random code provider can be placed in operative connection (such as via the Internet) with the machine (or the machine's host) to supply the machine with generated codes. Although generation of random code at the machine level may be discussed in more detail herein for reasons of brevity, it should be understood that distinct suppliers of random code can instead be used.

A random code may consist of plural digits, such as four digits. The digits can be numbers and/or letters. It should be understood that fewer or greater digits than four may be used in forming a randomly generated code. The automated banking machine (or machine host) software can also cause the machine to visibly display the randomly generated code on a display screen. The display enables the code to be viewed by a user of the machine (e.g., the user that pressed the designated key).

It should be understood that in some embodiments the random code may be pseudo random such as may be generated by a computer. In other embodiments the code may not necessarily be random, but a value not previously known to the automated banking machine user and not predictable in advance by entities not responsible for operation of the system. Of course these approaches are exemplary.

The exemplary mobile device includes a computer operating one or more software applications. A registered user can download the software onto their mobile device from a secure web site. One of the applications includes data encryption software that enables a related data decryption software application of the automated banking machine (or machine host computer) to decipher the encrypted data.

The exemplary mobile device includes memory for storing card data (e.g., PAN, CVV, BIN, user name) of several individual cards. The mobile device can also retrieve the card data from memory storage. The mobile device can function like an electronic wallet. A user can select from any of the cards to use its corresponding card data in a transaction with an automated banking machine. For each card stored on the phone, the electronic data provided to a machine can comprise the Track-2 data normally found on the magnetic stripe of the physical card.

In an exemplary embodiment the user enters the random code displayed by the automated banking machine into the mobile device and selects one of the stored cards. For example, the code can be manually entered through a phone keypad. In some embodiments the machine may provide one or more outputs that prompt a user to input the code into the mobile device. The machine also operates to store the generated code for later verification and analysis purposes. The mobile device software can operate to generate an image including encrypted data that corresponds to both the code data and the selected card's data (e.g., PAN, CVV).

The process of encrypting can be independent of the code. That is, the code can be merely additional data that is encrypted in the process. Also, as discussed in more detail later, in alternative arrangements the code can be left out of the encryption. Alternatively in some embodiments the code may be used to encrypt the account number data. Embodiments may operate using various encryption/decryption processes and arrangements.

The exemplary software program causes the mobile device to display the encrypted data as an image on its display screen. For example, the encrypted image can be displayed in the form of machine-readable data, such as a (two dimensional) bar code. Display screen types and formats are well known, including LCD, plasma display, etc.

The exemplary automated banking machine includes a reader device that can read the encrypted image data. For example, the image reader may comprise a bar code reader. The reader device is mounted in a position that enables a machine user to locate their mobile device adjacent thereto. The image reader may replace an existing magnetic stripe card reader. The automated banking machine may prompt the user (via a machine display screen) to place the displayed encrypted image near or in aligned relation with the image reader. The machine may also prompt the user to press another designated machine key when the image is properly positioned near the image reader. Upon detection of the key activation, the image reader is operated to scan for an encrypted image. Alternatively the reader may operate in conjunction with sensors or other devices suitable for sensing when a display screen of a mobile device is in position to be read.

The automated banking machine (or host) software executes instructions that are operative to analyze the read image data, enabling the encrypted image to be decrypted. The at least one computer may operate so bar code may be converted to a different data format prior to decryption. The encrypted image format or encrypted data format can be analyzed to determine if it is genuine and/or valid (e.g., if it was created using a corresponding encryption software program). The analysis may include determining if the received data is readable, recognizable, or properly formatted. For example, expected fields in the encryption may be missing or contain values out of range, indicating invalid properties that prevent proper decryption. As a result, the automated banking machine may again attempt to read and analyze the (expected) bar code image or void the transaction. Valid encrypted data enables decryption thereof.

It should be understood that the analysis of data may first occur after decryption. Alternatively, a decrypted data analysis can be performed following an initial analysis of encrypted data.

In an exemplary embodiment, after obtaining valid decrypted data, then the random code can be checked by the automated banking machine (or host) for verification. The machine (or host) has the code that was generated, stored in memory and correlated with the current transaction session. The decrypted code can be compared with the generated code. If they do not match, then the transaction can be canceled or other action taken.

In other exemplary embodiments the account number and/or other data being represented by the output through the display of the mobile device may be encrypted using the code. In such embodiments the at least one computer of the automated banking machine may operate to resolve the account number data from the image using the code. The successful resolution of a value that corresponds to the account number may be the basis for verifying proper code input. In other embodiments portions of the output code may cause encrypted data to be included in an image that further verifies the input of the proper code and also verifies a proper output from the mobile device. Of course these approaches are exemplary.

The exemplary time-variant random code has a finite useful life. For example, each generated code may be useable for only a predetermined time period (e.g., 1, 2, 3, 4, or 5 minutes) following creation, after which period it expires. Alternatively, a generated code may be correlated with a set time/date after which it is no longer valid.

In an exemplary embodiment the decrypted code and generated code match, then a further check can be made by the computer in the automated banking machine (or host) to determine if that code's life has expired. If a valid (matched) code is still active (alive), then the decrypted card data (e.g., PAN, CVV) can be used to continue the transaction. Using a time-variant code ensures that the user is the current transaction user. A random number can be used to verify that the machine user corresponds to the current transaction session. Thus a thief can be prevented from trying to fraudulently use data directed to a prior transaction session. Of course this approach is exemplary.

The encrypted image can be read at an automated banking machine, the data in the image converted (decrypted) through operation of a computer into a text format, and then the text written to a file. The Track-2 data can be extracted from the file. The derived Track-2 data is copied to (and updates) the machine's Track-2 (card data) buffer.

The arrangement enables an automated banking machine to receive user card data in a more secure manner. In an exemplary embodiment, in the operation of verifying the authority of a user to carry out a transaction with the machine, whether the card data was received via a mobile device or via a magnetic stripe, the resulting content and format of the data in the Track-2 buffer would be indistinguishable.

Upon having the needed card data, the exemplary machine transaction process can follow a path similar to that when data has been read directly from a card. That is, the machine is advanced to the next state (e.g., PIN entry) in the transaction. For example, a subsequent stage in the transaction can include user PIN entry. The mobile device user can (manually) input their PIN at the machine's user interface. A conventional PIN verification process can be carried out responsive to operation of at least one computer in the machine. If the PIN is valid, then the transaction can be further continued.

The exemplary arrangement also enables user card data entry to conventionally occur prior to user PIN entry and verification. Thus, the exemplary arrangement does not interfere with the normal flow (order) of an automated banking machine transaction or with a bank's existing automated banking machine infrastructure.

Figure 12:
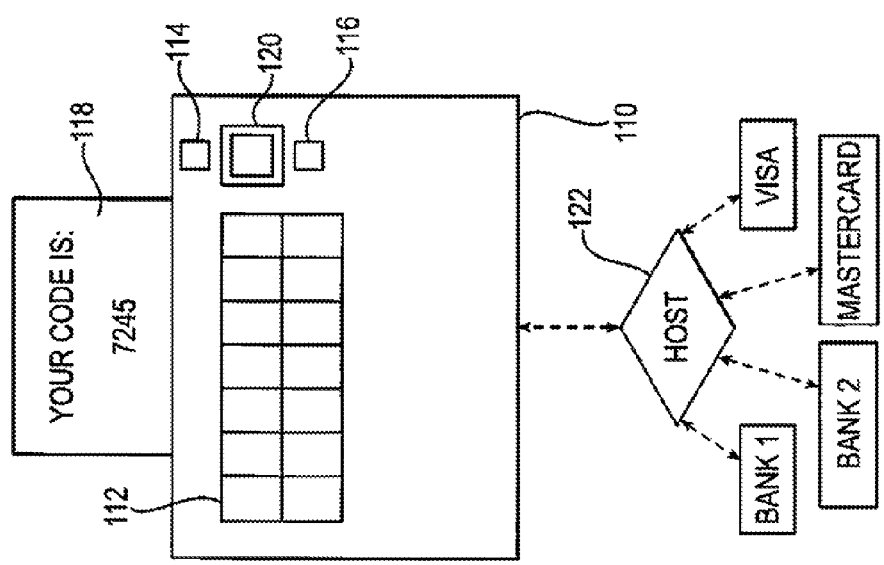
FIG. 12 shows an automated transaction machine and host arrangement, with the machine having card data image reading capabilities.

FIG. 12 shows an automated transaction machine 110 (e.g., a cash dispensing automated banking machine). The machine 110 is one out of a plurality of an automated transaction machines, each in operative connection with a shared host computer 122. The host 122 can operatively communicate with other card account sources (e.g., Bank 1, Bank 2, MasterCard, and Visa) in carrying out a transaction involving the machine. The machine 110 can include at least one keypad 112, function keys, a touch screen display device 118, and an image reader device 120. The function keys can include a random number request key 114 and a read image key 116. Alternatively, the random number request key 114 and the read image key 116 may be the same key. The machine can also have other well-known input and output devices, including conventional automated banking machine devices. For reasons of brevity, the machine 110 may be referred to herein as an automated banking machine. The transaction machine 110 can comprise other devices, including a depository, check-accepting machine, check-cashing machine, kiosk terminal, self-service machine, vending machine, cash counting device, checkout terminal, gaming device, fuel dispenser, laundry machine, entry access device, etc.

The random number key 114 is pressed to inform the machine that a new machine user desires that a code such as a random number be generated and displayed. This key can be activated at the start of (or to begin) a new transaction.

The display device 118 is shown displaying the random number 7245. This number was randomly generated by a random number software generation program. The program can be located in either the machine, the host, or a remote computer in communication with the host and/or machine. Either the machine or host or remote computer can correlate the generated number with a time. Alternatively, the random number may have an expiration time built therein or be reflective thereof.

Figure 13:
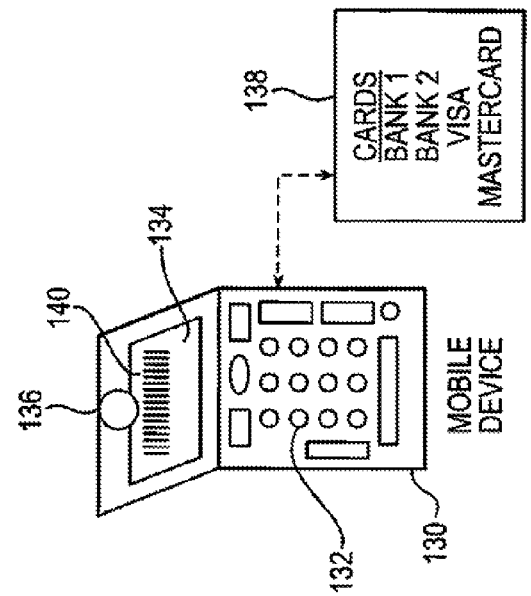
FIG. 13 shows a mobile device having image display capabilities, with the image including card data.

FIG. 13 shows an exemplary mobile device 130 (e.g., a cell phone) having input keys 132, a display screen 134, and a camera 136. The phone includes a memory 138 where the card data of several cards (e.g., Bank 1, Bank 2, MasterCard, and Visa) can be stored. As previously discussed, each stored card may be represented in memory by respective card data comprising a PAN and a CVV.

The user selects a card stored in their phone by providing inputs through an input device of the phone. The user also inputs the displayed random number into the phone. The exemplary software program in the phone enables either card selection or random number entry to occur before the other. Next the phone software causes both the selected card's data (e.g., PAN and CVV) and the random number to be used to generate an image including encrypted data corresponding to both values. The exemplary software causes the encrypted data to appear as a single image of a two-dimensional bar code 140 on the phone's display screen 134.

Next the user activates the read image key 116. This informs the automated banking machine that the displayed bar code is ready to be read (or received) by the machine. The read image key 116 in an exemplary embodiment can be pressed either before or after the display of the phone is positioned adjacent to the bar code reader 120. The machine software can cause the bar code reader 120 to attempt to read a bar code within a predetermined number of times (or within a preset time period) before quitting. If a bar code cannot be read within the defined limit, then the machine can prompt the user to make sure the phone is properly positioned, and again attempt the reading. Alternatively, the machine may cancel the transaction.

In an exemplary embodiment, following a successful reading of the bar code image from the phone, the automated banking machine decrypts the read random number. This decrypted number is then compared to the generated and displayed random number. If both, the numbers match and the time allocated for the random number has not expired, then the decrypted PAN and CVV are used to continue the transaction involving the selected card. For example, the next stages of the transaction may include using the CVV to confirm the PAN, and using the PAN to determine if the PAN corresponds to an inputted PIN. The host can conventionally communicate with the issuer of the selected card and the bank affiliated with the automated banking machine to settle the accounts involved in the transaction. Alternatively, in some embodiments the encrypted data may be decrypted using the code to obtain the customer account data or other data used to carry out the transaction.

Figure 14:
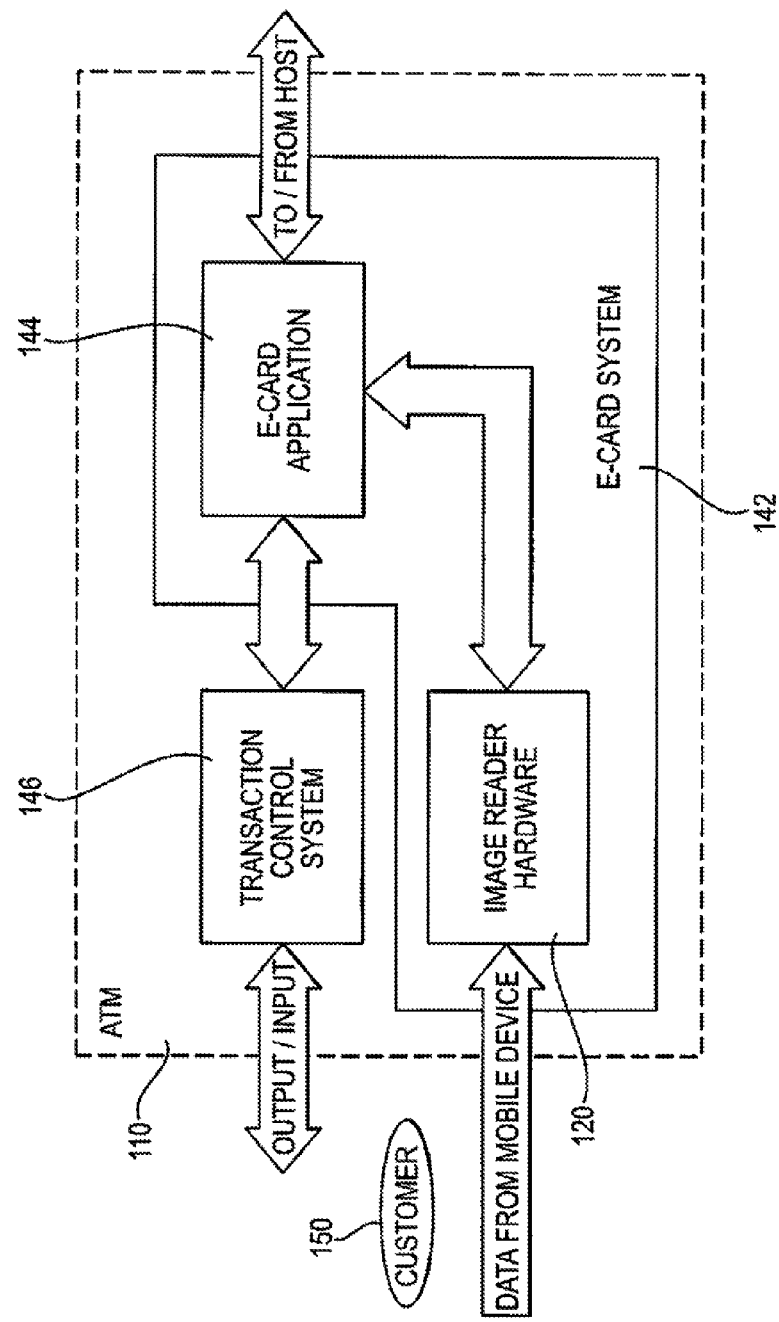
FIG. 14 shows a relationship among a customer, an automated banking machine having electronic card data handling capability, and a host.

FIG. 14 schematically shows a relationship among a customer 150 (e.g., an automated banking machine user), the machine 110, and the machine host 122. The machine has installed therein an electronic card (E-card) system 142. The E-card system 142 includes an image reader 120 (e.g., bar code reader device) and an E-card application 144. The E-card application 144 includes software that can control operation of the image reader 120 to read images. The software can also receive read encrypted data from the image reader 120, and carry out decryption of the encrypted data. The software can convert digitally imaged card data into electronic card data. The E-card application 144 is also able to communicate with both the machine's transaction control system 146 and the host 122 to exchange data.

The transaction control system 146 can include an machine controller computer. The automated banking machine can provide outputs to the customer, such as via the display device 118. The machine can also receive inputs from the customer, such as via the keypad 112 and the bar code reader 120. The inputs and outputs can be necessary to carry out a transaction.

Other details, embodiments, relationships, and alternative arrangements are within the scope of alternative embodiments. For example, each stored card in a mobile device can be linked to an ID or phone number of a customer for added transaction security. Triple DES encryption of transaction data can be used. A mobile device may include a mobile phone using JAVA midp 20 or higher. Other data formats may be used.

As previously discussed, the random code can be manually entered into the mobile device. In alternative embodiments, the code can be wirelessly received from the automated banking machine by the mobile device. For example, RF devices may be used to transmit (from the machine) and receive (at the mobile device) code information.

It should be understood that for purposes of definition, a "random" code/number as used does not necessarily have to be truly random. A random number generator, computer software program, or mathematical algorithm can be used. A created random code/number may be based on (or originate from) fixed factors, such as the machine serial number, and/or zip code, etc. Alternatively, a random code/number may be based on changing variables, such as the current date and/or time, etc. Likewise, fixed and changing data may be used in combination in generating the random code.

The mobile device software can use the code to generate an encrypted image. For example, the software can take the code and use it as or use it to generate an encryption key. The key can be used to encrypt card data (e.g., PAN, CVV) which corresponds to the selected card. Alternatively, the mobile device software can create an encrypted image without needing the code to make an encryption key.

A digital signature may be used in providing the card data to the automated banking machine. A hand shaking process may be used between the machine and mobile device to transmit/receive encrypted card data.

As previously discussed, the image including the encrypted information can be in the form of a bar code. However, other alternative image shapes and forms can be used and recognized by the automated banking machine. For example, a string of numbers and/or letters; color patterns; and fonts and/or shades may be used. Three-dimensional images can also be used, including their creation and reading. Image recognition software can be used.

In some arrangements an image (whether or not encrypted) displayed by the mobile device that corresponds to the code and card data can also be captured as a digital picture by camera of the mobile device. The mobile device can then wirelessly transmit the picture (e.g., via e-mail or a proprietary system) to the automated banking machine or the machine's host.

If sent to the host, then the host can determine the code (which may or may not include decryption) received from the mobile device. The host can compare the determined code to any pending active codes that were received from machines on the automated banking machine network. The comparison can identify the correct machine involved in the transaction (i.e., the machine that displayed the code to the customer). Thus, the code can also act as a machine identifier. The host can then forward the code and card data (whether or not encrypted) received from the mobile device to that identified machine. If necessary, the machine can then carry out any needed decryption of received data.

In an alternative arrangement, the image displayed by the mobile device can be sans the code. Instead, the code displayed by the automated banking machine can be captured by the mobile device in another digital picture. A first photo file (which includes the card data) and a second photo file (which includes the code data) can then be sent together to the machine or the machine host. If sent to the host, then necessary data can be forwarded to the automated banking machine that is correlated with the code.

In other alternative arrangements an intermediate device or system can be used between the mobile device and the automated transaction machine. That is, data (e.g., random number, account number, etc.) does not have to be directly exchanged between the mobile device and the automated transaction machine. Rather, the data can first be passed through the intermediate device or system. The intermediate arrangement can also be used to generate the random number for use by the automated transaction machine and/or store the account data for the mobile device.

In still other arrangements the mobile device may provide additional outputs to provide data for carrying out a transaction. This may include data output through RF, infrared (IR) or sonic signals. Such data may in some embodiments provide portions of account number data or other data to carry out transactions. In other embodiments such data may be used for verification or security purposes. Of course these approaches are exemplary and in other embodiments other approaches may be used.

In further exemplary embodiments, a cash dispensing automated banking machine includes a card entry slot that is aligned with a card reader device. The card reader is operable to read data from a magnetic stripe of a user card that has been inserted into the slot.

An exemplary card reader arrangement allows for use of a conventional DIP card reader type of user motion (i.e., manually push card in then pull card out type of motion) with which many card users are already familiar. Once the card has reached full insertion, the card would be held in place by a card retainer associated with the card reader mechanism. A magnetic read head would be moved along the long axis of the magnetic stripe to read the encoded data. The movable read head can also be used (if needed) to write magnetic data to the stripe tracks. Thus, the exemplary card reader arrangement creates the ability to write data in a DIP reader type of assembly.

In an exemplary embodiment, the card holding mechanism includes holders comprising rollers or belts positioned on each side of the card. The holders are moved to pressingly engage and hold the card in a substantially fixed position. In some embodiments, the holders operate to first move the engaged card into its final card reading position before holding the card stationary. Another type of card holder can comprise a scissors like mechanism that operates like ice tongs.

Figure 15:
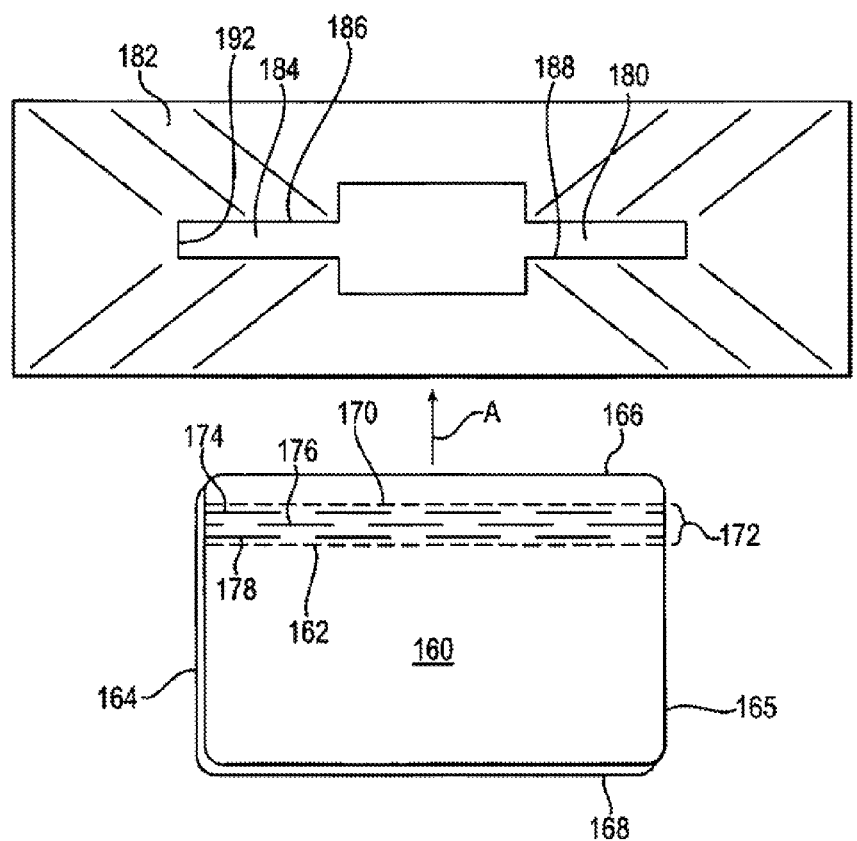
FIG. 15 shows the orientation of a magnetic stripe card that is being inserted into a card slot of an exemplary card reader arrangement.

FIG. 15 shows a card 160 that includes a magnetic stripe 162. The card 160 is substantially rectangular-shaped, with two short edges (sides) 164, 165 of equal length and two long edges 166, 168 of equal length. The magnetic stripe 162 has a short width (or short axis) 172 and a relatively longer length (or long axis) 170. The magnetic stripe is located closer to one of the long edges 166, and the (longer) stripe length 170 is also parallel to that long edge 166. The magnetic stripe 162 contains several tracks (e.g., three) 174, 176, 178, of encoded data. These tracks extend along (substantially parallel to) the length 170 of the magnetic stripe 162.

Figure 16:
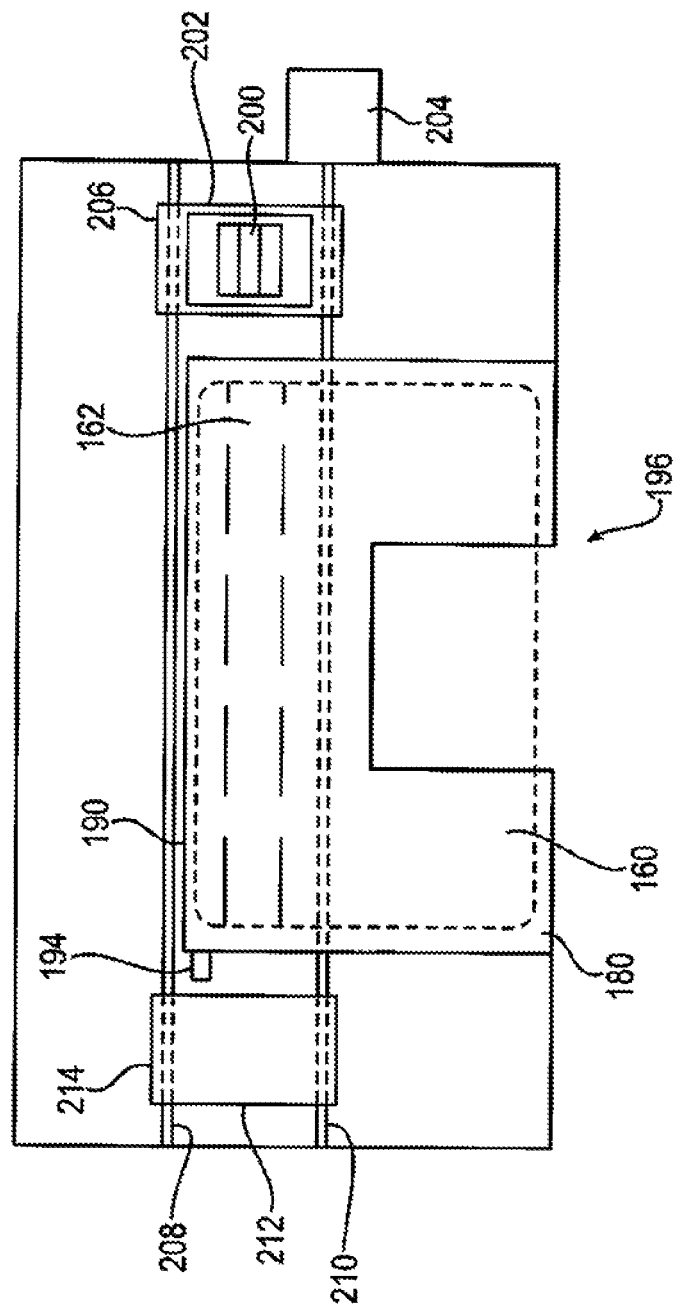
FIG. 16 shows the card of FIG. 15 inserted in the slot at a position that is adjacent to a movable magnetic read head of the exemplary card reader arrangement.

In an exemplary card reader arrangement, the card 160 is moved into a card slot 180 in a direction that is perpendicular to the long axis 170 of the encoded track data 174. The result causes the card 160 to be inserted into the card reader slot 180 oriented with the long edge 166 (nearest to the stripe) achieving the furthest insertion (instead of the more common short edge first type of insertion used with conventional card readers). In an exemplary embodiment, a person (user) manually pushes the card 160 all the way into the card reader. When fully inserted, the trailing edge of the card 160 is substantially flush with the card slot opening 180, as shown in FIG. 16. In some embodiments, it is desirable to prevent the user from being able to move or pull on the card while it is being read. Thus, having the card flush with the slot reduces a fully inserted card's exposed area that can be gripped or grabbed by the user.

In FIG. 15 the card entry slot 180 to the card reader is shown extending in a front face portion of a user interface 182 that accepts magnetic stripe cards. The opening to the slot forms a slot face. The card insertion direction is represented by arrow A. The user interface portion 182 can be part of a user fascia, such as the previously discussed fascia 12 of FIG.

1. A machine fascia 12 can be equipped with another (new) card slot 180 or modified to replace an existing card slot with the sideways card slot 180.

As seen in FIG. 15, the card entry slot 180 is configured (sized) with a slot length 184 that is greater than the length of the long edges 166, 168 of the card 160. Thus, the slot configuration allows it to receive a long edge 166 of the card. That is, the slot 180 can first receive the respective long edge 166 (i.e., the card's magnetic stripe edge) that is closest to the magnetic stripe 162. As can be seen, during insertion of the card 160 into the slot 180, the card is moving in a direction (represented by arrow A) that is substantially perpendicular (transverse) to the length 170 of the magnetic stripe 162. It follows that the direction that the card is moved into and out of the slot is also transverse to the direction that the data tracks extend.

As opposed to card readers which can only accept cards inserted short side 164 first into a card slot, the novel card reader arrangement can accept (and read) cards inserted long side 166 first. In comparison to a conventional card reader arrangement, the novel card reader arrangement can receive (and then read) a card that was rotated 90 degrees before it was inserted into the wider card slot 180.

The problem of card skimming is known. A card skimmer typically operates by requiring longitudinal motion of the card along the axis of the encoded tracks of data in order to read the data. Because of the exemplary card reader arrangement, which allows the card 160 to be inserted into a card reader slot 180 in a direction perpendicular to the magnetic stripe's length 170, the likelihood of the card being skimmed is reduced. At best, a conventional card skimmer (which reads cards inserted short edge 164 first) installed adjacent to the exemplary slot 180 would only have access to a small portion of a card's magnetic stripe 162 (instead of the entire stripe). Furthermore, this small portion could only be read in the direction which crosses all of the tracks, i.e., the direction parallel to the short axis 172. Thus, any magnetic stripe data that could be read by an illicit card reader installed next to the slot 180 of the exemplary embodiment would be essentially useless. Because of the exemplary card reader arrangement, which includes a change in the inserted orientation of a card's magnetic stripe 162, a more secure form of card reading is provided.

The card slot 180 (as shown in the relative orientation of FIG. 15) can be formed from a top wall 186, bottom wall 188, a back wall 190, and side walls 192. The back wall 190 (FIG. 16) can act as a card stop which prevents any further card insertion movement after the card has been fully inserted in the slot. The card stop 190 sets a maximum insertion limit for the slot 180. In the exemplary card reading operation, the card's magnetic stripe edge 166 is the first edge of the card 160 that is inserted into the slot 180. When this magnetic stripe edge 166 is located adjacent to the card stop 190 then the card is in a proper position that allows its magnetic stripe 162 to be read.

It should be understood that the exemplary card reader arrangement can be used with many different types of devices or machines that require a magnetic stripe card reader. In an exemplary embodiment, the exemplary card reader arrangement is used with an automated transaction machine. The card reader arrangement includes a magnetic stripe reader that comprises at least one transversely movable magnetic read head. The read head is movable in a direction that is parallel to the magnetic stripe length 170 after the card 160 has been fully inserted (with the long edge first) into the exemplary (extended, wide) slot 180. The magnetic read head would sweep sideways across the entire slot 180, in a direction along the length 170 of the stripe 162. The magnetic read head can also be viewed as being transversely (perpendicularly) movable relative to the short edges 164, 165 of the inserted card 160.

During operation of an exemplary card reader arrangement, the customer can always maintain access to their card. That is, the card is not conveyed automatically (e.g., by a motor) to the inside of the card reader. Thus, as previously mentioned, the exemplary card reader can act as a DIP type of reader. However, unlike conventional DIP readers, the exemplary card reader also has the ability to both erase data from and write data to the card's magnetic stripe. The exemplary card reader can also include an encrypted magnetic read head.

In a further exemplary embodiment, the magnetic read head in the card reader arrangement is reversibly mountable. The magnetic read head can be mounted either to read in an upward or downward reading direction. For example, if a magnetic stripe is to be inserted face down into the slot of FIG. 15, then the read head mounting would be arranged to cause the read head to move below the magnetic stripe. Alternatively, if the magnetic stripe is to be inserted face up into the slot, then the read head would be mounted in a manner that causes the read head to move above the magnetic stripe.

It should be understood that the slot 180 can also be oriented (or rotated) 90 degrees from the (relatively horizontal) slot orientation shown in FIG. 15. That is, the slot can be vertically oriented. With such a vertical slot orientation, the read head would likewise be mounted to allow it to move upwards/downwards along (and parallel to) the magnetic stripe while having a relatively sideways reading direction. As can be seen, the exemplary magnetic stripe reading arrangement allows use with a slot 180 that has been rotated anywhere from 0-360 degrees relative to the (substantially horizontal) slot orientation of FIG. 15.

FIG. 16 shows a sectional top view of an exemplary card reader arrangement 196. The card 160 (represented by broken lines) is shown fully inserted in the slot 180 in a slot position which is adjacent to the card stop 190. The slot has a U-shape or horseshoe shape configuration that allows for a user's thumb and finger(s) to still grasp the card while it is fully inserted. The U-shape configuration is also represented in FIG. 15. For ease of understanding, the FIG. 16 elements have been positioned in substantial alignment with the corresponding elements of FIG. 15. For example, the card 160 in both Figures is substantially aligned.

In FIG. 16 a magnetic read head 200 is movably mounted in a manner that allows it to read data from the magnetic stripe 162 of the card 160. The read head 200 is mounted in operatively supported connection with a mount 202, such as a movable support carriage (or assembly). The mount 202 is movable both ways in a direction that is parallel to the length 170 of the inserted card's magnetic stripe 162. The position of the read head 200 along the magnetic stripe 162 is changeable through operation of a read head positioning device 204 that is in operative connection with the mount 202. The drive device 204 can include any number of movement devices, such as a motor, solenoid, cylinder, shape memory alloy element, piston, pulley, and/or another suitable element that is operable to selectively move the read head 200 parallel relative to the magnetic stripe edge 166.

In FIG. 16 the read head 200 is shown at an initial starting position 206. During reading, the read head support carriage 202 is moved (pushed, pulled, slid, etc.) along carriage guides 208, 210, which can comprise a pair of rods, tracks, apertures, etc. The shown outline 212 of the read head carriage represents the read head's position 214 after a completed reading of the magnetic stripe 162. The read head 200 can be returned to its initial starting position 206 before the next reading begins. Alternatively, in some embodiments the read head 200 can read both ways along a magnetic stripe. That is, in an alternative embodiment the read head can start from the (outline) position 214 when beginning the next stripe reading.

Figure 17:
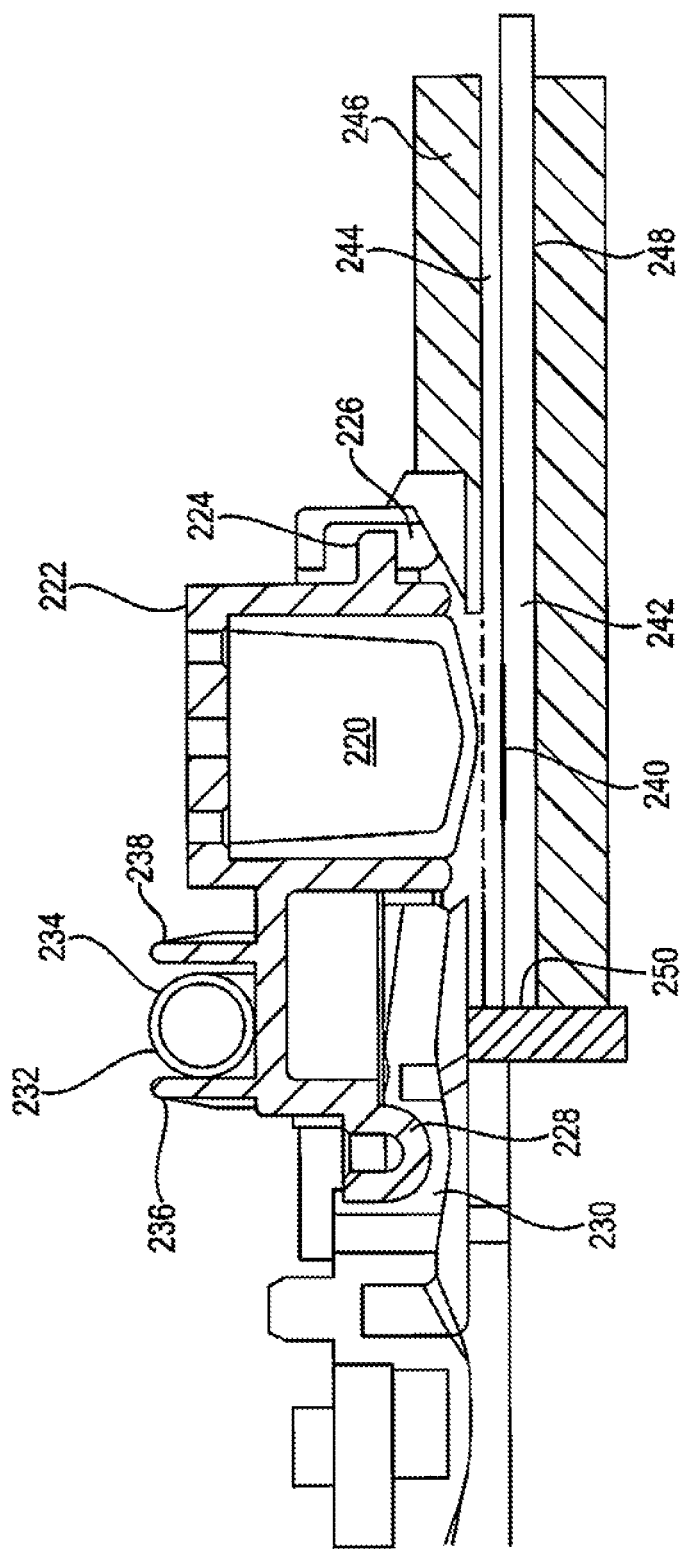
FIG. 17 shows an alternative mounting arrangement for a movable magnetic read head in an exemplary card reader arrangement.

FIG. 17 shows another exemplary movable mounting arrangement for a magnetic read head assembly. The read head 220 is positioned in a retainer 222. The retainer 222 includes a first projection 224 that extends in and is movable in a first aperture 226. The retainer 222 also includes a second projection 228 which is movable in a second aperture 230. A retainer-holding tension spring 232 extends through a saddle area 234 of the retainer housing 222. The saddle area 234 includes two projections 236,238 which accept the spring 232 there between.

The read head 220 can read data from the magnetic stripe 240 of a card 242 that has been inserted into the exemplary wide slot 244. The slot 244 has (relatively) a top wall 246 and a bottom wall 248. The card 242 is shown abutting a card stop 250. The read head 220 can move in a direction in and out of the Figure, which direction is parallel to the card's long edge.

The exemplary biased (spring) mounting arrangement of FIG. 17 allows the read head 220 to float so that it can maintain nearness with a magnetic stripe positioned adjacent thereto while also reducing risk of snagging a card portion as the read head moves along the magnetic stripe. The movable character of the mounting allows for both angular and vertical movement of the read head 220. Furthermore, the biased spring mounting can be readily disengaged, which enables readily replacement of the magnetic read head 220. It should be understood that these described approaches (FIGS. 16 and 17) for mounting a movable magnetic read head to enable data to be read from a magnetic stripe of a card positioned in a wide slot are exemplary, and in other embodiments other read head mounting approaches or arrangements can be used.

One or more card detection sensors can be positioned adjacent to a card slot. For example, as shown in FIG. 16 a position sensor 194 is located adjacent to the back wall stop 190 to detect when the card 160 is in proximity to the stop. Thus, a card that abuts or touches the stop 190 would trigger its detection by the sensor(s) 194. The sensors are operable to sense that the card 160 has been fully inserted into the slot 180, and is thus properly situated in a card reading position that allows the magnetic read head 200 to read its magnetic stripe data 162.

The sensors 194 are in operative connection with at least one computer. The computer may (or may not be) located in the machine (e.g., an automated transaction machine). The computer can receive signals from the sensors 194 which indicate that the card 160 has been fully inserted into the card slot 180, and is thus ready to be read. The signals can be wirelessly transmitted by the sensors. In response to receiving the signals, the computer can cause the positioning device 204 to move the read head 200 along the entire length of the magnetic stripe 162 of the stationary card 160 to read the tracks' magnetically encoded data.

Figure 18:
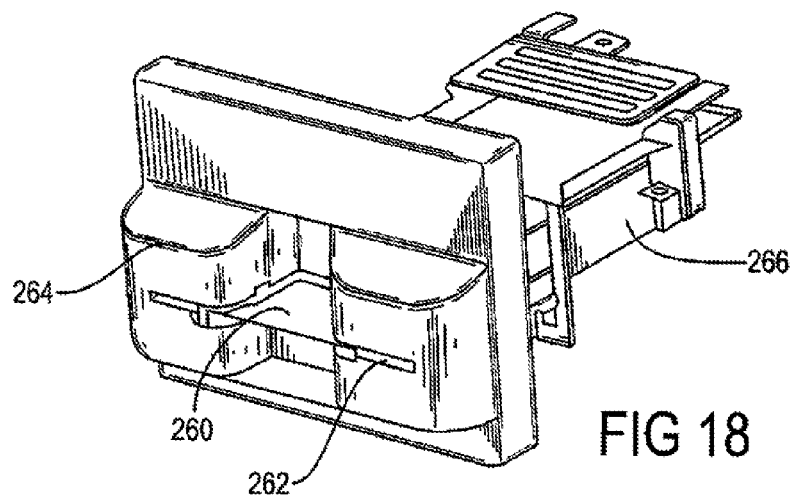
FIG. 18 shows an angled view of a card in a card slot of an exemplary user fascia portion.
Figure 19:
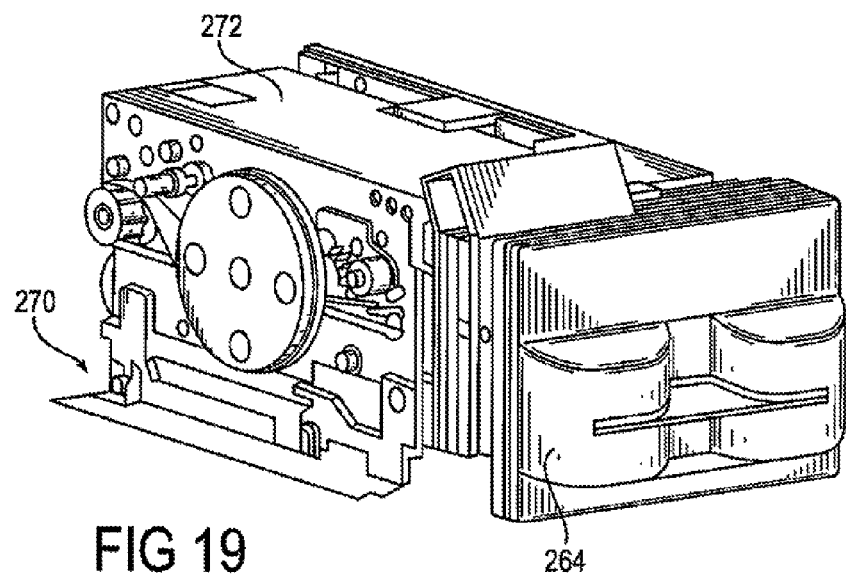
FIG. 19 shows a card reader housing located adjacent to the fascia portion of FIG. 18.

FIG. 18 shows a card 260 in a card slot 262 of another exemplary user fascia portion (or bezel) 264. A portion of a read head assembly 266 is also shown. FIG. 19 shows another exemplary card reader arrangement 270. The arrangement includes the bezel 264 in conjunction with a card reader housing 272. The housing 272 can include a positioning device that causes the read head to be driven along the length of the magnetic stripe of the card 260.

An exemplary card reading operation involving an automated transaction machine will now be described with regard to FIG. 15 and FIG. 16. A machine controlling computer prompts (e.g., through a machine display) the machine user to insert their card. The card holder inserts their card 160 into the card slot 180. The side of the card that enters the slot first is the card's long edge 166 which is closest to the magnetic stripe 170. In this reading operation the magnetic stripe 170 faces downward. However, in other similar reading operations the magnetic stripe can instead face upward. The U-shaped fascia portion 182 includes a centrally positioned indented finger area (also see FIG. 18) which allows the user to grasp a fully inserted card after it has been read. The sensor(s) 194 detect when the card 160 has been fully inserted in the slot 180. A card reader controlling computer (which controls the card reader 196) acts in response to receiving signals from the sensor 194 to cause the card to be held substantially stationary in the slot. The card reader controlling computer also acts to operate the drive device 204 to cause the read head carriage 202 to be driven along the guides 208, 210. This carriage movement causes the magnetic read head 200 to be moved under, parallel to, and along the entire length of the downward-facing magnetic stripe 170 while reading data from one or more tracks in the stripe 162. Thus, during card reading the carriage 202 is moved from its initial position 206 to its end position 214. The carriage is then returned to its initial position 206. Following a determination by a computer that the card was successfully read, the card reader controlling computer causes the card to be released. The machine controlling computer then prompts the user to remove their card from the slot.

In another exemplary arrangement, the slot 180 can also be relatively oversized for receiving cards. That is, the slot width (which extends between the side walls 192) can be modified to be intentionally sized to be much wider than the long edge 166 of a card 160. Because of the give (or play) that would exist between the card's short edges 164, 165 and the slot's wider side walls 192, an inserted card could be in several different sideways positions relative to (and between) the slot's side walls 192. For example, an inserted card may have a short edge 164 abutting a first slot side wall which causes a relatively large gap to occur between the card's other short edge 165 and the other (second) slot side wall.

In an exemplary embodiment, the magnetic read head is operably mounted to sweep along the entire width of the oversized slot width. Thus, the inserted card's magnetic stripe can be read no matter where it might be located relative to the wide slot's side walls 192. This card reader arrangement, with its excessively wider slot feature, makes it even more difficult for criminals to intercept mag stripe data with an unauthorized reader device, because they don't know exactly where the card will be positioned (between the slot's side walls) in the slot. It should be understood that the slot width could be very long, including widths greater than twice the length of a card's long edge. The extra wide card slot may cause an adjacently positioned unauthorized card reading device to miss reading any part of a magnetic stripe because the stripe may be located outside of the range (width) of the unauthorized reader device.

Also, because of the moving speed of the read head and the large reading area covered by the read head, slight card movement (such by the card user) of an inserted card due to the excess length of the exemplary wider slot usually would not hinder card data reading during the reading operation. Nevertheless, in order to prevent sideways movement (and also card removal direction movement) of an inserted card during stripe reading, the card can be held by an (additional) card holding device that operates to hold a card stationary during its reading. For example, an additional card holding device can include one or more movable arms that extend downward through the slot's top wall 186 (or upward through the slot's bottom wall) to press the card against the slot's bottom (or top) wall 188. Upon receiving signals from the card position sensors, the computer can cause operation of the card holding device to engagingly abut (and secure) a fully inserted card to prevent any unwanted movement. After the card reading is completed, the computer would then instruct the card holding device to release the card, which enables the user (or a card ejection device) to move the card in a direction out of the slot.

In other exemplary embodiments of the card reader arrangement, the magnetic stripe reader device can operate ambidextrously with regard to which way a magnetic stripe is facing in the slot. For example, the magnetic stripe reader device can include plural (e.g., top and bottom) movable magnetic read heads. The reader device can include a first vertically positioned (upward reading) movable read head that is operable to read a magnetic stripe that faces downward in the wide slot. The reader device can also include a separate second vertically positioned (downward reading) movable read head that is operable to read a magnetic stripe that faces upward in the slot. One or more magnetic sensors located adjacent the rear of the slot can detect when a magnetic stripe is in proximity to a respective magnetic sensor, which is in operative connection with the at least one computer. The computer receives signals from the magnetic sensor(s) which it uses to determine whether the magnetic stripe has been inserted downward or upward in the slot. Based on the determination, the computer then causes the appropriate read head (i.e., either the first or second read head) to be moved laterally across the slot to read the magnetic stripe data.

In still other embodiments, both the top (first) and bottom (second) read heads can be simultaneously operated. For example, the first second read heads can share a common movable mount. Each read head attempts to read a magnetic stripe as the mount sweeps parallel to the stripe. From the two separate but simultaneous readings, the computer then determines (and uses) the magnetic track reading which best corresponds to valid card data.

An exemplary card reader arrangement can also read a computer chip on a smart card. In one exemplary embodiment, the card slot width substantially corresponds to the same length of the card's long edge. Because of the similar length of the card's long edge and the slot's width, the chip location of a fully inserted card can be predetermined. This arrangement allows the chip to be engaged by card reader contacts which are fixedly positioned relative to the card slot at a precise reading location.

Figure 20:
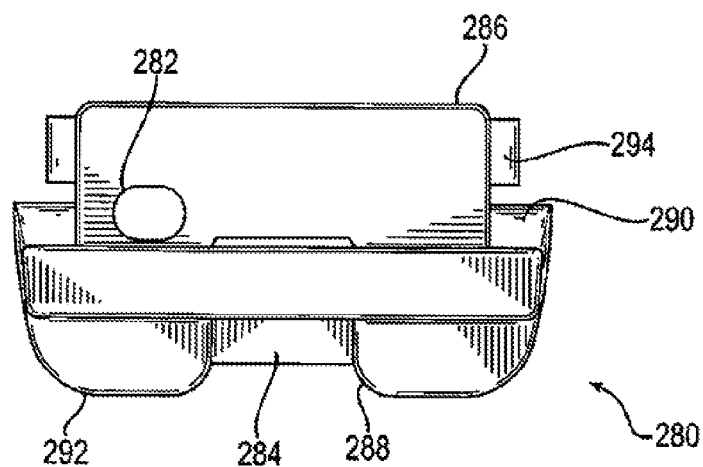
FIG. 20 shows a smart card inserted into a card slot of another an exemplary card reader arrangement.

FIG. 20 shows an alternative exemplary embodiment of a card reader arrangement which allows the previously discussed extra wide card slot feature to also be used for reading data from the chip of a smart card. The card reader arrangement 280 permits the reading of an integrated chip 282 on the smart card 284 inserted in the extra wide slot 288. Again, the slot 288 has a much greater width than the length of the card's long edge 286. Thus, the location of the chip in the slot may be initially unknown to the reader.

A linear array of photo sensors 290 are positioned adjacent to the wide slot 288. These sensors are able to sense the card 284 (or its chip) position in the slot 288. A computer receives the information sensed by the sensors 290. Based on this information, the computer determines where the card's chip 282 is positioned in the slot's grid.

In a manner previously discussed, a movable carriage assembly 294 is used to support the card reader's contacts. The carriage is movable in at least two perpendicular directions. Movement of the carriage is controlled by a computer. The computer causes the carriage 294 to be moved to the determined chip position in the slot grid to cause the reader contacts to engage the smart card contacts 282. Therefore, the previously discussed wide slot feature (of an exemplary card reader arrangement) can be separately used with both a card reader that only reads magnetic stripe cards and another card reader that only reads smart chip cards. FIG. 20 also shows a substantially U-shaped user interface bezel portion 292.

Furthermore, another exemplary card reader arrangement allows use of the same long edge wide slot for a single card reader device that can read both a magnetic stripe and/or a smart chip. For example, a combination card reader assembly can structurally include both the magnetic stripe reading ability of FIG. 16 and the smart chip reading ability of FIG. 20. Thus, the combination card reader assembly can read data from whichever type of card (stripe or chip) was inserted into the assembly's common (single) slot. The combination card reader assembly may also read data from both a magnetic stripe and a smart chip of a same card. The same long edge wide slot may also be an extra wide slot, as previously discussed.

In a further exemplary embodiment, the card reader arrangement does not use a magnetic read head. Rather, the card reader arrangement uses liquid crystal display (LCD) technology to read the data from a magnetic stripe of a card that was inserted long edge first into a card slot. The crystals include materials that are magnetic within the liquid material. A thin magnetic liquid crystal pane of clear material (e.g., glass) becomes placed adjacent to the magnetic stripe of an inserted card. The liquid crystals produce images because of magnetic force variations in the stripe adjacent the pane. The images are produced as an optical output which corresponds to the magnetic flux reversals on the tracks of the magnetic stripe. An imaging sensor is then used to read the optical output. The image reader reads optical data that represents the magnetic data on the card.

In the exemplary embodiment the imaging sensor may include one or more sensors that operate to produce data that corresponds to sensed images. In an exemplary arrangement, the imaging sensor is in operative connection with at least one processor. The at least one processor executes software instructions that are operative to analyze the image data and resolve the alphabetical and/or numerical characters represented by the patterns produced in the liquid crystal material in response to the magnetic fields and the variations thereof in the tracks encoded on the magnetic stripe. The processor may operate in accordance with its programming to resolve the data represented by each track such as the card holder's name, the account number data and other information. Such data may then be used through operation of one or more processors in the machine in carrying out transactions.

In some example embodiments, the track data may be read by placing the card flush against a surface which includes the liquid crystal material which enables reading of the magnetic data. Such a surface may be included on an external surface of the automated banking machine or might be internal to the machine. Such an approach may have an advantage in that the magnetic data is able to be read without card movement into a slot or other orienting structure that might make interception of data easier. In some example embodiments, the surface and sensing arrangement may allow the card to be read in any orientation in which the stripe is in adjacent relation with the sensing surface. The image sensors may operate to resolve the data regardless of where the lines of data are produced in the liquid crystal material. This may further make interception of such card data difficult.

In still other example arrangements, a surface which includes material for sensing magnetic data in the stripe could be opposed by areas of the machine which include one or more other imaging sensors such as a camera. Such a camera or other imaging sensors may capture images of the side of the card that is opposite the side that includes the magnetic stripe. Such a camera or sensors may be in operative connection with one or more processors which operate to analyze the image data. Such one or more processors may operate, for example, to locate the boundaries of the card. By locating the boundaries of the card, it may enable the processor analyzing image data from the opposite side of the card which includes the stripe, to more readily find the stripe data within the images produced by the liquid crystal material so that the data may be resolved more quickly. Alternatively or in addition, in other embodiments the camera or other sensors may analyze data included on the opposite side of the card which may include printed or embossed data. This may include, for example, printed or embossed data which corresponds to the card holder's name, account number or other data. Computer executable instructions such as character recognition software may resolve data from the face of the card that does not include the magnetic stripe. Such data may, in some embodiments, be compared to the data resolved from the stripe for purposes of assuring that the data has been read from the stripe and/or the face of the card correctly. Further, in still other embodiments, correspondence between data read from the side of the card opposite the stripe may be required to correspond to stripe data before a transaction will be processed. This might be done, for example, to avoid a situation where a blank card has been encoded with stolen data from a genuine user's card. Terminals may, for example, create counterfeit cards by encoding the customer data from a genuine card onto a blank card and attempting to use that to conduct a transaction at an automated banking machine. By determining that such a card with a blank face opposite the magnetic stripe surface is being used, the machine may operate in accordance with its programming to deny the transaction.

In still other example embodiments, other data that is encoded, written, printed or otherwise on the face of a card opposite the magnetic stripe may be used for purposes of further helping to verify that a card is genuine. This might include, for example, data about the nature of the financial institution card issuing entity, or other entity which is represented on the card. For example, cards may indicate the name of the particular bank and/or the name of the particular card issuing organization that has provided the card. This data may be resolved from images captured of the side of the card opposite the magnetic stripe. The magnetic stripe itself includes data representative of the financial institution and/or the card issuing organization. By making sure that the visible data corresponding to such an institution or organization is present on the card, and corresponds to the data read from the stripe, the risk that a counterfeit card produced by a criminal is being used to attempt to conduct a transaction, is reduced. Of course these approaches are exemplary, and in other embodiments other approaches may be used.

Figure 21:
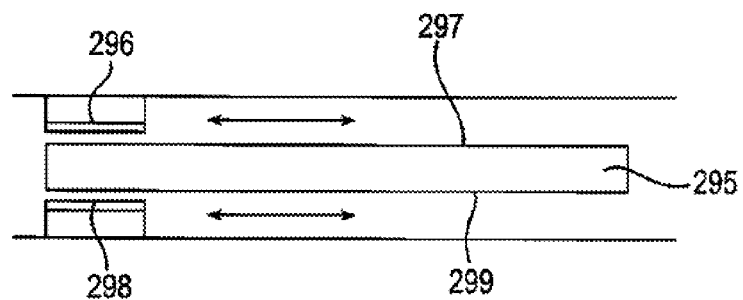
FIG. 21 shows a card reader arrangement having dual read heads.

FIG. 21 shows an example of a card reader arrangement that has dual read heads. One read head 296 is operable to read data from a first side 297 of a card 295. The other read head 298 is operable to read data from the other side 299 of the card 295. The respective read heads 296, 298 are movable back and forth in the directions of the respective arrows. The dual read heads allow for reading of either side of a card. The dual read heads also allow for simultaneous reading of data from both sides of a same card. Each respective read head 296, 298 can be motorized to move along one or more tracks that support the respective read head.

Figure 22:
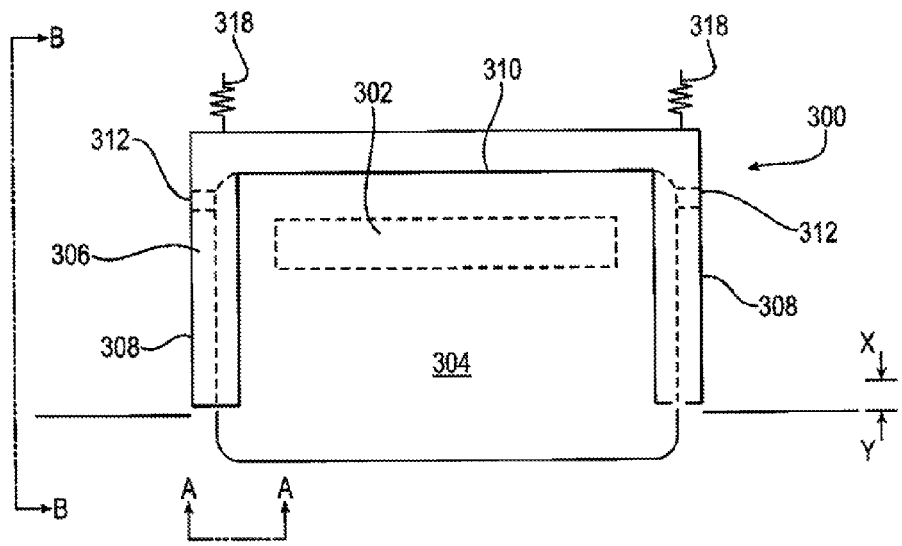
FIG. 22 shows an exemplary embodiment of a card reader arrangement for an automated transaction machine.

FIG. 22 shows another exemplary embodiment of a card reader arrangement for an automated transaction machine. The card reader arrangement 300 uses one or more movable read heads to read card data from a magnetic stripe 302 of a card 304 that was inserted long edge first into the card reader 300. The arrangement includes a card carrier 306. The arrangement can also include at least one processor or computer (which may be singularly referred to herein as a processor).

Figure 23:
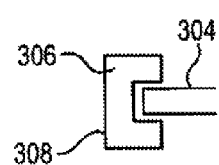
FIG. 23 shows a front view of a portion taken along A-A of the card reader arrangement in FIG. 22.
Figure 24:
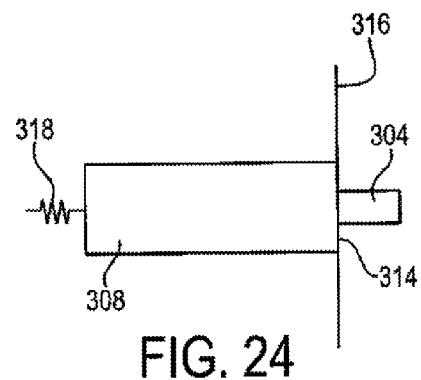
FIG. 24 shows a side view taken along B-B of the card reader arrangement in FIG. 22.

FIG. 23 shows a front view of a portion of the card reader arrangement 300 and the card 304 taken along A-A in FIG. 22. FIG. 24 shows a side view of the card reader arrangement 300 and the card 304 taken along B-B in FIG. 22.

The carrier 306 has sides 308 into which a customer's card is inserted. The carrier 306 also has a stop wall 310. In the exemplary embodiment, each carrier side 308 is substantially U-shaped to form a groove in which the card 304 can slide. One or more switches 312 are associated with each side 308. The switches 312 are positioned to be engaged by the card 304. The switches 312 are in operative connection with the processor. The switches 312 are activated when the card 304 is substantially fully inserted long edge first in the carrier 306. The side switches 312 will not be activated (tripped) if the card 304 is incorrectly inserted short edge first.

The switches can be selectively positioned so as to be contacted by a card's top surface, bottom surface, or side edges. In an exemplary embodiment, the switches 312 are engagingly pushed inward by the card 304 to cause their activation (or be set/tripped on). In other embodiments two or more side proximity sensors can be used as switches. In still other embodiments light beams (e.g., a laser) can be used as switches to detect when a card is fully inserted in the carrier. For example, on a first side of the carrier a first beam would flow from a top transmitter to an opposite bottom receiver. On a second side of the carrier a second beam would flow from a top transmitter to an opposite bottom receiver. A card can be inserted between the corresponding transmitters and receivers to break the two beams. As a result of the two beams being broken, the card is deemed to be properly fully inserted in the carrier.

If only one switch 312 is tripped, then the processor of the card reader arrangement 300 can determine that the card was wrongly inserted short edge first. Upon such a determination the customer can be notified (via a display, etc.) of how to properly insert the card. The notification can include the blinking of lights adjacent to card slot 314 of the user fascia panel 316, which slot provides entry to the card carrier 306. Similarly, a customer can be notified (via a display, etc.) of a properly inserted card.

In an exemplary embodiment, when both switches 312 are activated then the card 304 is held in the carrier 306 to prevent movement of the card 304. For example, a mechanical latch or compress can be used to hold a card 304 when it is detected as being fully inserted in the carrier 306. The card holding mechanism can be controlled by the processor.

The card carrier 306 is movable a short distance in the card insertion direction. A further manual pushing of the card 304 inward causes the card to in turn further push the carrier 306 inward. When the carrier 306 is fully pushed inward (fully inserted), then it is properly positioned to enable the card 304 to be read by a movable read head. The length X-Y in FIG. 21 shows the distance the carrier can be further pushed inwardly relative to a front fascia panel 316. In an exemplary embodiment the read head only operates when the card carrier 306 is fully inserted.

In an exemplary embodiment both switches 312 must be activated in order to permit carrier 306 movement inwardly.

Otherwise the carrier 306 remains in a locked/held condition at its card insertion position. The carrier locking arrangement can involve mechanical, magnetic, and/or electrical systems. A mechanical latch can be used to hold the carrier in its card insertion position. The carrier holding mechanism can be controlled by the processor.

One of more sensors can be used to enable the processor to determine that the carrier 306 is fully inserted, at which point the carrier 306 can be held at its inserted (card reading) position. The holding arrangement can involve mechanical, magnetic, and/or electrical systems. For example, a mechanical latch can be used to hold the carrier at its card reading position. The carrier holding mechanism can be controlled by the processor. The carrier 306 can be automatically released (from being held) after the card 304 has been read. The carrier releasing mechanism can also be controlled by the processor.

The carrier 306 can be continually placed under a biasing force (provided by one or more biasing members) that acts to push the carrier 306 toward its card insertion (initial) position. After the carrier 306 is automatically released from being held in its card reading position, the biasing members 318 (e.g., springs) act to move the carrier 306 outwardly to its card insertion position. The springs 318 return the carrier 306 to its initial position for use by another customer. Thus, an inserted carrier 306 is auto ejected (by springs) following a card reading. In an alternative embodiment, a drive device is used to drive the carrier 306 back to its initial position. The carrier drive device is controlled by the processor.

The rear of the carrier 306 can be attached to one or more springs 318 to provide the biasing force that pushes the carrier 306 toward its card insertion (outward) position and away from its card reading (inward) position. Manual force supplied by a customer can overcome this spring loaded force to cause carrier 306 insertion.

In another exemplary embodiment, instead of being manually pushed/driven inward, the carrier 306 can be automatically driven inwardly to its card reading position by a carrier drive device in response to activation of the switches. After card reading, the carrier 306 is again returned to its customer position by the biasing return force (or instead by the carrier drive device operating in reverse).

Instead of the carrier 306 being automatically released (from being held) following a card reading, another exemplary arrangement requires the customer to manually push the carrier 306 inwardly a short distance to release the carrier 306 from being held. For example, when a mechanical latch is used to hold the carrier 306 at its card reading position, then the further inward movement of the carrier 306 causes the latch to be released from its latching position. This release allows the carrier 306 to be spring-returned toward the customer. After their card has been read, then the customer can be notified to push against their card (which in turn pushes against the carrier) to cause the card to be returned to the customer. Again, to prevent a customer from prematurely removing an inserted card by pushing against the card, the carrier can be locked in its reading position until the card has been read (or the transaction canceled by a user).

In a further exemplary embodiment, the carrier's two sides (or arms) provide some play to allow for easier card insertion. One or both sides are spring-loaded to allow the sides to be movable a small distance outward relative to each other. Thus, as the card is being manually inserted into the carrier 306, the sides can relatively expand outwardly sideways. This allows a card to be inserted at an angle that is not exactly ninety degrees (or at a ninety degree angle that is shifted right or left). The carrier's sides then return to their initial (pre-card) position to cause the inserted card to be rotated (straightened) to the ninety degree angle, at which angle it is securely held by the carrier sides in the carrier 306.

In an exemplary embodiment, a magnetic read head of the card reader arrangement 300 has physical security, electrical security, and/or visual security.

Figure 25:
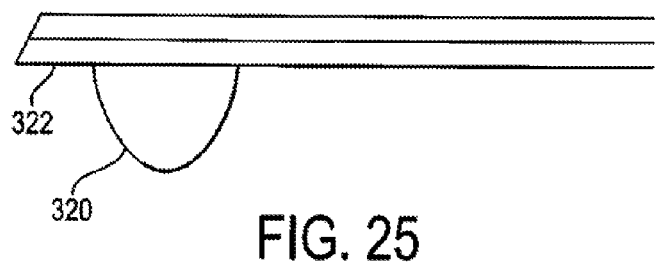
FIG. 25 shows an arrangement comprising a hermetically sealed read head.

FIG. 25 shows a read head 320 being hermetically sealed, such as to a member 322 comprising a circuit card or a flexible circuit. This sealing deters/prevents improper devices from being connected to the read head. For example, the sealing deters wiretaps. Thus, the read head 320 has physical security.

Figure 26:
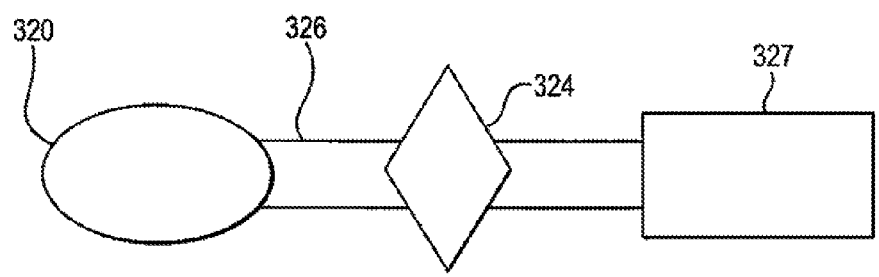
FIG. 26 shows a read head associated with an impedance change detector.

FIG. 26 shows the read head 320 is associated with an impedance change detector 324. The detector 324 can comprise an amplified filter impedance circuit. The detector 324 includes sensing circuitry that is connected to wires 326 that come from the read head 320. A change in the impedance on these wires 326 may indicate the presence of a wiretap. The detector 324 can be connected to a local processor 327. The impedance change detector 324 is usable to detect when electrical connectors (e.g., added by criminals) have tapped into the electrical connections to the read head 320. Thus, the read head 320 has electrical security. The impedance change detector 324 can also have its own processor.

In the exemplary embodiment the read head 320 also has visual security. In the exemplary embodiment, a transparent cover is located above the card carrier. This see-through cover allows the customer to see their inserted card while it is being read by the read head. Customers can be trained to notice fraudulent devices associated with the reading of user data.

Figure 27:
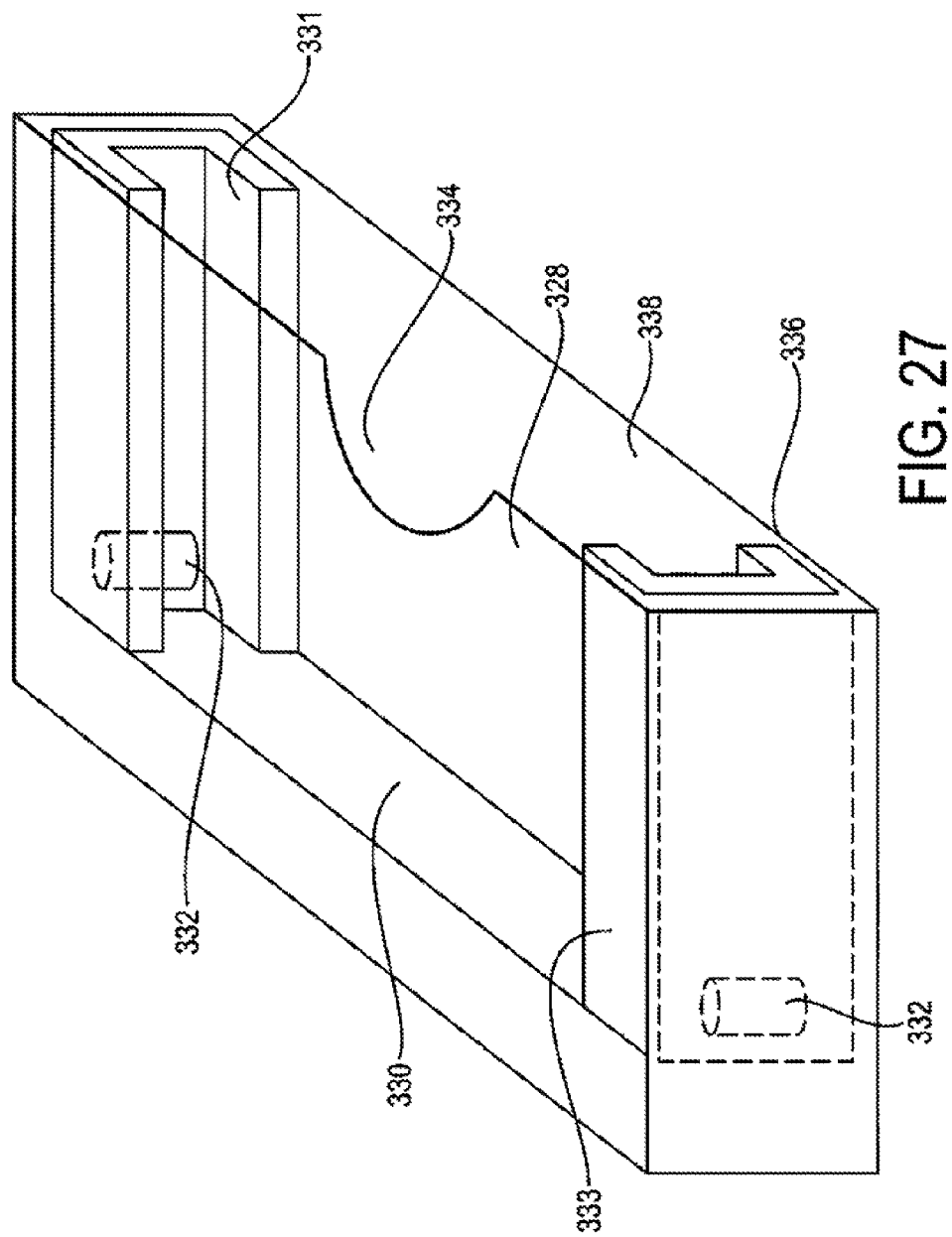
FIG. 27 shows a transparent cover positioned above a card carrier.

FIG. 27 shows a transparent cover 328 that allows portions of a card carrier 330, carrier sides 331, 333, and switches 332 to be seen through the cover. The switches can be a type that gets slidingly pushed inward into a side wall 331, 333 by a card being inserted in the carrier. Likewise, a customer card when inserted into the carrier 330 can also be seen through the transparent cover 328. The transparent cover includes a thumb hole 334 to allow a customer to easier grasp their card. The transparent cover can be part of a user fascia section 336 that includes a card slot 338.

Figure 28:
FIG. 28 shows another exemplary card reader arrangement comprising a substantially flat area on which a user card is to be placed so its card data can be read.

FIG. 28 shows another exemplary card reader arrangement 340. A substantially flat section 342 of a user interface (or user fascia) of an automated transaction machine includes a visible outline 344 depicting a card. Instructions are provided for a customer to place their card onto the outline. These customer instructions can be placed (e.g., written) on the user interface (or some other part of the machine), output through a user display device, etc. For example, instruction may state "Place Card Here."

Figure 29:
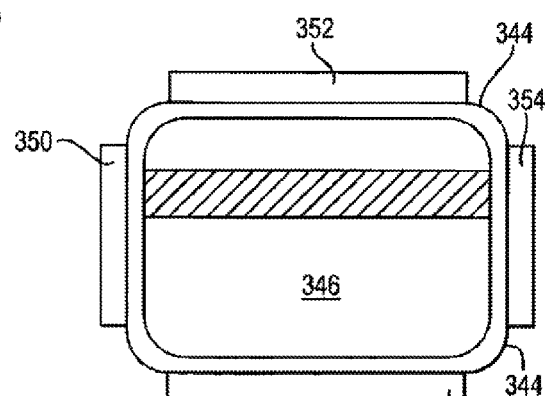
FIG. 29 shows an unsecured card freely resting on the card supporting flat area.

FIG. 29 shows a card 346 properly positioned relative to the outline 344 (and instructions). The card 346 can be placed into the shown position by the customer prior to reading of the card data. The card can also be released to this position by the card reader arrangement 340 after a reading of the card data, as explained in more detail later.

Outside of the outline area 344 are card retainers 350, 352, 354, 356. These card holding members (retainers) project (extend) upwards from the flat interface section 342 a distance greater than the thickness of the card 346. Each card retaining arm 350, 352, 354, 356 is movable in at least two directions, including directions toward and away from the outline 344. They can slidingly move through respective slots (openings) in the user interface.

Figure 30:
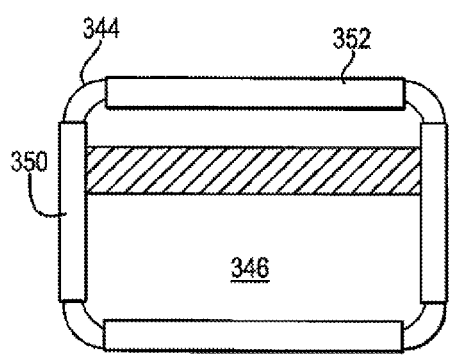
FIG. 30 shows a card securely held by holding members in a card reading position.

FIG. 29 shows each card retainer located in its non-holding (open) position. FIG. 30 shows each card retainer located in its card holding (closed) position. The card holding members can act together to overlap and press against each side of the card 346 to cause the card to be firmly held (retained) in a fixed position. While in this held position, the card 346 is prevented from movement that would jeopardize the card data reading operation. While the card is being held, it can be properly read by one or more movable read heads.

Figure 32:
FIG. 32 shows a card holding member having a substantially V-shaped entry slot.
Figure 31:
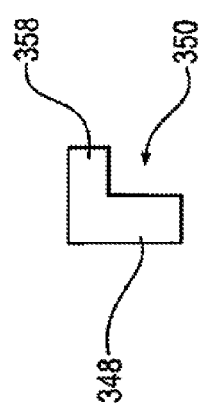
FIG. 31 shows the card holding member having a substantially L-shape.

FIG. 31 and FIG. 32 show a side views of examples of usable shapes of card retaining members. A set of four card retainers used can each have a similar shape. FIG. 31 shows the card holding member 350 having an L-shape. FIG. 32 shows a different card holding member 351 having a V-shape entry 353. For each arm a card can enter its V and then slide there against. The four V shapes assist in providing horizontal (flat) alignment of a received card. It should be understood that other shapes (e.g., U-shape) may also be used. It should also be understood that a side retaining member may be comprised of a plurality of separated arms instead of a continuous single arm.

While a first leg 348 of the L-shape is moved inward toward a position that engages the card 346, the second leg 358 is moved to a position that is above (overlies) the top surface of the card. Inward movement of the first leg 348 of each retaining arm causes a skewed card to be substantially de-skewed (aligned) relative to the outline 344. The overlying legs 358 prevent the card from being taken (e.g., lifted up) by the customer. The retaining arms 350, 352, 354, 356 are returned to their open (released card) position (FIG. 29) after the card has been read. The space between adjacent arms is configured to allow a customer's finger to engage and lift a corner of a released card. Movement of the retaining arms is controlled by a processor associated with the card reader arrangement 340.

The retaining arms 350, 352, 354, 356 can be moved between a same hold (closed) position and a same release (open) position for every card received. Alternatively, sensors can be used to adjust the arm movement toward a secure hold for different sized cards. A first set of sensors can measure force between the arms 350 and 354. When a predetermined force level is reached, then the card is deemed securely held at the long edges of the card. Likewise, a second set of sensors can measure force between the arms 352 and 356. When a predetermined force level is reached, then the card is deemed securely held at the short edges of the card. Contact sensors, which respectively sense contact of the four legs with the four sides of the card, can be used in lieu of force sensors.

In a further exemplary embodiment each card retainer arm 350, 352, 354, 356 is also movable in upward and downward directions. After the legs 348, 358 have been moved as previously described, then the respective arm is moved downward to cause the legs 358 to engagingly clamp against the card. The legs 358 can be moved to a same clamping (closed) position for every card. Alternatively, for use with cards of different thickness, sensors can be used to detect when a predetermined clamping force has been reached, where the clamping force is sufficient to secure the card. Contact sensors can also be used.

Figure 33:
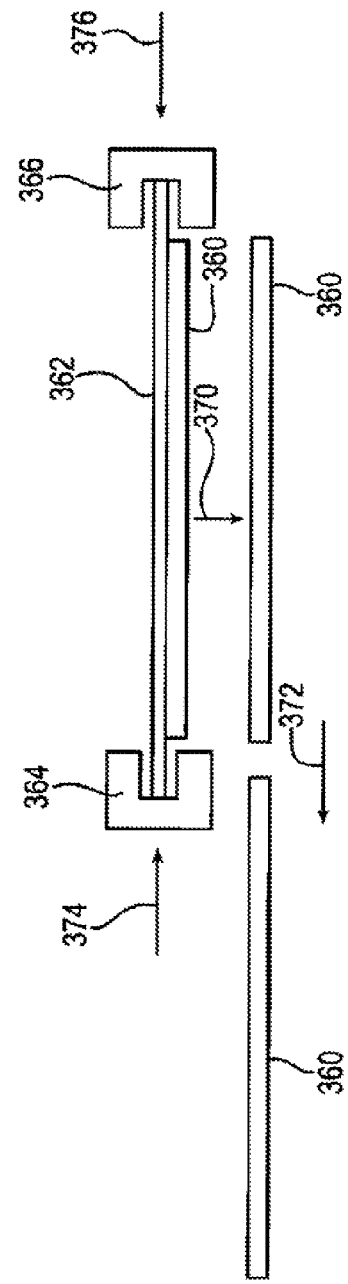
FIG. 33 depicts side view movement of a card support door while the card is held by card holding members.

In an exemplary embodiment a card is placed in the outlined area 344 with the card data (e.g., magnetic stripe) facing downward. A door is located below the outline 344. After the card is held fixed by the retainer arms 350, 352, 354, 356, the door is lowered and then slid sideways to an open position. FIG. 33 shows a side view of such movement of a door 360 while a card 362 remains held by opposite retainer arms 364, 366 (which have been moved to their card holding position). The direction of the door movement is indicated by the shown arrows 370, 372. The direction of the arms movement is indicated by arrows 374, 376.

A door can comprise a sliding door (e.g., door 360) or a swinging door. A sliding door gets moved in a horizontal direction (sliding movement). A swinging door gets moved in a pivoting direction. A swinging door can comprise a single door that pivots about a hinge arrangement. A swinging door can also comprise a double door, with both doors pivoting about a respective hinge arrangement. Both doors would hang downward when open.

A read head is movably located below a held card. The read head is supported by a member that is both horizontally and vertically movable. The read head is vertically moved (upward) to contact the card. The read head is then horizontally moved parallel (sideways) along the card data (e.g., magnetic stripe) to read the data.

In a further exemplary embodiment, a card reader arrangement uses liquid crystal display technology to read data from a magnetic stripe of a card, as previously discussed. The crystals include materials that are magnetic within the liquid material. A magnetic liquid crystal pane of clear material (e.g., glass) is located adjacent to the magnetic stripe of a held card. The pane can be part of an outline area where a card is placed by a customer. Alternatively, the pane may be moved flush with a card after the card is held by retaining arms. The liquid crystals produce images because of magnetic force variations in the magnetic stripe. An image reader (e.g., a camera) is then used to read the optical output (images), which represents the magnetic data on the card. The read data can then be used through operation of one or more processors associated with the machine in carrying out transactions.

In another exemplary arrangement, a customer places their card on a substantially flat outline area, as previously discussed. The outline can comprise a transparent panel (e.g., clear glass). The card is first placed with its visible data (front side of card) facing downward. A camera situated below the transparent area operates to read the card's front side data (e.g., account number data). The customer is then instructed to turn the card over so that its back side faces downward. The camera then operates to read the back side data (e.g., signature, name, code, etc.). Software analyzes the front side and back side images to resolve card data usable in a transaction. This arrangement can avoid need for a card reader. In the arrangement the card may also be held in a secure position by retaining arms, in a manner as previously discussed.

Unauthorized card readers are commonly associated with card slots. The exemplary embodiments may have an advantage with respect to anti-fraud in that the card data is able to be read without use of a card slot or other orienting structure that might make interception of card data easier. Thus, the novel card reading arrangements described herein assist in deterring use of unauthorized card readers because the flat interface configurations employed, remove any need to insert a card into a card slot.

Unfortunately, dirt and dust may collect on the read head during card reading (and during rest). A cleaner is structurally and functionally configured to clean a (magnetic) read head of a card reader. The cleaner is able to keep the read head (or sensor) free from dirt/dust, moisture, ink, etc. The cleaner structure can be in the form of a wiper arrangement (which may also be referred to herein as a wiper). A wiper can be mounted to a supporting structure which allows it to be quickly and readily replaced. For example, a wiper can have an upper support base, which is mounted to a support in a card reader. The mounting can comprise any of a plurality of well known fastening arrangements. For example, the upper support base can comprise hooks configured to engage in corresponding slots in a support in the reader. Alternatively, the upper support base can comprise slots configured to receive support hooks. Other types of fasteners or connecting arrangements can be used, including pins, screws, bolts/nuts, magnetic, etc.

Each wiper can include a plurality of wiper components (wiper arms). The wiper arms can be individually attached to the upper support base, enabling each wiper component to be individually replaced. A wiper arm can comprise one or more materials, including materials that are at least one of smooth (e.g., a substantially even consistency), absorbent (e.g., able to soak up liquid), soft (e.g., not course or rough in texture), etc. For example, a wiper arm material can include a fabric that is able to remove (e.g., pickup) unwanted material (e.g., dust) that may be on (attached to) the outer surface of a read head. A wiper may also be used as a chamois.

Also, different wiper arms of a wiper can be made of different materials. For example, some arms may be made to collect dust, whereas other arms of the same wiper are made to collect fluids. Wiper arms (duster arms) directed to dusting can have a material that draws dust to the arm. For example, a duster arm can have fibers that cause a small electrostatic charge to be produced when these fibers are moved relative across the read head. This charge may enhance dust collection. The fibers may comprise nylon, polypropylene, etc.

In one exemplary embodiment the read head gets cleaned by moving through one or more mounted wipers. For example, the wiper can be mounted on both sides of the card reader. That is, at least one wiper is positioned at each end of read head travel. As a result, during a card reading operation the read head starts off wiping across (engaging) a cleaning wiper located adjacent one side (of the card), then ends up wiping across another cleaning wiper that is located adjacent the other side (of the card). This wiper positioning enables the read head to get cleaned at both the beginning of each read and at the end of each read. Thus, each reading operation can include both a pre-read cleaning (of the read head) followed by a post-read cleaning (of the same read head).

This wiper arrangement allows use of a magnetic read head that can move along a magnetic stripe in either direction to read data from a card. That is, in order to read the card's magnetic stripe, the read head only has to make one pass across the card. For example, the read head travels from a first side to a second side, and then stays at the second side. To read the next card the read head travels from the second side back to the first side, and then stays at the first side. As can be appreciated, the ability of the read head to read card data while moving in either direction results in less wear on the read head and its transport mechanism.

The dual cleaning action caused by the side-positioned wipers maintains the ability of the read head to read cards effectively and efficiently. The wiper cleaning arrangement and its strategic positioning also improve reading reliability of the read head, resulting in greater card reader uptime.

Figure 34:
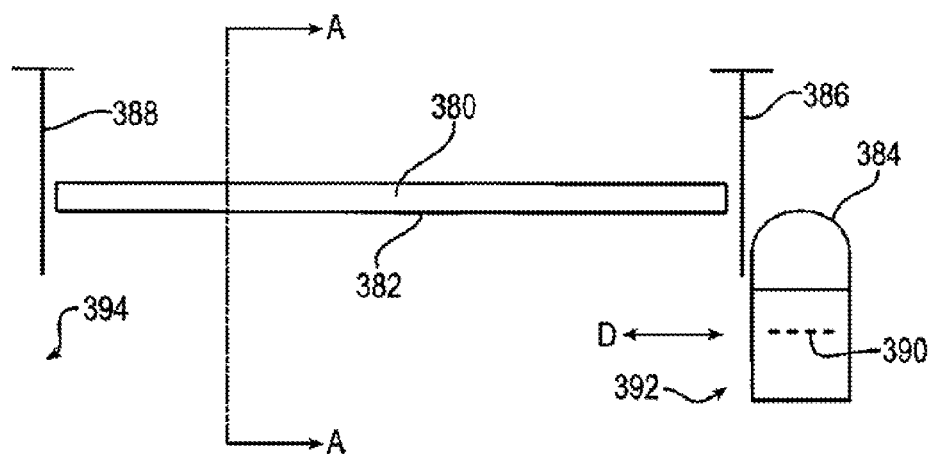
FIG. 34 shows an arrangement for cleaning a read head.

FIG. 34 shows a front view of a read head cleaning arrangement. A card 380 having a magnetic stripe 382 is in a position to be read by a read head (or a read head assembly) 384. Wiper arrangements 386, 388 are respectively located adjacent opposite sides of the card 380. The read head 384 is movable in both directions along an axis 390, as represented by double ended arrow D. In operation, the read head 384 will move from its initial position 392 adjacent to a first side of the card 380 toward the wiper 386, then pass through the wiper 386, then read data from the magnetic stripe 382, then pass through the other wiper 388, and then move to a stop (end) position 394 adjacent to the second (opposite) side of the card. The read head 384 will remain stationary at this stop position 394 until a next reading of a magnetic stripe is needed. After this next reading the read head will again be stopped at the initial position 392 adjacent to the first side of the card 380.

Figure 35:
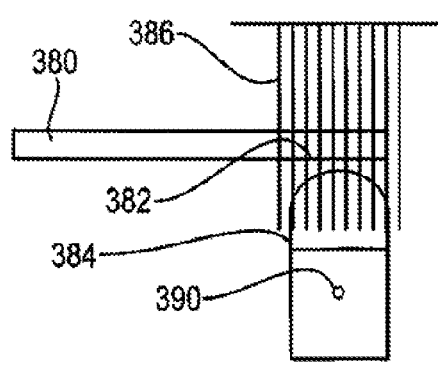
FIG. 35 shows a side view of the arrangement in FIG. 34.

FIG. 35 shows a side view taken along the direction A-A in FIG. 34. Again, the read head 384 is movable along the axis 390. As can be seen, the read head will first have to move (from the initial position 392) past the wiper 386 before reaching the magnetic stripe 382 of the card 380. It should be understood that the wiper configuration can cause the entire top area of the read head to be wiped.

In other exemplary embodiments, wipers can be moved to clean a read head while it remains stationary. A wiper mounting structure causes movement of the wiper relative to the stationary head when the head is in an at-rest position. A wiper moving mechanism (or drive) causes the wiper movement. Moving the wiper over the head may provide additional cleaning in comparison to moving the head through the wiper.

Figure 36:
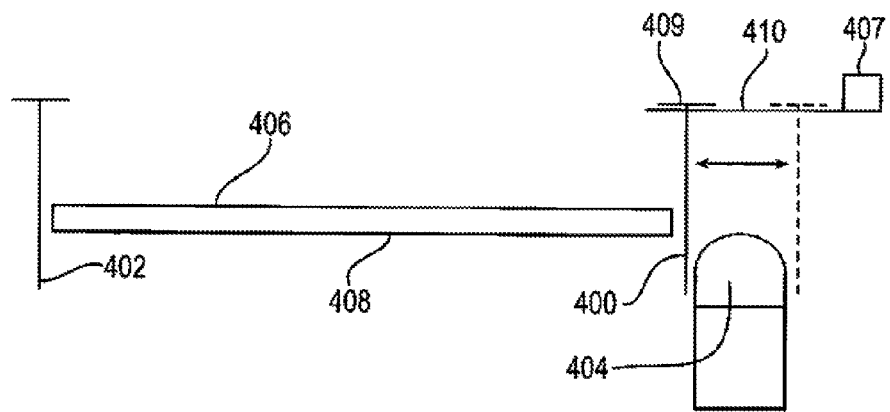
FIG. 36 shows a card reader wiper arrangement.

FIG. 36 shows card reader wipers 400 and 402, a read head 404, and a card 406 having a magnetic stripe 408. The wiper 400 is movable (as represented by the double arrow) over an upper portion of the read head 404. A drive device 407 can cause a wiper support 409 to be moved along a path (e.g., a track) 410. As shown, the wiper 400 can be moved between a first position (solid line) and a second position (broken line) while cleaning the read head 404. During cleaning the read head 404 can remain stationary. When the read head is stopped at the other end of the card, then it can be cleaned by the other movable wiper 402.

In an exemplary embodiment both the read head and the wiper are movable to cause cleaning. For example, the read head is cleaned by moving against a (stationary) wiper on its way to reading card data. However, when the read head has been idle from reading for a lengthy period, then the wiper is moved over the read head to cause the cleaning. Thus, the read head can be kept clean.

In other embodiments the wiper's support can be rotated 90 degrees, which allows the same wiper to pass over the read head in perpendicular directions. That is, the wiper from an initial position can travel in a first direction across a read head, then return in a second (opposite) direction to the initial position, then be rotated, then travel in a third direction across the read head, then return in a fourth (opposite) direction, and then be rotated back to the initial position. Wiping against the read head in different directions may produce enhanced cleaning.

Still other embodiments can have wipers that are perpendicularly arranged relative to each other. One wiper can move (e.g., east and west) along a first cleaning path, whereas the other wiper can move (e.g., north and south) along a second cleaning path which is perpendicular to the first path. A controller can be programmed to cause the wiper drives to move in a predetermined sequence.

Figure 37:
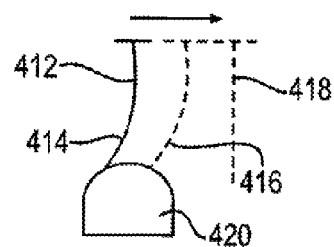
FIG. 37 shows the cleaning motion of a flexible wiper arm.

FIG. 37 shows a flexible wiper arm 412 passing over a read head 420 in the direction of the arrow. The wiper 412 is shown in different phases of its movement. In a first position 414 (solid line) the wiper 412 is in cleaning contact with the read head 420. In a second position 416 (broken curved line) the wiper 412 is still cleaning. In a third position 418 (broken straight line) the wiper 412 is out of contact with the read head 420. From the third position 418 the wiper 412 is ready to be moved back over the read head 420 in the opposite direction to its normal resting position.

FIG. 38 shows an exemplary embodiment of a wiper 422. The wiper 422 has a unitary structural body 424 that comprises plural wiper arms 426. The arms 426 can be formed by having vertical slits 428 in the lower portion of the body 424. Each slit 428 is between two adjacent arms 426. The slits 428 can be produced by substantially parallel spaced cuttings to the body 424.

FIG. 39 shows another exemplary embodiment of a wiper arrangement 430. The wiper 430 comprises plural rows 432, 434 of wiper arms 440. As shown, a second row 434 is located behind a first row 432. The wiper arms 440 in the first row 432 are shown in solid lines, whereas the hidden parts of the wiper arms 440 in the second row 434 are shown in broken lines. The second row 434 is laterally shifted from the first row 432 in order to cover any gaps (spaces) that may exist between the laterally adjacent arms 440 in the first row. This overlapping of rows helps to prevent the occurrence of gaps in contact with the read head during cleaning. As can be seen, both the first 432 and second 434 rows are supported by a same wiper hanging rack 436. The wiper arms 440 in the first row 432 are each removably attached to the first side 438 of the rack 436. The wiper arms 440 in the second row 434 are each removably attached to the second side 442 of the rack 436.

As previously discussed, the wiper arms can be supported by a rack by a plurality of different fastening techniques, including hooks, pins, screws, bolts/nuts, magnets, etc. In an exemplary embodiment the rack includes hanging hooks.

In FIG. 39 the particular first row arm 444 is shown having a hanging hole (aperture, opening, slot) 446. During installation or replacement, this arm is supported on a hook 448 that extends through the hole 446. The hook 448 is fastened to (or an integral part of) the rack 436.

Again, a wiper may be comprised of one or more rows of wiper arms. For ease of understanding, only a single (first) row of wiper arms has been shown in the wipers of FIGS. 34 and 35. Otherwise, the upper portion of the read head in FIG. 35 would be blocked out due to the gap preventing additional rows of wiper arms located behind the shown first row.

FIG. 40 shows a further exemplary embodiment of a wiper 450 that is movable over a read head 452. The wiper 450 can move on a track 454 that curves about the read head. That is, the curved track 454 follows the contour of the outer upper surface of the read head 452. The track 454 is positioned so that the wiper 450 moves in a direction that would be substantially perpendicular to the magnetic stripe of an inserted card. The read head would move substantially parallel to the magnetic stripe. Thus, movement of the wiper 450 is perpendicular to movement of the read head 452. With the exemplary arrangement, the track/wiper will not interfere with the read head moving toward a card.

Furthermore, the track 454 over its length stays at substantially the same distance from the read head 452. This allows the wiper 450 to exert a constant cleaning force against the read head over the entire cleaning pass. The wiper 450 can comprise a sponge material. Before making a cleaning run, the sponge can receive a cleaning solution. Following application of the solution from the sponge to the read head, the solution can quickly dry or evaporate. Again, the wiper 450 can be readily replaced, or cleansed from grime, pollutants, etc.

FIG. 41 shows a read head assembly 456 mounted in a spring loaded fashion to a movable support 458. A biasing component (e.g., spring) 460 causes the read head assembly 456 to be pressed against a card 462 during reading. The biasing force also causes the read head assembly 456 to press against an engaging wiper during cleaning. Additionally, a wiper can be configured so that its arms are bowed outward toward the read head assembly, so as to cause increased pressure against the assembly when it is (spring loaded) engaged with the wiper. This increased force of contact between the read head assembly and the wiper (as a result of the resiliently biased assembly) can result in enhanced cleaning of the read head assembly.

It should be understood that although the cleaning of a read head has been discussed in detail, one or more similar wipers can be used to clean the outer surface of an integrated chip of a debit/credit card. That is, some wipers may be configured to be used to clean both a read head and a card. Alternatively, one or more wipers (cleaning components) may be solely designated to card cleaning. A card cleaning operation can be conducted prior to a reading operation. Alternatively, a card cleaning operation can be initiated following an inability by the read head to read data from an unclean (dirty) card.

A wiper may also function to provide other services in addition to cleaning. For example, one or more wipers can be used to guide a card into its final card reading position. A wiper (or certain arms thereof) can include a substantially solid material (e.g., plastic, Teflon, etc.). The material can be attached to a wiper. Alternatively, the material may be coated onto an outer surface area of a wiper. The material can function to guide an edge of a card that is being inserted. For example, a first edge of a card can engage and be guided by a plastic guide of a first wiper positioned (like in FIG. 34) adjacent to a first side of the final card reading position, whereas the opposite second edge of the card can be guided by a plastic guide of a second wiper positioned (like in FIG. 34) adjacent to a second side of the final card reading position.

The plastic guides can also be configured and positioned so that they smooth engagement of the wiper with both the card and the read head. For example, the plastic guides may have a smooth, curved surface at their inward edge that will touch against the side of a card (e.g., due to movement of the read head toward the card). Likewise, the plastic guides may have a smooth, tapered, rounded surface at their outward edge that will contact the read head. The plastic guide arrangement can prevent the read head from catching (snagging) as it moves off the wiper and onto the card.

FIG. 42 shows a wiper 466 that has a plastic guide member 468 attached thereto. FIG. 43 shows a wiper arrangement 470 having a guide member 472. In an exemplary embodiment, the plastic guides do not extend to the bottom edge of a wiper. Hence, wiper cleaning material located at the lowermost portion of the wiper can still contact to clean.

A vibratory mechanism may be associated with a wiper to impart additional cleaning (scrubbing) action to a read head. The vibrating mechanism can be employed with both a stationary wiper and a movable wiper. For example, a vibrator can be used to cause vibration of the upper support base, which in turn imparts vibration (or movement) to the wiper arms. Alternatively, wiper arms may have a portion that is electronically conductive. The portion may run the entire length of the arm. Applying alternating current to the conductive portion can cause the arm (or different segments thereof) to move back and forth in a cleaning motion. A vibrator (or shaker) can also be a part of a wiper moving mechanism. A piezoelectric vibrator or a sonic vibrator can also be used.

The arrangement for moving a wiper can be configured (e.g., programmed) to periodically cause the wiper to move over a read head when the read head is not being used. This periodic cleansing can maintain an infrequently used read head in a clean state. The periodic cleansing can prevent the read head from becoming too dirty to be fully cleaned by the wiper. FIG. 44 shows a top view of a wiper head support 474. A first vibrator device 476 causes vibration of the support 474 in first horizontal direction, as represented by arrow X. A second vibrator device 478 vibrates the support 474 in second horizontal direction, as represented by arrow Y. The second direction is perpendicular to the first direction.

In review, the discussed wiper arrangements allow for in-operation cleaning of a read head. That is, in a first embodiment a read head moves against a wiper (and toward a data reading position). The discussed wiper arrangements also allow for non-operation cleaning (pre-use cleaning) of a read head. That is, in a second embodiment a wiper moves against a (stationary) read head. However, the wiper arrangements additionally allow for a third embodiment, which is a combination of the first and second embodiments. That is, both the read head and the wiper are movable. For example, during a reading operation the read head is moved against the wiper on its way to reading card data, whereas the wiper is moved against the read head after lengthy lulls between reading operations in order to make sure the stationary read head is kept clean. As previously discussed, the wiper movement can be either along the same path as head movement or perpendicular to this path. Once a lull between readings has reached a predetermined time period, then the wiper can be driven to refresh (clean) the read head. A controller for the wiper transport device can be programmed to induce wiper movement (and/or vibration) based on this time period.

FIG. 45 shows a wiper arm 480 having an embedded emitter 482. This exemplary embodiment allows for read head testing. The emitter device 482 is used to provide test signals to a read head. The testing can help determine whether the micr reading circuitry of the read head is working properly. A wiper arrangement can include (and carry) one or more emitters. An emitter may be located within or on a wiper. A wiper arrangement may have all emitters on the same side of the wiper arms. The testing may be conducted during cleaning engagement between the wiper and the read head. In the exemplary embodiment, the testing can be conducted regardless of whether the read head (sensor) is moving or whether the wiper is moving. In other embodiments the wiper may be moved at predetermined distances above (and over) the read head without touching it. Such analysis may assist in determining whether the read head sensing range is degrading. Examples of magnetic read heads and their operation are shown in U.S. application Ser. No. 12/378,043 filed Feb. 10, 2009, now U.S. Pat. No. 8,091,784; and U.S. application Ser. No. 12/378,050 filed Feb. 10, 2009, now U.S. Pat. No. 8,083,136, which are herein incorporated by reference in their entirety.

Figure 46:
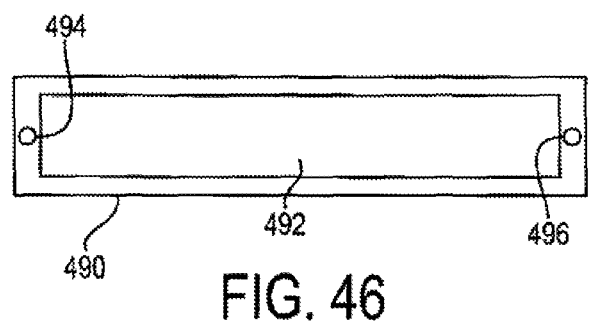
FIG. 46 shows a card reader with a card entry slot which can be blocked by a shutter.

FIG. 46 shows a card reader module 490. The card reader has a card entry opening which can be blocked by a shutter (e.g., gate or door) 492. The shutter 492 can be moved from a closed position (or a locked condition) to an open position (or an unlocked condition) to allow a user card to enter into the interior of the card reader 490. In an exemplary embodiment the shutter 492 is normally locked in a closed position to keep non card material out of the card reader. With the shutter 492 unlocked during a card reading operation, a card entering the card reader pushes against the biased shutter 492 causing it to be moved to an open position. For example, the shutter 492 can be pivoted upward about an upper hinge or axis. Upon exit of the card from the card reader, the shutter 492 is automatically biased back to its closed position where it can again be placed in a locked condition.

It should also be understood that other arrangements for opening/closing a shutter can also be used to cause the shutter to be moved (driven) from the closed position to an open position independent of card insertion. The shutter (gate) can be in operative connection with a drive, such as a motor, solenoid, cylinder, or other structure that can impart movement to the gate. The drive arrangements can use devices that involve movement induced by mechanical (springs, latches, etc.), electrical, and/or magnetic operation. In another embodiment, the shutter cannot be closed while a card is in the card reader. Thus, a shutter return drive (e.g., return springs) can be used to keep the shutter pressed against an inserted card, which helps hold the card stationary during the card data reading process.

In an exemplary embodiment, opening of a card reader shutter is linked to one or more sensors. One or more of the sensors can also be located at or on the card reader, such as on the card reader housing. Sensors can be positioned upstream of the shutter, such as in a card input slot that leads up to the shutter.

FIG. 46 additionally shows sensors 494, 496 attached to (and supported by) the card reader module 490. For reasons discussed later, the sensors can be laterally located adjacent opposite sides of the card reader.

Figure 46A:
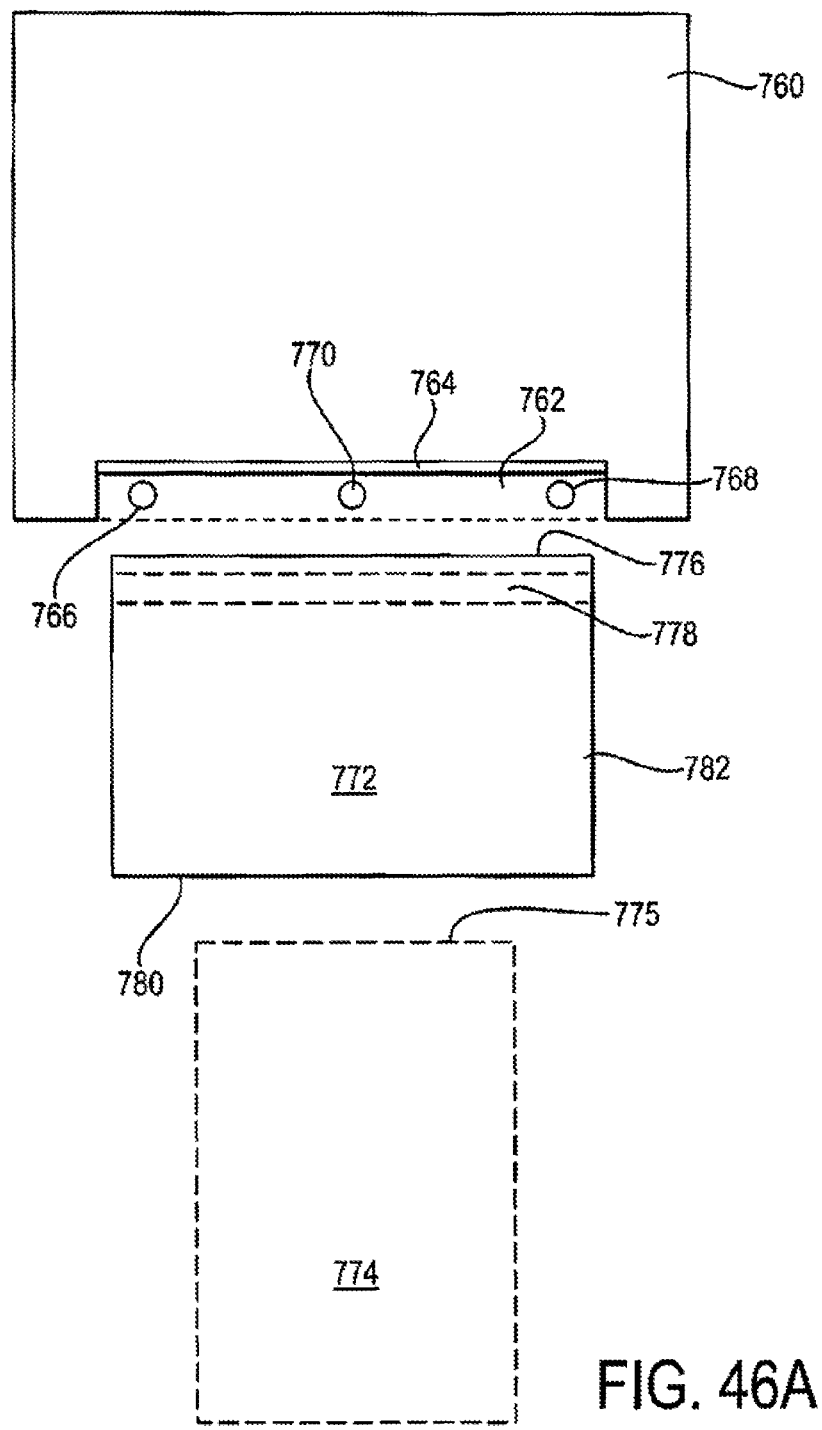
FIG. 46A shows an arrangement for sensing a card adjacent to a card reader module.

FIG. 46A shows a card reader module 760 having a card entry slot 762 leading to a shutter gate 764. As can be seen, the gate 764 is set inward a distance from the entrance to the slot 762. The card reader module 760 is operative to read data from magnetic stripe cards that are properly inserted long-edge first (LEF). Not only does a card have to be inserted LEF but its magnetic stripe also has to be properly positioned to enable its data to be read. In an exemplary embodiment the card reader module 760 includes at least one sensor to sense a physical location (orientation) of a card and at least one sensor to sense a correct location of a magnetic stripe.

Associated with the slot 762 are card sensors 766, 768, 770. Proximity sensors 766, 768 are operative to sense the presence of a card 772. These sensors can comprise photo sensors. The sensors are in operative connection with at least one processor of the card reader module 760. If the processor determines that both sensors have detected a card, then the card 772 is properly oriented LEF relative to the card entry slot 762. If both sensors do not detect a card, then the card is not properly oriented LEF. For example, a card may be oriented short-edge first (SEF) relative to the card entry slot. A SEF card 774 is shown in broken lines. Because of its short leading (front) edge 775, the card 774 would not trigger both of the sensors. It should be understood that in other embodiments more than two sensors can be used to determine whether a card is properly oriented.

Sensor 770 comprises a magnetic sensor. The magnetic sensor 770 is operative to sense a magnetic feature of the card 772. The sensor is operatively configured and positioned to sense the presence of the magnetic stripe 778 of the card 772 when the stripe is both near the leading edge 776 of the card and on a particular (e.g., bottom, top, right, left) side of the card. The sensor is not operative to sense a magnetic stripe that is at the trailing edge 780 of a card and/or the wrong side (face) of the card. The sensor 770 is in operative connection with the at least one processor of the card reader module. If the sensor detects a card's magnetic feature then the magnetic stripe is properly oriented. However, if the sensor does not detect both a magnetic feature 778 adjacent the leading edge 776 and on the correct side 782 of the card, then the processor determines that the magnetic stripe (and card) is not properly positioned to allow the card data to be read by the card reader. It should be understood that in other embodiments more than one sensor can be used to determine whether a magnetic stripe is properly oriented. In an exemplary embodiment, a properly oriented card has the magnetic stripe located on the lower (bottom) side of the card adjacent the leading edge. However, in other embodiments the magnetic stripe can be located on a different side of the card and/or adjacent the trailing edge.

The processor is operative to cause the gate 764 to be opened based on a positive determination that both: the card 772 is properly oriented LEF; and the magnetic stripe 778 is properly oriented/positioned (e.g., on the bottom side and near the leading edge 776). Thus, the gate can be permitted to be opened based on at least three determined factors: a long edge of the card is the leading edge; a magnetic feature is located adjacent the leading edge; and the same magnetic feature is located on the correct side of the card. The processor can be programmed to make a determination on the factors in any order and/or simultaneously.

Figure 46B:
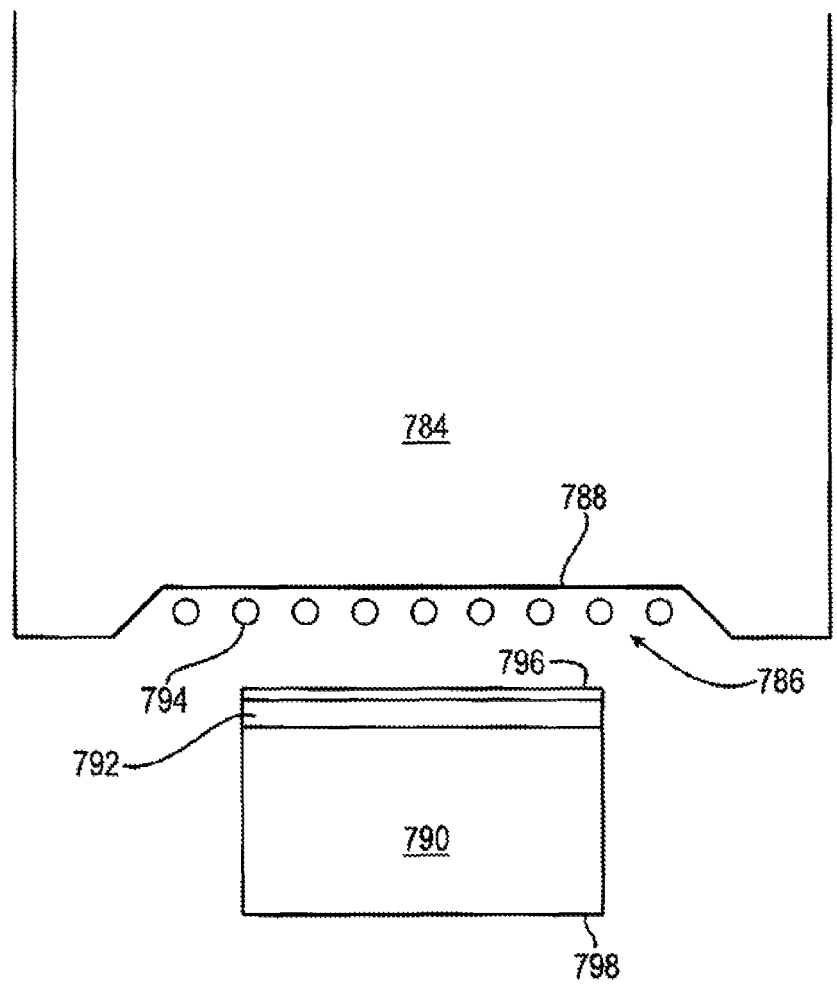
FIG. 46B shows another card reader module arrangement for sensing a card.

FIG. 46B shows another embodiment of a card reader module 784 having a card entry slot 786 that leads to a gate 788. The card reader module is operative to read a magnetic stripe 792 from a card 790 inserted LEF. The slot 786 is wider than the length of the two longest edges of a card. Thus, the card reader can receive a LEF card 790 at different positions through the slot 16. For example, as shown the card 790 may be inserted far to the left side of the slot 786 or far to the right side of the slot 786. A sensor array 794 is used to detect whether a card is properly positioned LEF. A card reader processor can determine from the sensor module 794 whether the leading edge 796 of a card 790 corresponds in length to a LEF inserted card. As previously discussed, the processor can open the gate 788 responsive to determining that a card is oriented LEF and that the card's stripe is properly positioned.

In an exemplary embodiment, when the card 790 in fully inserted in its reading position the trailing edge 798 of the card is still be visible to the user. For example, the trailing edge may protrude outward relative to the gate 788 but remain in the slot 786. Alternatively, the trailing edge 798 may protrude outward from the slot 786. However, in an exemplary embodiment the trailing edge 798 does not extend outward too far so as to allow the user to (grab and) remove the card 790 from the card reader. Thus, during the reading operation the card 790 can remain relatively stationary, even though part of the card 790 is viewable by the user.

Figure 46C:
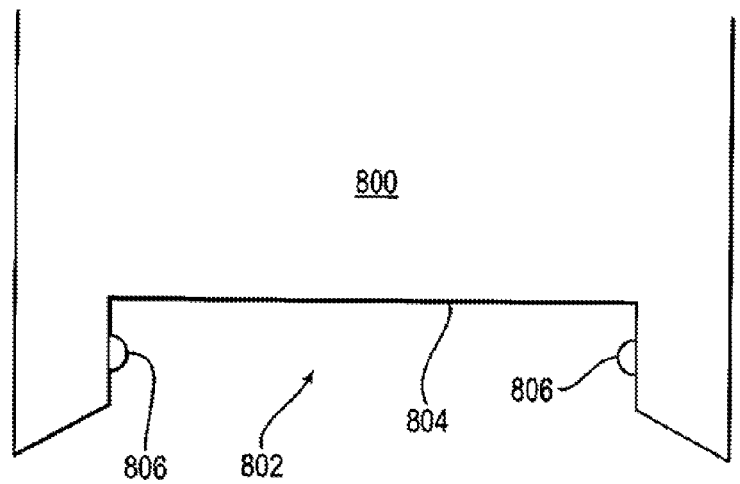
FIG. 46C shows a further card reader module arrangement for sensing a card.

FIG. 46C shows another embodiment of a card reader module 800 having a LEF card entry slot 802 that leads to a gate 804. Sensors 806 are positioned at opposite sides of the slot 802. Based on the sensor signals a processor is operative to decide if a card is being inserted LEF. The sensors 806 can comprise contact sensors, such as (photo) sensors that can detect the presence of a card portion. Alternatively, the sensors 806 can comprise mechanical contact switches that are operated (e.g., triggered, pushed inward) responsive to physical contact pressure applied by the card. Having both switches activated is an indication that a card is properly positioned LEF.

Figure 46D:
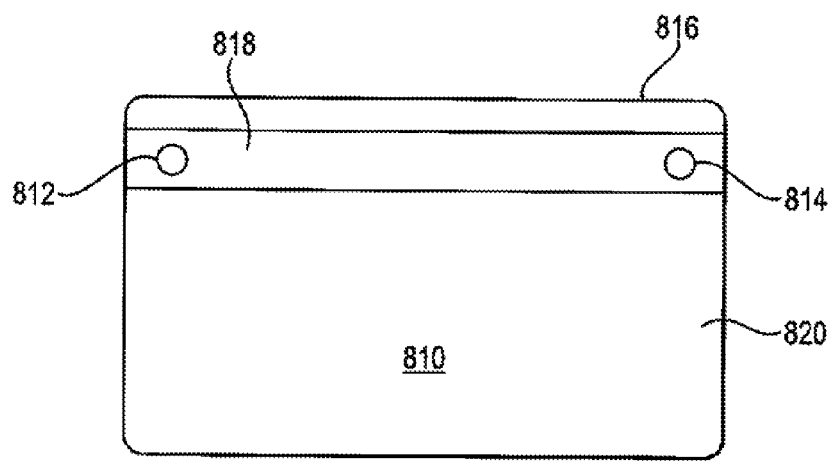
FIG. 46D shows a further arrangement for card sensing by a card reader module.

FIG. 46D shows another exemplary embodiment for detecting a LEF card 810. At least two magnetic sensors 812, 814 are used. The magnetic sensors 812, 814 can be used by a processor to check all of the (processor determined) factors needed to allow gate opening. As previously discussed, the positioning of sensors near the (left and right) sides of the slot enable verification that a (properly oriented) LEF card is located adjacent the slot. Thus, as shown, the magnetic sensors 812, 814 are properly positioned to detect (the factor of) whether a long edge of the card 810 is the leading edge 816. As shown, the magnetic sensors 812, 814 are also positioned to detect (the factor of) whether a magnetic stripe 818 is near the leading edge 816 of the card. The magnetic sensors 812, 814 are positioned to be on the same side (e.g., bottom side) of the card entry slot. Thus, as shown, the magnetic sensors 812, 814 are also properly positioned to detect (the factor of) whether a magnetic stripe 818 is located on the correct side 820 (e.g., bottom side) of the card 810. As can be appreciated, the embodiment allows the processor to determine whether a card meets the proper criteria to cause an entry gate to be opened, based on signals being received from only two sensors. In other embodiments more than two magnetic sensors (and other sensors) can be used.

It should also be understood that the exemplary embodiments also allow for a card reader module that can determine whether a (smart) card including a chip (e.g., a contact type chip) is properly oriented (for gate opening) to be accepted for reading. For example, an imaging device/sensor (e.g., a camera or a CMOS) can be used to determine if chip contacts are present with a card and also if they are in the correct position for the card to be read. If the camera shows the chip in the correct location, then the gate can be opened.

Figure 47:
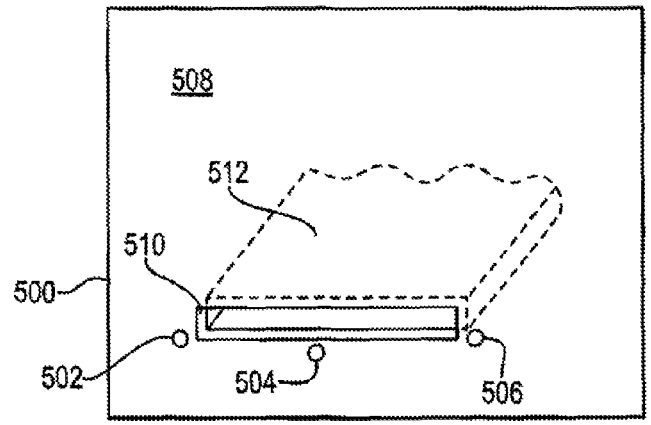
FIG. 47 shows a user fascia with sensors adjacent a card entry slot.

FIG. 47 shows sensors 502, 504, 506 attached to a bezel 508 which is part of a user fascia 500. That is, card sensors can be part of a card reader module or (alternatively) part of a user fascia structure. The bezel 508 includes a card entry slot 510 that lays adjacent to a shutter of a card reader 512 (which is shown in broken lines behind the bezel). The sensors 502, 504, 506 are attached to the bezel 508 at a location adjacent to the card entry slot 510. The sensors can sense whether an approaching card is oriented properly to allow the reading of its data by the card reader 512. Further examples of card sensors positioned adjacent to (and linked to) card reader shutters can be found in U.S. application 61/629,900 filed Nov. 30, 2011, which is herein incorporated by reference in its entirety.

The magnetic stripe of a card can be used to determine a magnetic stripe card's orientation. As previously discussed, in some exemplary card readers are configured to receive cards that are inserted long-edge first (LEF). These exemplary (sideways) card readers can be similar in size to known card readers that receive cards short-edge first (SEF). As a result of the similar size, an exemplary LEF card reader can replace (supplant) a conventional SEF card reader. Thus, an automated banking machine can be modified (refitted, upgraded) to include an exemplary LEF card reader without requiring additional space and/or additional structural changes to the machine.

In an exemplary process of retrofitting an automated banking machine (to exchange a SEF reader with a LEF reader) will now be discussed. The fascia is unlocked and then (manually) opened (moved outward) to provide servicing access to the original (SEF) card reader. If the original reader is supported on a rollout tray then the tray is (manually) moved outward (out of the machine housing) to provide easier manual access to the reader. The readers are manually exchanged by a service person. Particular cords, wires, fasteners, interfaces, and/or ports may have to be connected to provide the proper power, communication, and support/fastening for the new card reader. The rollout tray can then be closed (moved back into the machine housing). Alternatively, if the original reader is supported by the fascia itself, then it can be replaced from its support for the new LED reader by the service person.

The fascia includes a portion that comprises an original card reader bezel. This original bezel has a card entry slot that is sized to receive cards that were inserted SEF. This card entry slot also aligned with the card entrance opening of the original card reader when the fascia was closed. The service person manually replaces the original bezel with a similarly sized (new) bezel. The new bezel has a (wider) card entry slot that is sized to receive cards that are inserted LEF. Further discussion of card reader bezels can be found in application 61/628,513 filed Nov. 1, 2011, which has been incorporated herein by reference in its entirety. Following the bezel exchange, the fascia can then be closed. The new card reader can be tested before the machine is returned to (card reader) available usage by customers. Other bezel arrangements may allow bezel removal (and exchange) without requiring opening of the fascia. For example, a bezel may have a lock that is manually accessible while the fascia is closed. Unlocking of the lock allows the bezel portion to be removed from the remainder of the closed fascia. Of course these process steps and/or approaches are exemplary, and in other embodiments other approaches and/or orderings (sequences) of steps may be used.

If a magnetic property of the magnetic stripe can be sensed by the sensors, then it is determined (by one or more processors) that the card is correctly oriented for insertion (entry) into the reader through the shutter slot. The sensors can be positioned so that they can only read a magnetic property from a properly oriented magnetic stripe, else the card is not recognized as being correctly oriented. For example, the sensors can be positioned to detect a proper card orientation that requires a card to be inserted with its magnetic stripe both facing downward and extending along the leading long edge of the card. Thus, the pre-insertion sensing arrangement allows for the determining that a magnetic stripe card being inserted long-edge first (sideways) is properly oriented to have its data read by a magnetic read head. It should be understood that sensor positions are exemplary, and in other embodiments other sensor positions can be used in determining whether a card is correctly pointed.

The sensors are in operative connection with at least one processor (e.g., controller). The processor operates according to programmed instructions. Signals from the sensors can be received by the processor. These sensor signals may go through one or more interfaces before being received by the processor. For example, a sensor may communicate with the processor via a USB port, a wireless port, etc. Signals from the processor can cause operation of a shutter lock/unlock controlling device, which operation can change the locked/unlocked condition of a card reader shutter. Signals from the processor can also cause operation of shutter drive devices, which operation causes movement of the shutter (e.g., to an open position). A shutter drive arrangement can comprise one or more motors, solenoids, cylinders, etc. Other known actuators that can cause shutter movement can also be used. Signals sent from the processor may pass through one or more interfaces before being received by the card reader or card reader devices. For example, a card reader may communicate with the processor via a USB port, a wireless port, etc. As can be seen, sensors can be used to control card entry access into a card reader.

In an exemplary embodiment, two disposed-apart magnetic sensors are used to sense whether a magnetic stripe is positioned perpendicular (sideways) to the entry path into the shutter. In response to a determination that a proper orientation was sensed, the shutter is then permitted to be opened. For example, the controller can cause the shutter to be placed into an unlocked state, which enables the card to push the shutter into an open position.

Another exemplary embodiment uses one or more infrared (IR) type presence sensors and one or more magnetic sensors. The embodiment allows a determination to be made whether a magnetic stripe card is being inserted long-edge first. Two horizontally spaced IR sensor arrangements are positioned so as to be blocked by the front outside portions of a sideways (long edge first) oriented card. If both IR sensors are not blocked then the card is being incorrectly inserted, such as short-edge first. A magnetic sensor is positioned to sense a magnetic stripe. In operation, if both IR sensors are blocked and the magnetic sensor senses a stripe in the correct location (e.g., bottom side of the card at the leading long edge), then it can be decided that the card is properly oriented.

A further exemplary embodiment includes use of a card reader which can read cards that do not have a magnetic stripe. For example, a card may only have a chip, such as a contact type chip. A card's chip may also be of a non-contact type chip, such as a wireless chip that uses near field communication (NFC) signals or radio frequency identification (RFID) signals. Other card data storage formats can include other smart card chip features, bar codes, electronic ink, etc.

As previously discussed, a card reader's shutter gate can be unlocked (or opened) in response to detection of a properly oriented smart card. For example, two disposed presence sensors can be used to sense whether the card is properly oriented in a sideways (long-edge first) position. Without a magnetic stripe then the arrangements of contacts on a chip card should only be in two possible orientations on a card side. As a result, a CMOS or other type of imaging sensor can be used to determine if the chip contacts on a smart card are present and in the correct position for the card to be accepted for reading. If the images show the chip in the correct location, then the shutter can be unlocked/opened.

Another exemplary embodiment arrangement includes a card reader that can read a card which has both a contact type chip and a magnetic stripe. Generally, for a card having both a magnetic stripe and a chip, the chip contacts are on top face (upper surface) of the card generally in the center of the card toward one (long-edge) side, and the magnetic stripe runs across the bottom of the card near the opposite (long-edge) side. As a result, if the presence sensors help determine that a properly oriented (long-edge first) card is being presented, then the imaging sensor(s) would need to find the chip contacts on one (long-edge) side of the card, while the magnetic sensor would need to find the presence of a magnetic stripe on the opposite (long-edge) side of the card. Such findings would meet the conditions for opening the shutter to a long-edge inserted card having both a magnetic stripe and a chip.

Yet another exemplary embodiment arrangement includes a card reader that can allow its shutter to be opened based on wireless detection of NFC signals and/or RFID signals from a card. Any of the prior discussed card reader arrangements can be integrated with a wireless-type arrangement that checks (senses) for the presence of NFC/RFID signals in proximity to the shutter, and upon detection of such signals allows the shutter to be opened.

Further arrangements and methods of sensing different card properties and determining card orientations are discussed in U.S. application 61/629,900 filed Nov. 30, 2011, which has been incorporated herein by reference in its entirety.

It should be understood that while a card may be referred to herein as being "sideways" upon its entry into a card reader, the card reader does not have to read the card horizontally. The "sideways" terminology refers to the card being inserted long-edge first, as opposed to a conventional short-edge first insertion. Thus, a long-edge inserted card could be inserted horizontally or vertically (or any angle in between) into a card reader. A horizontally inserted card would be lying flat, with one face on top and the other face on bottom. A vertically inserted card would have one short edge on top and the other short edge on bottom, with one face on the left side and the other face on the right side. For example, a card reader in one orientation could receive a horizontally inserted card, whereas rotation of the card reader 90 degrees would allow it to receive a vertically inserted card. However, both cards would be received sideways (longedge first). Also, a read head may be configured to move in a horizontal direction and/or in a vertical direction.

A card reader of an exemplary embodiment helps protect against card skimming (e.g., unlawful reading of card data). As previously discussed, sideways (long-edge first) entry of a card makes fraudulent skimming of card data much more difficult. An unauthorized card reader is typically installed to read parallel along the magnetic stripe as the card is being moved in or out of the card reader. As can be appreciated, a sideways inserted card would cause the typical unauthorized data reader to read in a direction that is perpendicular to the card's magnetic stripe. That is, the unauthorized reader would read across the stripe's tracks instead of along a track. Thus, because at best only a small amount of data could be ascertained, the arrangement provides improved resistance to fraud. Other examples of providing an automated banking machine with improved resistance to fraud can be found in U.S. application Ser. No. 12/008,348 filed Jan. 10, 2008; U.S. application Ser. No. 12/661,499 filed Mar. 18, 2010, now U.S. Pat. No. 8,028,899; and U.S. application Ser. No. 13/199,106 filed Aug. 19, 2011, which are herein incorporated by reference in their entirety.

As a further security feature, an exemplary card reader is additionally operative to provide two-dimensional horizontal jitter to a card during both its entry and exit. The jitter moves (jerks, vibrates) a card back and forth in perpendicular directions so that a skimmer cannot get a good (accurate) reading of card data. That is, a card may be placed in various skewed orientations as it is entering and/or exiting a card reader. A jitter pattern can cause non-cyclical or non-uniform card jitter (e.g., irregular variation in direction/movement; directional fluctuations). Various jitter patterns can be programmed in a computer that controls the card drive mechanism. The use of different jitter programs can make card-movement unpredictable, especially to a criminal.

Furthermore, the card reader can vary (fluctuate) the speed and direction of card jitter while the card passes through the card reader's entry slot (while the shutter is open). That is, card speed is varied while the card is moving in a direction in-and-out of the card reader. Card direction is also varied left-to-right while the card is moving in-and-out of the reader. The left to-right movement of the card can likewise vary in speed. Thus, while inducing card jitter the LEF card reader is also able to simultaneously vary a card's jitter speed and direction, both in-and-out and left-to-right, as the card is entering and exiting the card reader.

A card mover (arrangement, mechanism, device) can include card moving components (e.g., rollers, belts, balls, bearings, suction devices, etc.) that engagingly move a (contacted) card. One or more card movers can be driven by one or more (card) drive devices to engagingly move an inserted card. A drive device can comprise one or more motors, solenoids, cylinders, etc. Other known actuators that can cause card mover movement can also be used. The drive devices are in operative connection with at least one processor (e.g., machine controller). The processor operates according to programmed instructions, which may include one or more different card jitter patterns. The instructions can be stored in one or more data stores, which the processor can access. Signals from the processor can cause operation of the drive devices, which in turn causes movement of the card movers. Of course signals sent from the processor may pass through one or more interfaces before being received by the drive devices. In other embodiments, the card reader can include each of the contact components (rollers, balls, etc.) that movingly contact a card, the drive device (e.g., motor) which imparts drive to the contact components, and the processor which controls the drive device to follow one or more predetermined (programmed) jitter patterns.

An in-and-out card jitter can be created by operating card drive devices. For example, a card drive device can include rollers and/or belts. The card drive device can engage the sides of a card and/or the top and bottom of the card. The card drive device can be operated to vary the card's speed and direction as the card moves in and out of the card reader. For example, as the card is being driven in (or out of) the card reader, drive rollers can both change the card's travel direction (between forward and reverse) and change the card's speed of travel (between faster and slower). A card can be moved jerked) back and forth while it is being moved in and out. Thus, prevention of card skimming can be enhanced. The card drive devices can be the same mechanisms that hold a card stationary while it is being read.

A left-to-right card jitter can also be created by operating a card drive mechanism. In one embodiment, the drive mechanism itself is movable in the left-right direction. The drive mechanism can include drive rolls, rollers, and/or drive belts. In operation, a card may be securely held by the drive mechanism, then moved as the drive mechanism moves. Other embodiments can impart three-dimensional jitter to a card moving in and out of a card reader.

In one embodiment the card drive mechanism includes a driving roll that has an hourglass shape at its center, which varies its effective outer diameter relative to its axis of rotation. The driving roll engages a side edge of a card at an angle. Movement of the roll causes in or out movement of the card. The roll movement simultaneously causes sideways (left or right) movement of the card. Another roll (or roller) located on the opposite side of the card could be spring loaded. As a result, as the hourglass-shaped roll changed its driving direction (moving back and forth), the roll on the opposite side of the card would be moved back and forth.

In addition, instead of having a smooth (inclined ramped) hourglass shape, the drive roll could have various sized outer diameters near its center. These different diameters will create irregular (non-ramped) side-to-side jitter. The various diameters make it more difficult for a person to predict the roll's jitter-creating pattern.

In an exemplary embodiment, a ball transport mechanism is used to provide card jitter. Rotatable balls of the transport can engage/grab the top and bottom faces of a card. That is, a card can be sandwiched between a transport's top and bottom balls. The balls can rotate in any direction. Thus, a held card can be moved by the transport in forward, reverse, left, and right directions. Simultaneous movements of balls in different directions can also cause a card to be moved in angled, circular, and/or oscillating motions. For example, rotatable drive balls and rotatable idler balls can be adjacently positioned on opposed sides of a card, which allows the card to be moved there between while being engaged by both the rotatable drive balls and the rotatable idler balls. One or more of the rotatable transport balls can be housed in a housing. Ball bearings can be operatively positioned between the balls and an inner wall the housing (or enclosure). The bearings allow the balls to be rotated in all directions (i.e., 360 degrees). Further discussion of transport mechanisms that use rotatable engaging balls to move an item can be found in U.S. application Ser. No. 13/135,663 filed Jul. 12, 2011, which is herein incorporated by reference in its entirety. The incorporated transport mechanisms (comprising rotatable engaging balls or other item moving structure and arrangements) can similarly be used herein to move (and provide jitter to) a card entering and/or exiting a card reader.

Figure 57:
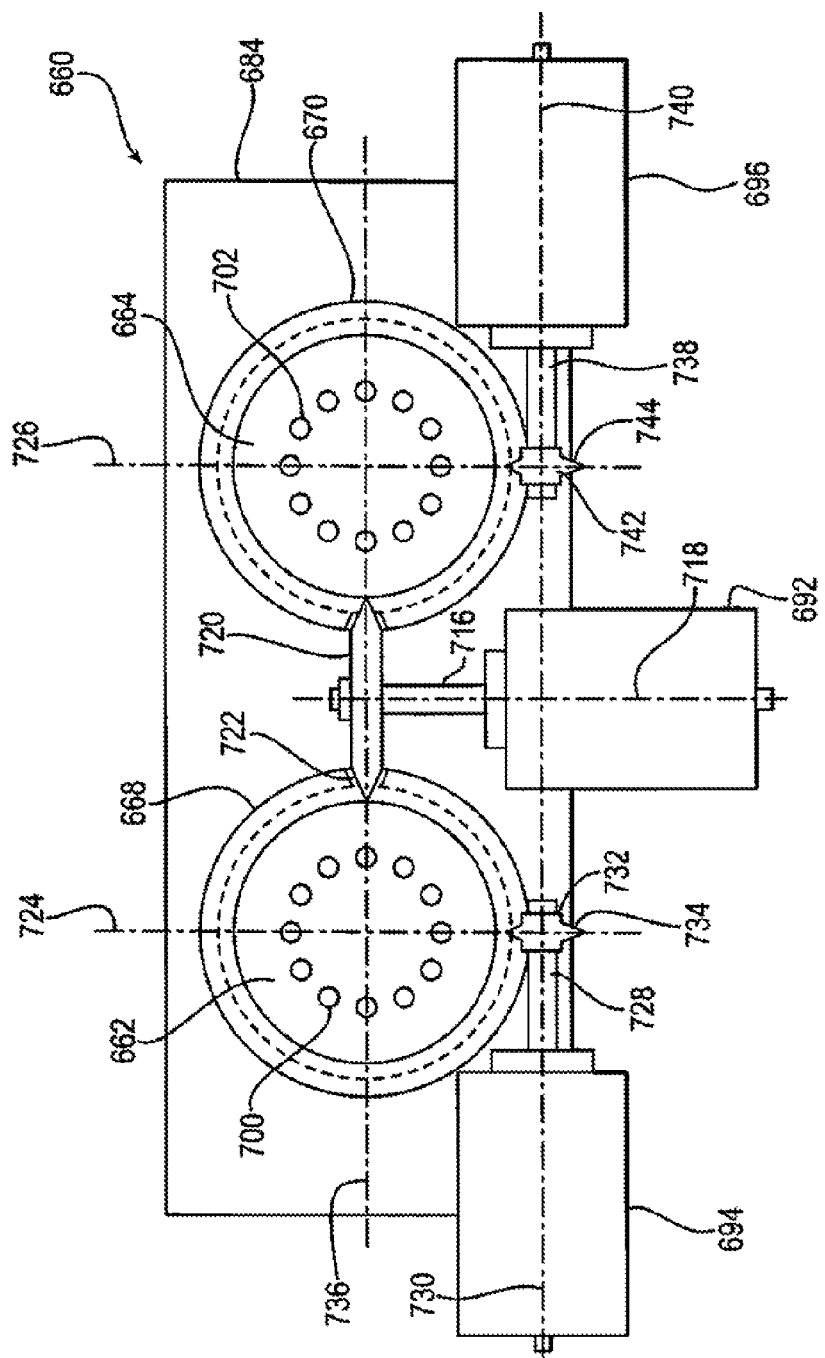
FIG. 57 is a schematic bottom view of a card moving mechanism that includes rotatable balls.
Figure 58:
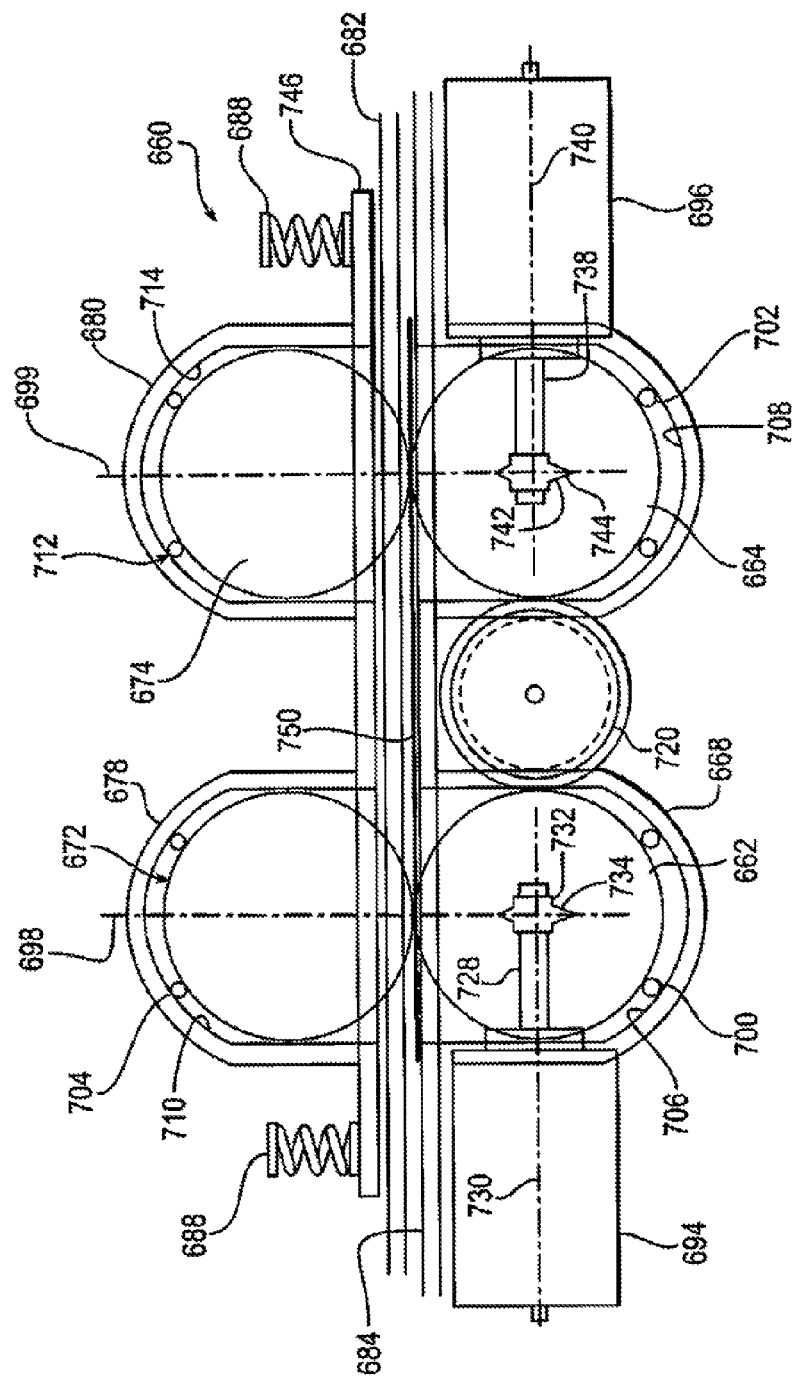
FIG. 58 is a schematic sectional side view of the mechanism shown in FIG. 57.

FIG. 57 and FIG. 58 schematically show an exemplary embodiment of a document transport mechanism 660. This mechanism 660 includes respective sets of adjacent drive members 662, 664 and follower members 672, 674 that are moved by drives 692, 694, 696 to move and align a document. A document (card, sheet, check, currency note, etc.) can be driven while at least a part thereof is located between the drive and follower members. The document is placed between an upper platen 682 and a lower platen 684. The drive members 662, 664 can be a roller, belt, ball, or other structure that can move the document. Likewise, each of the follower members 672, 674 can be a roller, belt, ball, or other structure that helps move the document.

In an exemplary embodiment, the transport mechanism 660 is a card transport mechanism 660 which is part of a card reader module. Furthermore, the document is a card, the drive members 662, 664 are transport balls, and the follower members 672, 674 are idler balls. Each of the transport and idler members may be formed in one piece. The transport balls 662, 664 are selectively moved by one or more drives. The drives can be a motor, solenoid, cylinder, or other structure that can impart movement. In the exemplary embodiment, the drives include electric motors. The card transport mechanism 660 can move a card into and out of a card reader, positionally align the card for reading of data therefrom, and impart multi-directional jitter to the card while it is being moved into and out of the card reader. The multi-directional jitter can include card jitter movement in at least two non-parallel directions. This can include two dimensional horizontal jitter) movement or motion (i.e., jitter along X and Y axes). In other embodiments a card can receive three-dimensional jitter. That is, card jitter can occur in three different (non parallel) directions (i.e., jitter along X, Y, and Z axes). Still other embodiments allow for two-directional card jitter in both a horizontal axis and a vertical axis, such as along the X/Z axes and the Y/Z axes. The arrangement allows for card jitter in angular directions. Of course card jitter motion can also be reversed, such as in a forward and backward motion. The card transport mechanism 660 can also cause both card movement and card jitter to occur at different speeds.

In the exemplary embodiment, left and right transport balls 662, 664 extend through apertures in the lower platen 684. The left transport ball 662 is housed in a housing 668 that is operatively attached to the lower platen 684. The right transport ball 664 is also housed in a housing 670 that is operatively attached to the lower platen 684. Left and right idler balls 672, 674 are in supporting connection with the upper platen 682. The idler balls 672, 674 each extend in a corresponding opening in the upper platen 682.

It should be understood that although terms such as lower, upper, left, and right may be used herein for purposes of describing an embodiment of a card transport mechanism, other directional orientations can also be used. For example, in other embodiments the idler balls can be in supporting connection with a lower platen (or a side platen). The card transport mechanism can also be arranged to move a card that is in a vertical orientation, where the balls are respectively engage left and right faces of the card. That is, the card transport mechanism can be used with a vertically oriented card reader that is able to receive a card that is inserted having its lowermost (bottom) portion being a short or long edge.

Each of the idler balls 672, 674 generally corresponds to the position of a respective transport ball. Specifically, the left transport ball 662 and the left idler ball 672 can be aligned together on a common axis 698 that is perpendicular to the longitudinal axis of the upper platen 682. Likewise, the right transport ball 664 and the right idler ball 674 are aligned together on a common axis 699 that is perpendicular to the longitudinal axis of the lower platen 684.

The left idler ball 672 is housed in a housing 678 that is operatively attached to the upper platen 682. The right idler ball 674 is also housed in a housing 680 that is operatively attached to the upper platen 682. A plurality of springs 688 (e.g., coil springs) are in operative connection with a support plate 746, which is connected to and supported by the upper platen 682. The plurality of springs 688 extend upwardly to a drive carriage or other support structure. In the exemplary embodiment the springs 688 bias the idler balls 672, 674 toward their corresponding transport balls 662, 664 yet allow the idler balls 672, 674 to move away from their corresponding transport balls 662, 664 along their common axes 698, 699 with their corresponding transport balls 662, 664. This biasing allows a card to be inserted between the transport balls and the idler balls. The transport and idler balls are made of a suitable material for engaging cards therewith, such as a resilient material like rubber.

In the exemplary embodiment, bearings such as ball bearings 700 are operatively positioned between the left transport ball 662 and an inner wall 706 of the ball enclosure 668. Bearings such as ball bearings 702 are also operatively positioned between the right transport ball 664 and an inner wall 708 of the enclosure 670. Likewise, ball bearings 704 are provided between the left idler ball 672 and an inner wall 710 of the enclosure 678. Ball bearings 712 are also provided between the right idler ball 674 and an inner wall 714 of the enclosure 680. The ball bearings 700, 702, 704, 712, are held in their respective positions by races or other structures that enable the ball bearing to rotate and facilitate movement of the adjacent transport or idler member. It should be understood that while in the exemplary embodiment bearings are used to achieve relatively free movement, in other embodiments other structures to provide low friction movement can be used.

The exemplary mechanism 660 further includes the central drive motor 692 for driving the transport balls 662, 664. The central motor 692 is positioned between the transport balls 662, 664 along the longitudinal axis of the lower platen 684. The central motor 692 includes a motor shaft 716 that rotates upon energization of the central motor 692. The axis 718 of rotation of the motor shaft 716 is perpendicular to the longitudinal axis of the lower platen 684 and parallel to the plane of the transport path of the card along the lower platen 684. The motor shaft 716 extends through the center of an engagement member 720 and is fixed to the engagement member 720. The engagement member 720 is generally cylindrical and has a relatively small axial thickness. The engagement member 720 extends radially outwardly with respect to the axis 718 a distance that is larger than the diameter of the shaft 716. The exemplary engagement member 720 also has a tapered peripheral annular end 722.

The peripheral annular end 722 extends through openings in the housings 668, 670 and engages outer surfaces of each of the transport balls 662, 664. Rotation of the shaft 716 rotates the engagement member 720, which in turn rotates the transport balls 662, 664 about axes 724, 726 which extend parallel to the rotational axis 718 of the motor shaft 716 and the engagement member 720. The rotation of the right and left transport balls 662, 664 in this manner moves a card positioned between the transport and idler balls, in a direction parallel to the transport path in the card reader. The central motor 692 is selectively controlled responsive to operation of control circuitry and is reversible, and thus can rotate each of the transport balls 662, 664 in opposite directions which in turn can selectively move the card both toward and away from the card inlet opening to the card reader. The motor 692 can be operated at various speeds. Thus, the motor can cause the transport balls (and thus the card) to be moved at different speeds.

In the exemplary arrangement, the left motor 694 is operatively associated with the left transport ball 662. The left motor 694 includes a motor shaft 728 that rotates upon energization of the left motor. The axis 730 of rotation of the motor shaft 728 is parallel to the longitudinal axis of the lower platen 684. The shaft 728 extends through the center of an engagement member 732 and is fixed to the engagement member 732. The engagement member 732 is generally cylindrical and has a relatively small axial thickness. The engagement member 732 extends radially outwardly a distance that is larger than the diameter of the shaft 728. The exemplary engagement member 732 has a tapered peripheral annular end 734. The peripheral end 734 extends through an opening (not separately shown) in the housing 668 of the left transport ball 662, and engages the outer surface of the left transport ball 662. Engagement member 732 extends a radial distance that is less than that of the engagement member 720 which is driven by the central motor 692.

The engagement member 732 engages the left transport ball 662 at a location that is ninety degrees from the point of engagement of the left transport ball 662 and the engagement member 720 of the central motor 692. Rotation of the shaft 728 rotates the engagement member 732, which in turn rotates the left transport ball 662 about an axis 736 parallel to the rotational axis 730 of the motor shaft 728 and the engagement member 732. The rotation of the left transport ball 662 in this direction moves a portion of a card, positioned between the transport and idler balls, in a direction transverse to the transport path in the card reader. The left motor 694 is selectively controlled and is reversible, and thus can rotate the left transport ball 662 in opposite directions which also can move the card both toward and away from card (alignment) sensors in the card reader.

In the exemplary embodiment the right motor 696 is associated with the right transport ball 664. The right motor 696 includes a motor shaft 738 that rotates upon energization of the motor 696. The axis 740 of rotation of the motor shaft 738 is parallel to the longitudinal axis of the lower platen 684. The shaft 738 extends through the center of an exemplary engagement member 742 and is fixed to the engagement member 742. The engagement member 742 is generally cylindrical and has a relatively small axial thickness. The engagement member 742 extends radially outwardly a distance that is larger than the diameter of the shaft 738. The engagement member 742 has a tapered peripheral annular end 744. The peripheral end 744 extends through an opening (not separately shown) in the housing 670 of the right transport ball 664 and engages the outer surface of the right transport ball 664. This engagement member 742 extends a radial distance that is less than that of the engagement member 742 which is driven by the central drive motor 692. The engagement member 742 engages the right transport ball 664 at a location that is ninety degrees from the point of engagement of the right transport ball 664 and the engagement member 720 of the central motor 692. Rotation of the shaft 738 rotates the engagement member 742, which in turn rotates the right transport ball 664 about the axis 736 parallel to the rotational axis 740 of the motor shaft 738 and the engagement member 742. The rotation of the right transport ball 664 in this direction moves a portion of a card between the right transport and idler balls, in a direction transverse to the transport path in the card reader. The right motor 696 is selectively controlled reversible, and thus can rotate the right transport ball 664 in opposite directions which also can move the card both toward and away from card sensors in the card reader.

The central, left, and right motors 692 can be operated at various speeds and in reverse. Thus, the motors can cause the transport balls to impart both movement (including inward and outward movement) and jitter motion (including in left, right, forward, backward, and/or angular directions, etc.) to a card at different speeds.

In operation of this exemplary embodiment, when a card is sensed entering the card reader the card moving mechanism 660 is positioned such that the transport balls 662, 664 are located in adjacent relation to the idler balls 672, 674. This position is shown in FIG. 58. A portion of a card 750 is shown between the upper platen 682 and the lower platen 684, before the card is located between the transport and idler balls. The play allowed by the resilient springs 688 enables separation between the transport and idler balls. Thus, the resilient springs 688 allow the card 750 to be moved (inserted) between the transport and idler balls. The card is not necessary drawn to scale relative to the card moving mechanism 660.

In response to sensing that a card 750 is being positioned in the card inlet opening of the card reader (and other appropriate conditions), the at least one processor is operative responsive to its programming to cause the central motor 692 to rotate the transport balls 662, 664 to rotate in operative engagement their corresponding idler balls 672, 674. If an improper card insertion is sensed, the first transport may not run or may run and then return the card to the user.

Moving the transport balls 662, 664 responsive to operation of motor 692 causes the card 750 to be moved in engaged sandwiched relation between the transport balls 662, 664 and the idler balls 672, 674. In this position, the card can be moved in engagement with the transport into the card reading area. The card moving mechanism 660 assists in moving a card into the card reader. The motor 692 can also impart jitter to the card while it is being moved inwardly.

As the card is moving inwardly along the longitudinal axis of the lower platen 684, the left and right motors 694, 696, which are operative to move the transport balls in directions transverse (and at angles) to the longitudinal axis of the platen, operate so as to move the card 750. The card is moved in an angular direction (e.g., transverse) relative to the direction of the card movement caused by the central motor 692. The left motor 694 and the right motor 696 can be simultaneously operated at different speeds to cause a turning (skewing) of a card while the card is simultaneously being moved in a sideways (angular) direction by the motors 694, 696. Also, at certain times during a moving operation, only one of the motors 694, 696 may need to be operating. The processor programming is able to provide different movement/jitter motions for each individual card. A card being moved toward its aligned reading position can be quickly skewed (with jitter) and de-skewed (realigned).

As can be appreciated, the card jitter mechanism 660 allows the card 750 to be simultaneously moved for jitter both inwardly in a (path) direction along the longitudinal axis of the lower platen 684 and also in a (sideways) direction transverse to (at an angle relative to) the longitudinal axis of the lower platen 684. The card 750 can be jittered sideways (and in other directions) until its leading edge is finally aligned with card alignment sensors in the card reader. In operation of an exemplary embodiment, the card transport mechanism 660 allows a card to be transported under continuous jitter movement while being moved in various directions into an eventual aligned proper card reading position. This can be accomplished without having to stop and then restart card movement.

The exemplary card transport mechanism 660 offers simultaneous distinct card movements. A card can be moved in at least two different directions (in an angled direction) without requiring any stopping of the card during the card movement. That is, a card can be (simultaneously) moved in at least two different non parallel directions, which can include two-dimensional horizontal (jitter) movement.

The card reader has a substantially straight card transport path extending from the card entry slot. The card transport mechanism 660 is operable to simultaneously move a card both forward/backward (e.g., parallel along) and sideways (e.g., perpendicular and/or angular) relative to this transport path. The rotatable transport balls 662, 664 are each operative to impart to a card different drive angles that are in an angular range extending from a direction parallel (zero degrees) to the transport path to a direction 180 degrees (reverse) to the transport path. Thus, the transport balls 662, 664 working together at the same time can cause a card to be moved substantially straight at any drive angle in the range from zero to 180 degrees relative to the transport path. The transport balls 662, 664 working together at the same time (simultaneously) at different drive angles can also cause a card (or a part thereof) to be rotationally oriented out of alignment relative to the transport path. All the while transport balls can impart jitter to the card.

As can be seen, a card can now be simultaneously jittered in different directions while it continues its movement toward its final reading position (or toward its exit from the card reader). Thus, the exemplary arrangement enables more jitter directions for cards, which results in safer transactions for customers of automated transaction machines.

Card alignment sensors in the card reader can be used to provide a virtual wall (or stop) against which to align the leading edge of the card. The sensing of the card edge by the alignment sensors enables precise positioning/alignment of the card, which facilitates later reading of data from the card. The precise alignment of a card edge also enables positioning of a LEF inserted card so as to be in position to be read by a movable read head. Of course in other embodiments other card alignment approaches may be used.

Alternative embodiments may also use similar principles. For example, instead of the idler balls, a low friction platen may be fixed in an opposed contact position relative to the transport balls. Alternatively, the low friction platen may be positioned relative to the transport balls such that the transport balls are biased toward engagement \\ith the low friction platen by one or more springs. In another example, the driving mechanism could be one motor that can rotate the balls in both the parallel and transverse directions with respect to the longitudinal axis of the platen. In another example, a differential drive could be operatively connected between the transport balls. The differential may have rotation of its output shafts controlled by brakes or other mechanisms so that the transport balls can be moved different distances and/or directions to impart jitter to the card. In some embodiments the transport members and idler members may maintain a position where they are biased toward engagement as a card is moved there between. In other embodiments the transport or idler members may be disposed further away from one another at certain times during card movement. Of course these approaches are merely exemplary.

As previously discussed, an exemplary card transport mechanism can provide continuous jitter to a card that is entering and/or exiting a card reader. The card transport mechanism can also be used to move a card that is inserted long-edge first (LEF) into a card reader. The card transport mechanism can be part of a card reader module, such as a replaceable module located in an automated transaction machine. The card reader module can have its own processors, drives (motors), sensors, etc. Alternatively, the card transport mechanism can be separate from a card reader, but be positioned adjacent to the card reader (such as in an automated transaction machine).

Figure 59:
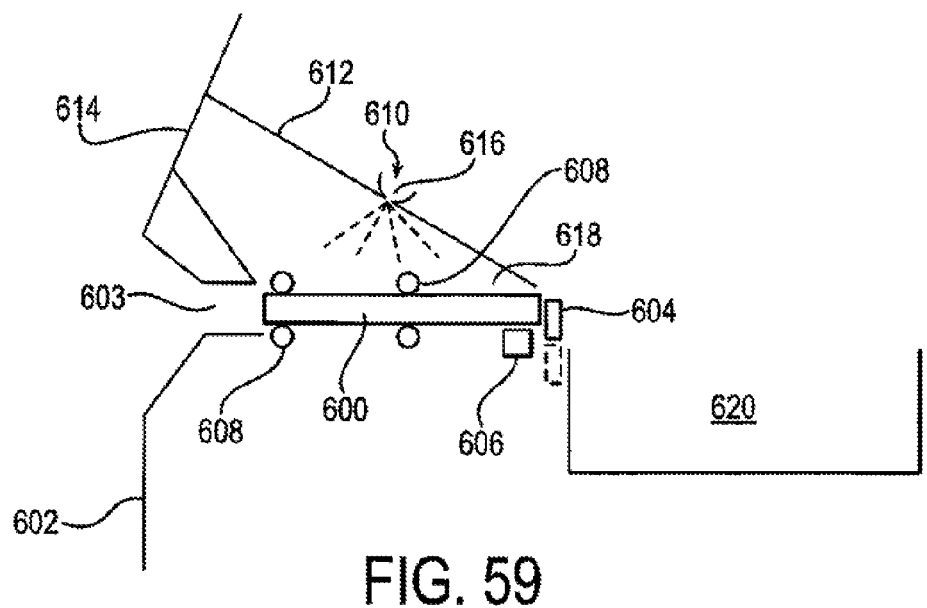
FIG. 59 shows an exemplary machine arrangement in which a user card is properly positioned to be both read by a read head assembly and viewed by a user of the machine.

FIG. 59 shows a user card 600 inserted through a reader housing section (e.g., bezel) of a user fascia 602 of an automated banking machine. The card was inserted through a card slot 603 in the bezel. The card 600 is held in a reading position against a stop member 604. The physical member 604 stops forward insertion (movement) of the card 600. As discussed in more detail later, the stop member 604 can also assist in aligning the card 600 so that it is properly positioned to be read by a movable read head assembly 606 of a card reader.

Rotatable balls 608 of a card transport mechanism can be controlled by a computer to cause the card to be moved into its proper (and aligned) reading position. The balls 608 can be rotated in various directions to also impart jitter motion to the card 600 while moving the card toward/away from the reading position. Card-moving balls can be used which operate similar to the item-moving rotatable balls discussed in U.S. application Ser. No. 13/135,663 filed Jul. 12, 2011, which has been herein incorporated by reference in its entirety.

Some people prefer the security of being able to view their card during its usage in a transaction. An exemplary security arrangement allows for at least a portion of a customer's card to be viewed by the customer while it is being read. A card viewing window is positioned above the card reader. Light can be directed toward the face of the card. A light pipe guides light from the face of the card to the window. Thus, the person will be able to see their card at all times while it is in the card reader. The light pipe can comprise a plastic piece.

FIG. 59 further shows a light source 610, a light guide assembly 612, and a card viewing window 614 in the user fascia 602. The light guide assembly 612 includes an opening (slot or slit) 616 that allows the (visible) light from the light source 610 to be emitted into the an interior of the assembly. The assembly 612 can guide (or direct) the emitted light toward the properly positioned card 600.

The arrangement allows a machine user to look through (or into) the card viewing window 614 to view at least a portion of the top of their card 600 while it is in the machine. The user window 614 can comprise a transparent or clear material (e.g., plastic). The window 614 may also have a magnifying element (attached thereto or built therein) that enlarges the view of the card for the user. The magnification feature can also be a user-selectable option. For example, the window 614 may also function like a monocular that allows a user to control focusing of the card view. A knob, push button, or lever can be implemented to adjust the focus and/or magnification of the user's view of the card.

An interior chamber of the light guide assembly can be substantially closed (e.g., sealed). That is, each of the user window 614, light entrance 616, and a card end (lower) portion 618 of the assembly can be closed to keep out dust and dirt. The assembly portions 616 and 618 can also comprise a transparent window.

The light source 610 may be generated by electricity, radiation, etc. The light source can be automatically turned on based on one or more sensors sensing a card inside of the card reader. In other embodiments the light source can include (or consist solely of) ambient (outside) light. For example, based on sensing of a card, an interior shade (or gate) can be removed/opened to allow exterior natural light through the user window 614 (or some other light entry point). A combination of light sources can also be used. For example, ambient daylight could be replaced by generated light at nighttime. The switch could be based on sensing of dusk/dawn sensors. Other triggers can also be used to provide sufficient light to allow a user to see their inserted card. For example, the light source may involve a manual trigger. The light may be on as long as the user is manually pressing (with a finger) a (light on) button. In other embodiments the light source may simply be triggered by a sensor detecting the presence of a person adjacent the machine.

The user window 614 can also comprise a dual usage display, such as an electronic ink display. For example, the window 614 can be used to both provide a customer message (prior to card insertion) and then become transparent (clear) upon card insertion.

The light guide assembly 612 can be a component that is separate from a card reader. For example, the light guide assembly can be a part of a card reader bezel or part of the user fascia. Alternatively, the light guide assembly can be an integral part of a card reader.

In another exemplary embodiment a user can indirectly view their card while it is located in the card reader. For example, a view of the card can be electronically reconstructed and displayed to the user. The user window 614 can be a display screen. One or more cameras are positioned to capture at least one image of at least a portion of a card located in the card reader. In one embodiment a camera captures the user name that appears on the face of the card. The image of the user name is then shown on the display screen (display window). Thus, a machine user can be assured that their card is properly received by the machine's card reader. In a further embodiment, the inability of a user to view their card (or their name on the card) can be taken as an indication that the card was not properly received by (or positioned in) the card reader.

The automated banking machine can be programmed to capture and store (or destroy) a card. For example, data read from a card may be used to determine that the card is stolen. In some embodiments (as discussed later) a stop member may not be needed (or used) to position an inserted card. However, in other embodiments that include use of a stop member, the forward location of the stop member may interfere with (or block) a fraudulent card that needs to be moved from the card reader to a card storage area in the machine. As indicated by broken lines in FIG. 59, the physical stop member(s) 604 is movable (e.g., retractable downward) to allow an unauthorized card to be moved past the stop on its way to a card holding bin 620. In alternative embodiments a movable stop member may be rotated or pivoted to a non-interfering location. For example, a stop member can be pivoted 90 degrees from a card stopping (upright) position (at ninety degrees) to a card passing (laying down flat) position (at zero degrees).

Figure 60:
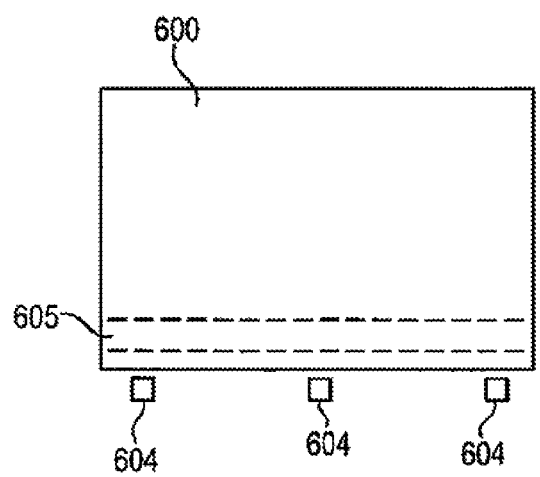
FIG. 60 shows a top view of the card and stops that are shown in FIG. 59.

FIG. 60 shows a top view of the card 600 and stops 604 that are also shown in (the side view of) FIG. 59. The card 600 is positioned long-edge first in a card reader. The card 600 includes a magnetic data stripe 605. The stop members 604 are movable to allow the card 600 to be moved onward (to the right in FIG. 60) to a card capture bin 620 (or similar card retaining structure) located in the machine. Rollers, balls, belts, etc. can be used to eject a card from the card reader and into the card capture bin.

A further exemplary security arrangement involves a card reader's housing. The arrangement can detect that the card reader housing has been breached. The housing includes an encapsulated card reader module. The inside of the module's outer walls have circuit traces running all over in different directions. A circuit mesh or net is made up of a network of conductive metal wires, fibers, threads, and/or strands through which an electric current flows. The mesh can be in the form of a fine screen, with perpendicular rows and columns. The screen mesh can be attached to the module. The screen mesh may also be embedded in walls of the module. The distance between adjacent mesh strands can be so small as to not allow a conventional drill bit to pass through the mesh without the bit breaking a strand. A break in the circuit path can be taken as an indication of a breach attempt, which can trigger an alarm. The sensor mesh arrangement can detect (or sense) if the module is being breached by cutting a hole into it (via a drill, laser, etc.), or by other methods of trying to achieve unauthorized access to the interior of the module. Thus, the sensor mesh arrangement can provide for a tamper resistant card reader housing. For further security, a detection of a breach attempt can automatically trigger a card reader processor halt and/or a flash memory erase.

A further exemplary security arrangement causes the encryption of data read by the card reader. In an automated banking machine, data lines can transfer read card data from the card reader to another device (e.g., controller) in the machine. Exemplary encryption embodiments prevent someone from tapping into these data lines and capturing read card data that is in the clear (not encrypted).

In a first embodiment, encryption of read magnetic stripe data can be carried out at the (movable) read head. This enables the card data to be encrypted at (or near) the point where it was read. For example, the encryption can occur right in the read head (or in its housing). The data encryption can be carried out by circuitry built into the read head, where the read head holds (stores) changeable encryption keys. In operation, the read magnetic stripe data (or read card data stored in another data storage format) is encrypted before it is output from the card reader. Thus, even if this card data were somehow stolen, it would be difficult to interpret (decrypt).

In another embodiment the encryption can be carried out in very close proximity to the read head. As previously discussed, the card reader housing can be securely encapsulated (e.g., via mesh strands) to prevent the internal workings of the card reader from being accessed. Thus, the read head can safely transmit its signals in the clear (non-encrypted) a short distance within its secure housing. Circuitry (located near the read head) within the card reader can carry out the encryption of the data received in the read head signals. The circuitry can cause the signals carrying the encrypted data to be amplified, followed by their transmission to a location outside of the card reader.

Because of the encapsulation features, if someone attempted to disassemble the card reader, then all the keys and other data stored in the card reader would be erased. For example, EEPROM, flash memory, or other suitable technology can be used to automatically erase data stored in volatile memory if the card reader was breached.

In an exemplary embodiment a magnetic read head is associated with a circuit board. The circuitry comprises one or more microprocessors. The read head is operative to read analog (magnetic) data. The circuitry includes an A/D converter which can convert the read analog data into digital (binary) data. This digital data can then be encrypted by a circuit board microprocessor.

Figure 48:
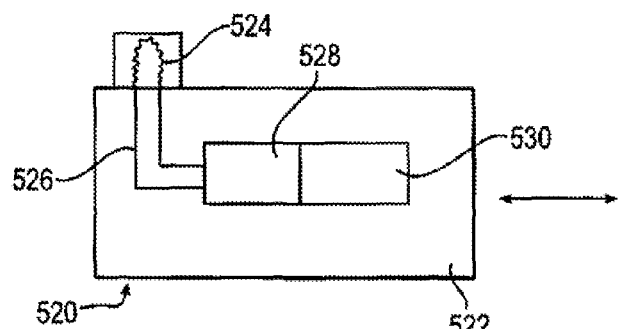
FIG. 48 shows a movable read head assembly that includes a circuit board.

FIG. 48 shows an exemplary embodiment of a movable read head assembly 520. The assembly includes a circuit board 522. Part of the read head component 524 is embedded in the circuit board 522. The assembly 520 is movable (as represented by the dual arrow) in a manner which allows the read head 524 to be moved along (parallel to) the magnetic stripe of a card inserted (long-edge first) into the card reader. Lines 526 that transfer the read analog card data to an A/D converter 528 are located inside the circuit board 522. As can be seen, the arrangement makes it difficult for someone to tap into these hidden analog data lines 526. A data encrypter (e.g., microprocessor) 530 of the circuit board 522 then encrypts the converted digital data. Different encryption keys can be stored in a memory associated with the encrypter 530.

As can be seen, the encrypting device 530 is located adjacent to (abuts) the converter 528. As a result, read card data can be quickly encrypted prior to (upstream of) being carried to other parts of the card reader. Thus, a criminal breach of the card reader housing, which exposes (for illegally tapping into) a visible downstream data line that carries the card data, will not compromise the card data because it would have already been encrypted upstream of the line tap.

Figure 49:
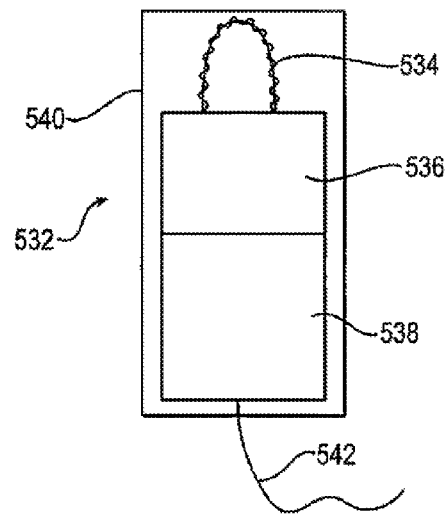
FIG. 49 shows another arrangement of a movable read head assembly.

FIG. 49 shows another exemplary embodiment of a movable read head assembly 532. The assembly comprises a secure housing 540 that encloses each of a reading component (read head) 534, an A/D converter 536, and a data encrypter (e.g., microprocessor) 538. Within the movable read head housing 540, card data can be each of read, converted, and encrypted. Thus, card data is encrypted in very close proximity to (or at) the read head 534. A flexible data line 542 extends from the housing 540 to a stationary component inside the card reader. This data line 542 is of a length which allows the housing 540 to amply travel (relative to the stationary component) back and forth along (parallel to) magnetic stripes of cards that were inserted longedge first into the card reader. Following its encryption, the encrypted card data can be securely sent (via the flexible data line) to other circuitry inside the card reader housing. The encrypted card data can also be securely sent outside of the card reader housing.

Another exemplary security arrangement allows for the encryption of data that was read from a smart card chip. In one embodiment the card reader has contacts that engage the chip. These contacts are associated with (outside) circuitry that includes an encryption key. This exterior circuitry can immediately encrypt the data at the point of reading. In another embodiment the reading contacts are attached to (inside) circuitry that is located within the encapsulated reader. This interior circuitry encrypts the data that was read by the contacts from the chip. The embodiments allow for a particular signal sequence to be delivered to the smart card in order to have it deliver its data.

Although reading of data from a substantially straight magnetic stripe has been discussed, an exemplary LEF card reader can also read data from a curved magnetic stripe of a card. The exemplary card reader does not need pre-knowledge of the curvature pattern of the stripe in order to read the data therefrom. The read head can be driven in two horizontal directions (X and Y). The read head arrangement includes a magnetic field sensor (or detector) arrangement. A processor receives signals from this sensor arrangement. By analyzing these signals the processor can quickly (in real time) determine whether the read head is moving (correctly) along or (incorrectly) away from the curved or skewed stripe. The processor directs the read head drive to move the read head in the (non-read) direction (X or Y) of the strongest magnetic sensing. That is, based on changes in the magnetic strength sensed, the processor can continually direct the read head along the stripe. Thus, a card reader processor can steer a read head to read data along the path of a curved or skewed magnetic stripe.

As previously discussed, even though a long-edge first (LEF) card reader (with a movable read head) will have a larger reading width, the LEF reader itself can still be sized to fit into substantially the same space as an existing short-edge first card reader. In an exemplary embodiment, an additional gear drive mechanism is arranged to assist a drive device (e.g., a motor) of a magnetic head assembly. The gear drive mechanism enables the read head assembly to obtain its full (reading) speed sooner. The arrangement imparts lost motion drive to the drive device (e.g. • a motor), which helps the drive device start driving the read head assembly at a faster speed.

In the exemplary operation, the drive device (e.g. • a motor) is able to build up speed before it imparts its drive to the read head assembly. This non-driving time period enables the drive device to reach a higher drive speed before it begins to move (impart its drive) the read head assembly. Because a faster initial drive speed is imparted to the read head assembly, less time and physical space are needed in order for the read head assembly to reach (ramp up to) its proper reading speed. Thus, the exemplary arrangement helps to reduce the interior spacial width that would otherwise be needed to fully ramp up the travel (reading) speed of the magnetic read head assembly.

Figure 50:
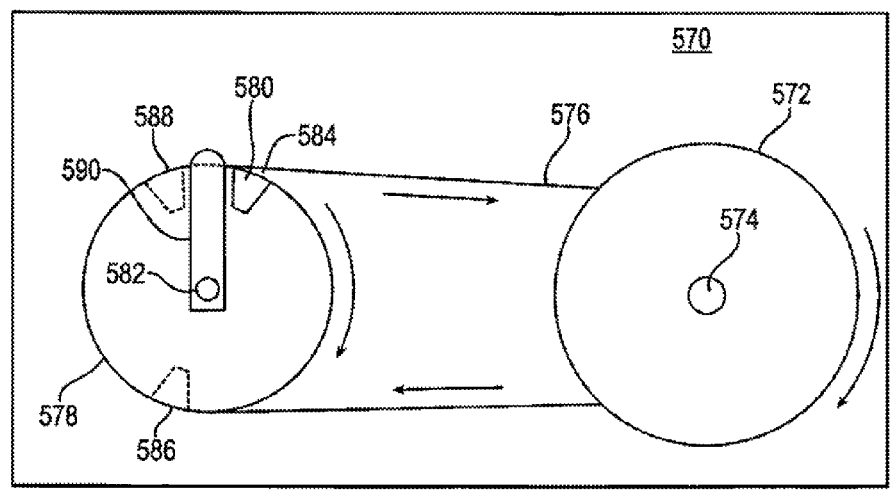
FIG. 50 shows an exemplary drive arrangement for a read head assembly.

FIG. 50 shows a card reader 570 that allows lost motion drive to be imparted to a read head assembly. A drive device (e.g., a motor) in the card reader 570 is in operative connection with a drive wheel (or gear or disc) 572. The drive wheel 572 rotates about a drive shaft axis 574. A belt (or chain or pulley) 576 connects the drive wheel 572 to an idler disk (or wheel) 578. The driven disk (disc) 578 rotates about an axis 582. An abutting push member 580 is attached (or integral) with the disc 578. Thus, the push member 580 rotates with the disc 578. The push member 580 can move into contacting engagement with a projection arm 590 which is in operative connection with a support structure of a read head assembly.

In the operation shown in FIG. 50 the motor (or other drive device) causes the belt 576 to move, as shown by the straight arrows. The belt 576 in turn causes the disc 578 to rotate in a first direction, as shown by the curved arrow. As can be seen, the push member 580 may not initially be in contact with the arm 590. However, the push member 580 and arm 590 are arranged relative to each other such that before the push member 580 rotates one full turn it will contact the arm 590. Movement of the push member 580 while in contact with the arm 590 imparts movement to the read head assembly.

FIG. 50 shows sequential rotational locations of the push member 580, including a first (initial) position 584, a second position 586, and a third position 588. At the third position 588 the push member 580 is ready to engage the arm 590.

Figure 51:
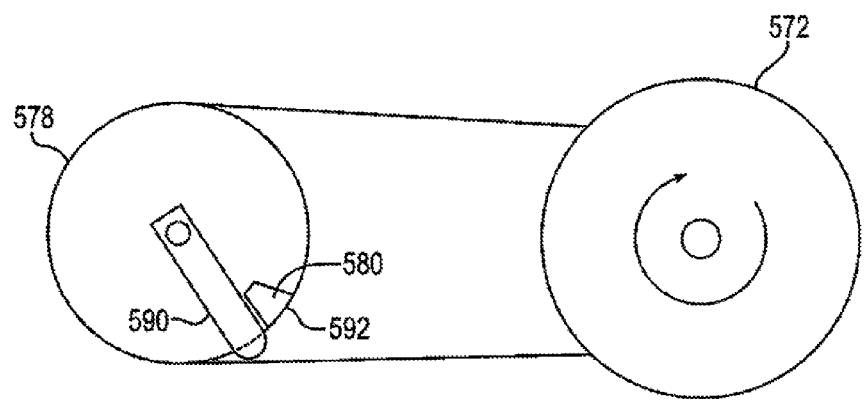
FIG. 51 shows a driven arm moved a first distance by the arrangement of FIG. 50.

FIG. 51 shows the push member 580 in a fourth position 592. During its movement from the third position 588 to the fourth position 592, the push member 580 was pushing the arm 590.

Figure 52:
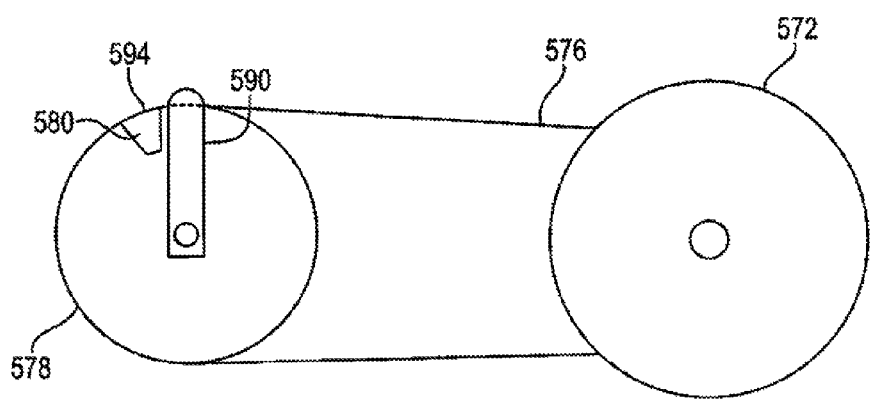
FIG. 52 shows the driven arm of FIG. 51 moved a further distance by the drive arrangement of FIG. 50.

FIG. 52 shows the push member 580 in a fifth position 594. During its movement from the fourth position to the fifth position, the push member 580 was pushing the arm 590. In this example, the fifth position 594 corresponds to the third position 588. Thus, the push member 580 moved the arm 590 one complete rotation.

In an exemplary card reader embodiment, one complete rotation of the arm 590 equates to the travel distance needed by the read head assembly to read an entire magnetic stripe. However, in other card reader embodiments the arm 590 may need to rotate a greater or lesser distance to enable the read head assembly to perform a complete reading of a magnetic stripe. A processor can be programmed to control the motor to drive the read head assembly a predetermined reading distance.

As shown in the embodiment of FIG. 50, following start of the motor the push member 580 traveled substantially an entire rotation before engaging the arm 590. This travel distance gives the motor time to build up speed before its drive is imparted (via the belt 576, disc 578, push member 580, and arm 590) to the read head assembly. In the exemplary embodiment the motor achieves the (predetermined) reading speed of the read head assembly before the disk push portion 580 engages the arm 590. This allows the read head to immediately begin reading upon its movement. The motor can be set to output a predetermined maximum drive speed that corresponds to the proper reading speed of the read head. During the reading operation, the motor can maintain a constant reading speed for the read head assembly.

As previously discussed, in an exemplary embodiment the read head can read both ways along stripes. This causes the read head to be left at alternating ends after successive readings. As can be appreciated, the end of a reading operation causes the push member 580 to be left adjacent (e.g., abutting, near) the arm 590. Thus, for the next reading operation the processor causes the push member 580 to be driven in the opposite rotational direction (relative to the prior reading operation). That is, if the push member 580 was driven in a clockwise direction, then its next rotation will be in the counter clockwise direction (and vice versa). Regardless of which direction it starts rotating, the push member 580 can travel a substantial distance before engaging the arm 590, during which distance drive speed can be built up before the read head assembly is actually driven.

It should be understood that the lost motion drive arrangement shown is exemplary, and in other embodiments a lost motion drive arrangement may include different component positions, different components, and/or different features. For example, in an alternative embodiment the engaging functions of the push member 580 and the arm 590 can be switched (or reversed). That is, the arm 590 (instead of the member 580) can be arranged to function as the driving member. The arm 590 can be driven to engage and drive the disk portion 580. The disk portion 580 can forward drive to a belt, gear, or shaft that moves the read head. That is, the read head moves based on a component (e.g., belt or gear) that moves responsive to rotation of the disk 578. The motor can be arranged in operative connection (e.g., via drive shaft 574) with the arm 590 so as to impart drive to the arm, either directly or indirectly. The rotational distance the arm 590 can travel before engaging the disk portion 580 allows it to reach the reading speed of the read head (prior to portion 580 contacting the member 580). This travel distance gives the motor time to build up speed before its drive is imparted (via drive shaft 574, the arm 590, member 580, disk 578, and belt/gear) to the read head assembly. In another alternative embodiment the motor can be part of a miniature multi-spindle machine that transmits drive via the arm 590 (and one or more other operative connecters) to a read head.

An exemplary embodiment includes a LEF card reader that can also write data to a card. To ensure proper reading and/or writing of data, the card reader can first squarely align (de-skew) an inserted card to a final card reading/writing position. In one embodiment the card reader includes an inner stop. The stop has a length that can be simultaneously contacted there along (engaged at plural contact points) by the leading edge of the card. That is, the card's inner edge is driven to contact the stop at at least two points along the length of the stop. Since the stop and the card edge are both straight, the abutting card is then straight. Abutment of the leading edge of the card against (and along) the stop ensures that the card is properly aligned (straight) for reading/writing operations. Thus, an inserted card can be properly positioned through use of the stop. Sensors can be used to verify that the card is properly abutting the stop. The stop can be an integral unit or comprise plural components spaced along its length. A card can be moved toward the stop by a drive mechanism that engages the card at at least one of a card face, the opposite card face, a card short side edge, and the opposite card short side edge. As previously discussed, a drive mechanism for a card can include rollers, belts, balls, etc., which are driven by motors, solenoids, cylinders, etc., which are controlled by a processor(s). For example, a differential drive mechanism can be used that includes two spaced drive points to contact and straighten the card. Each drive point drives a different portion of the card toward the stop. A drive point will slip against the card when it can't move the card any further. Sensed slippage of both drive points indicates to a processor that the card is fully aligned against the stop.

In another embodiment an inserted card can be properly positioned (for reading/writing) through use of the shutter (gate). The card reader causes the shutter to be closed (and locked) after card insertion. Following (forward) insertion, the card is moved (backward) into engaging contact against the closed shutter. The inside wall of the closed shutter is substantially flat and straight. Moving the card to cause its trailing (rear) long-edge side to abut against the shutter wall results in the card being properly aligned (straight) for reading/writing operations. The card can be read (and/or written to) while positioned in this (shutter-abutting) location. Alternatively, the card (while remaining aligned) may first be moved forward against a stop before data is read from and/or written to the card. Since this stop is not used for aligning the card, it can comprise a relatively short contact surface.

The exemplary embodiments allow for a card that is properly aligned in its reading and/or writing position to: have its trailing edge flush with the card entry slot (e.g., with shutter gate open); or have its trailing edge extend outward a little from the card entry slot (or the gate); or have its trailing edge engaged in contact with the inside of the closed gate; or have its leading edge engaged in contact with at least one card stopping/aligning member. A card protruding a short distance from the gate (or the entry slot) will allow a customer to constantly view their card while it is being read, but prevent the customer from moving (via pulling, grabbing, grasping, gripping) their card during its reading. As previously discussed, still other embodiments allow for a card to be properly aligned/positioned by card moving/holding members that engage the sides of the card. The side engaging members can also be used in combination with a gate and/or a stop for aligning and/or positioning the card.

For completion of a transaction, a card reader/writer may need to cause new data to be assigned and written to a card. However, the new data may be encrypted when it was received by the card reader/writer. Thus, the card reader may need to first decrypt the new data before it can be written to the card. Otherwise, the encrypted new data may be useless to the card.

The card reader/writer circuitry that was used to encrypt data read from a smart card chip can also be used to decrypt data. Thus, the circuitry can receive encrypted new data, cause encrypted new data to be decrypted, and then cause the decrypted data to be stored in the smart card chip.

Likewise, a magnetic stripe reader/writer may need to write data to the magnetic stripe of a card (e.g., track 3). Such data may be provided for security and/or convenience purposes. This process can include the card reader decrypting data before writing onto the magnetic stripe. Thus, the magnetic stripe reader/writer can have the dual capability to both (in a same transaction) encrypt data read from the magnetic stripe, and (later) decrypt received encrypted data that is to be written the magnetic stripe. The exemplary reader/writer is also operable to write encrypted data to (and read encrypted data from) a magnetic stripe.

Again, the exemplary embodiments provide for both encrypting and decrypting signals at a magnetic read head, at smart card reader contacts, or at a NFC reader interface board. Other types of wireless signals can also be encrypted/decrypted, including RFID signals. As can be appreciated, the exemplary embodiments provide for more secure readers of data (e.g., card readers).

In some card reader encrypting embodiments the encryption key that is being used by the card reader (e.g., at the read head or contacts) can stay constant through multiple transactions. However, other card reader encrypting embodiments can provide more security. For example, the encryption key associated with the card data can be changed for every transaction. Thus, even if a criminal inserted a card with known data, then somehow tapped into the encrypted data coming out of the card reader, and then further somehow figured out (from comparison of data) what encryption key was used, the criminal still could not (because of the change of keys) decrypt the new-key encrypted card data being used in the next transaction.

One or more encryption keys can be loaded or injected into the memory of a card reader. These keys would be used to encrypt read data (e.g., read from a chip or magnetic stripe). The injection can be carried out through use of a separate device, such as a laptop. For example, the card reader would be connected to the separate device, then the keys would be loaded from the separate device into the card reader memory. If a plurality of usable keys are in the memory, then the pattern (order) used for selecting different keys can be predetermined by a program or application. The program can prevent the same order of key usage from being repeated to further enhance security. Random selection of a key from the plural stored keys can also be applied.

In an exemplary embodiment an automated banking machine includes at least one secure encrypting device. The encrypting device is in operative connection or communication with a machine controller (e.g., machine controller). The machine controller may comprise one or more computers (processors). The encrypting device is operative to encrypt and decrypt data (or signals) on behalf of the machine controller. The encrypting device can include in storage (or have access to), a plurality of different keys for encrypting and decrypting data. The tamper resistant encrypting device can have a housing that includes a protective sensor mesh. The encrypting device (box) is designed such that an attempted breach thereof will cause its stored keys to be rendered useless or destroyed. Thus, the interior keys are inaccessible to criminals.

For ease of understanding, the encrypting device may be referred to herein as an encrypting PIN pad (EPP). In the exemplary embodiment the EPP can encrypt an inputted customer PIN. The EPP is operative to receive user inputs through the keypad keys, and encrypt corresponding key input signals within the keypad so that the output from the keypad is encrypted. The EPP can provide the encrypted PIN data to the machine controller. The machine controller can then cause the encrypted PIN data to be sent (in one or more messages) to the transaction host computer. Thus, from the time of its customer input the PIN data can remain encrypted during its entire transport to the host. Examples of encryption/decryption of information being sent in messages between an automated banking machine and a host system can be found in U.S. Pat. No. 7,159,114, which has been incorporated herein by reference in its entirety.

A message being sent from the automated banking machine to a transaction host (e.g., a server) may be sent in the clear (without encryption). Alternatively, the message being sent to the host may be encrypted, such as via SSL or another available encryption layer. That is, enhanced security can be provided at the network transport layer by providing (SSL) encrypted communications between the machine and the host. As a result, the PIN data may be doubly encrypted. The host can decrypt a (SSL) message received from the machine. As discussed in more detail later, the host can use the message's EPP-encrypted PIN data to determine whether the customer inputted PIN corresponds to the correct user account in authorizing the customer.

The message being sent from the automated banking machine to the host can include other data besides the PIN. This other data can include magnetic stripe data and/or chip data that was read by a card reader. For example, read card data may correspond to an account number, etc. The card reader can encrypt this read card data using an encryption key (stored in card reader memory) in a manner as previously discussed. Because this card data is encrypted, it can be securely output from the card reader. Thus, from the time of its reading, the card data can remain encrypted while inside the card reader. The exemplary arrangement prevents a criminal from obtaining by tapping into a card reader, non-encrypted (clear) card data that was read by the card reader.

Figure 53:
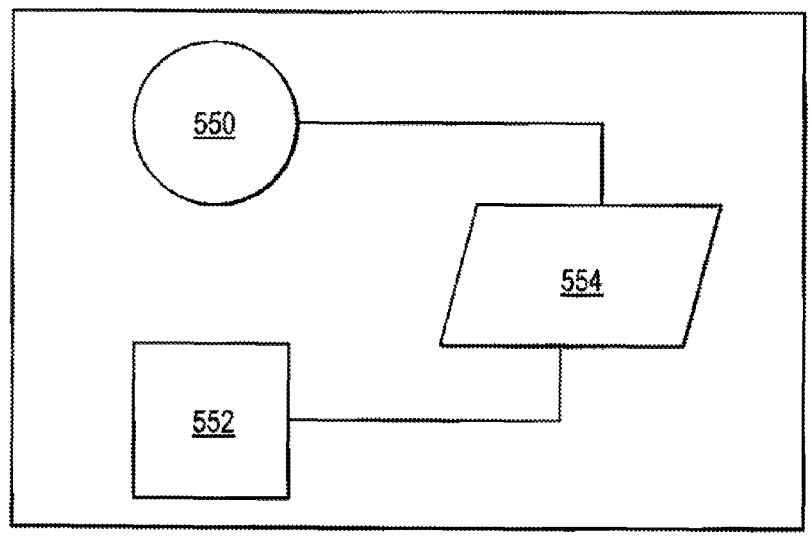
FIG. 53 shows an exemplary communication path between a card reader and an encrypting/decrypting device, such as an encrypting PIN pad (EPP).

FIG. 53 shows an automated transaction machine arrangement that allows communication between a card reader 550 and an encrypting/decrypting device (e.g., an EPP) 552, via a machine controller 554. Card data encrypted by the card reader 550 can be sent from the card reader to the machine controller 554. In turn, the controller 554 sends the encrypted card data to the EPP 552 for decryption. The EPP 552 has access to the decryption key which allows the EPP to decrypt (or decipher) the card data encrypted by the card reader 550. The EPP 552 sends the decrypted card data back to the controller 554. As previously discussed, the controller 554 can then send the card data (along with the encrypted PIN data) in one or more messages to a remote computer, such as a transaction host. The host can use the received card data (e.g., account number) to obtain PIN data that is correlated therewith in a data store. The host can then compare the PIN data received from the machine to the PIN data obtained from the data store. Correspondence between the two PIN data can be used to validate the customer as an authorized user of the machine.

In a further embodiment, following the decryption of card reader-encrypted card data by the encrypting/decrypting device (EPP), the EPP can then operate tore-encrypt the card data using a different encryption key. The EPP can re-encrypt the card data using the same (private) encryption key (stored in EPP memory) that is used to encrypt the PIN data. This re-encrypted card data can then be sent to the machine controller. The controller can then cause the encrypted PIN data and the encrypted card data to be communicated (via SSL) in at least one message to the host. As a result, the card data (like the PIN data) may have a dual layer of encryption. The message can include at least one enciphennent/decipherment certificate of the EPP. The host can decrypt the (SSL) message received from the automated transaction machine. The host (which may comprise one or more computers) can then decrypt the EPP-encrypted card data from the decrypted message.

In another alternative embodiment the EPP (or controller) sends instructional content along with the EPP-encrypted card data. The instructions are included in the message sent to the host. The instructions inform/instruct the host on how to decrypt the card data. For example, the instructions may include data that the host can then process in a predetermined, time-dependent manner in order to resolve one or more keys. The resolved keys enable recovery of the card data.

In a further alternative embodiment the controller does not pass the received card reader-encrypted card data onto the EPP. Rather, the controller sends the reader-encrypted card data directly to the host. Instructional content for processing (deciphering) the encrypted card data is also sent (along with the card reader-encrypted card data itself) in a message to the host. The card reader (or the controller) can produce/provide the instructional content that gets included in the message to the host.

It should be understood that an automated transaction machine controller can include both the encrypted PIN data and the encrypted card data in a same message to the host. Alternatively, the machine controller may individually send the encrypted PIN data and the encrypted card data in separate messages to the host. Again, the message(s) communicated from the machine to the host can be encrypted (e.g., via SSL, etc.) at the machine computer level. Furthermore, additional encryption/decryption of the message may be conventionally carried out by other network computers during the communication process. As a result, during transport to the host, both the PIN data and the card data may have multiple (e.g., dual) layers of encryption. The machine controller may be local with the machine (e.g., located within the machine housing) or remotely located from the machine. That is, the machine controller (e.g., one or more computers) may operate the machine (and cause operation of machine components, transaction devices, etc.) from a location that is remote (e.g., distant) from the actual machine location.

Several communication arrangements can be used to provide secure transfer of data between the EPP and the card reader. In one embodiment the EPP and the card reader operate to exchange (with each other) their respective public keys of a public/private key pair. A hand shaking process may be used between the EPP and the card reader to transmit/receive encrypted data. The EPP generates a random number. The EPP then encrypts the random number using its private key. The EPP then sends this encrypted random number to the card reader. As previously discussed, communication between the EPP and card reader may be via the controller. The card reader then uses the public key of the EPP to decrypt the random number. The card reader then encrypts the read card data with the card reader's private key and the random number. The card reader then sends the encrypted data to the EPP. The EPP then receives the encrypted data. The EPP first decrypts the received data using the card reader's public key. Then using the random number that was previously sent to the card reader, the EPP resolves the card data in the clear. As discussed, the card data is then included (either in the clear or encrypted) in a message sent to the host.

To make it harder to intercept read card data, the communication exchange process between the EPP and card reader could be performed for every transaction. That is, for every card reading transaction a new random number would be used in encrypting the card data.

Another exemplary approach has the card reader generating the random number, which is then sent to the EPP. Alternatively, instead of using a random number, the value that is used for a key could be a combination of current or prior transaction data. The value can also be a combination of other static data, such as serial numbers of the EPP or the card number. The value could also be based on digital certificate data stored in either the card reader or the EPP. These approaches are exemplary, and other approaches can also be used.

In another embodiment the previously described roles of the card reader and EPP can be reversed. For example, the card reader can send the read card data to the controller. The card reader can also receive the PIN data from the EPP. The card reader can forward the received PIN data to the controller, which in turn sends the data (card data and PIN data) to the host. Either one or both of the card data and PIN data can be encrypted. The card reader can also decrypt the received EPP-encrypted PIN data and then re-encrypt it before sending it to the controller. In such a reversed role the card reader could function as the main encrypting and decrypting device for the machine (controller).

Figure 54:
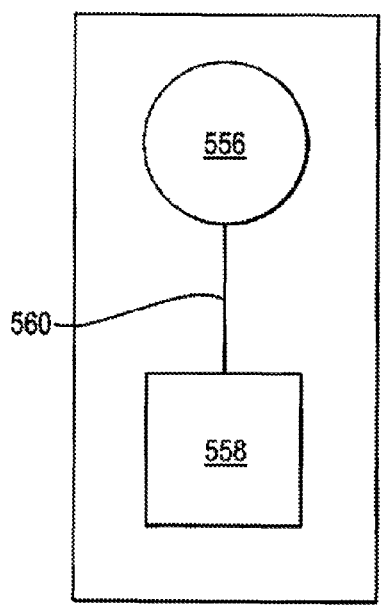
FIG. 54 shows another exemplary communication path between a card reader and EPP.

FIG. 54 shows an arrangement that allows direct communication between a card reader 556 and an EPP 558. This device-to-device direct communication can be wireless or involve a dedicated (physical) data line 560. In this embodiment the controller is bypassed. The EPP 558 (instead of the controller) can be programmed to send the message (which includes PIN data and card data) to the host. Thus, the EPP 558 can act on behalf of (perform functions of) the controller. The controller can be informed (e.g., receive a confirmation) that a message was sent.

Furthermore, in further embodiments the EPP may be programmed to control all automated banking machine communications with the host. The controller may be notified of messages sent and received. These notifications can be from at least one of the EPP and the host. As previously discussed, roles of the card reader and EPP can be reversed. With such a reversal, the card reader could likewise be the selected device that is operated to carry out all machine communications with the host.

Figure 55:
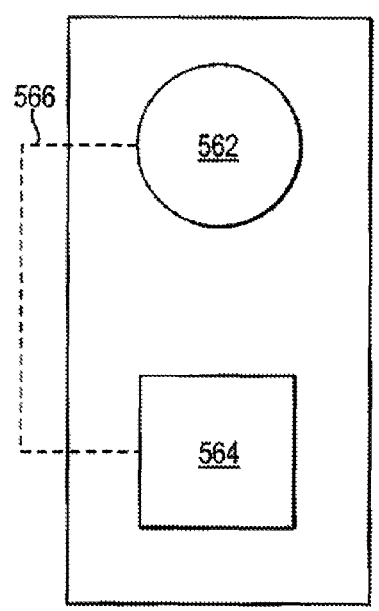
FIG. 55 shows a further exemplary communication path between a card reader and EPP.

FIG. 55 shows another exemplary communication arrangement. The arrangement allows Internet communication 566 between a card reader 562 and an EPP 564. Both the EPP and the card reader can have one or more processors. That is, both the EPP and the card reader can be viewed as separate and distinct computers. Thus, data communication between the EPP and the card reader can be carried out over a network (e.g., the Internet) that at least partly extends (through at least one remote computer located) outside of the automated banking machine. This indirect line of communication can likewise be encrypted. Communication features and arrangements can be used herein, like those discussed in U.S. application Ser. No. 13/066,272 filed Apr. 11, 2011, which is herein incorporated by reference in its entirety.

Although exemplary communication arrangements have been discussed which can provide secure (encrypted) transfer of data between a card reader and an EPP with regard to an automated banking machine, the novel features, processes, and relationships are not limited to only secure card reader/EPP communication. Other embodiments allow for other automated banking machine transaction function devices to also securely communicate with the EPP (or another device used for encrypting data sent to the host).

For example, an automated banking machine can also include secure communication between a check acceptor and an EPP. The secure check acceptor/EPP communication can be conducted in a manner similar to any of the different forms (arrangements) of card reader/EPP secure communication previously discussed. The encrypting check acceptor can be configured to receive and scan financial checks. Thus, the check acceptor can obtain check data (private/personal data, account data, amount data, etc.) from a check, encrypt this check data, then send the encrypted check data to the EPP. Likewise, the automated banking machine can have secure (encrypted) communication of deposit data between a cash acceptor and the EPP. Furthermore, the machine can have encrypted communication of cash withdrawal data between a cash dispenser and the EPP. Likewise with touch screen display/EPP communication. As can be seen, an exemplary automated banking machine provides for secure (encrypted) transfer of data between any two of its transaction function devices that require communication therebetween.

Figure 56:
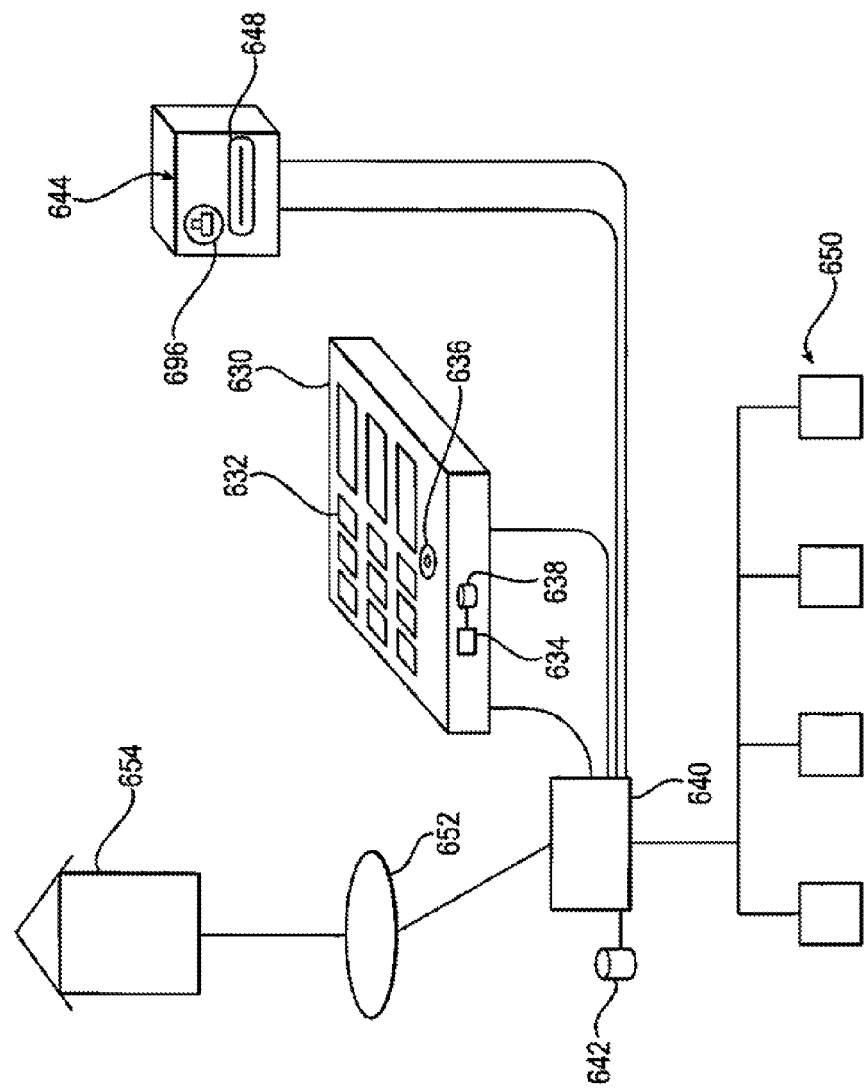
FIG. 56 is an automated banking machine arrangement that includes an encrypting card reader in operative connection with an encrypting keypad.

FIG. 56 shows an encrypting PIN pad (EPP) 630. The keypad 630 includes keys 632 through which an machine user can manually provide inputs. The keypad 630 includes at least one internal processor 634. The EPP processor 634 is in operative connection with at least one data store 638. In an exemplary embodiment the data store includes digital certificates, at least one public key, and at least one private key. The data store 638 can also include other programmed instructions that facilitate maintaining the security of the keypad as well as the machine. The EPP 630 can include a visual indicator 636 that communicates to a machine user that inputs to the keypad are secure. Exemplary embodiments of the EPP 630 may include features as described in U.S. patent application Ser. No. 10/126,808 filed Apr. 19, 2002, the disclosure of which is incorporated herein by reference in its entirety.

The EPP 630 can be in operative connection with at least one processor 640 (e.g., machine controller), which may be an internal processor. The machine processor 640 is in operative connection with at least one data store 642. The processor 640 can also be in operative connection with a plurality of transaction function devices 650. The transaction function devices may include devices that operate in the machine responsive to the processor 640. These devices may include for example a display, card reader, cash dispenser, depository, check acceptor, and other devices operative in the machine to carry out transactions.

The processor 640 executes programmed instructions stored in the at least one data store 642. The instructions are operative to cause the machine to carry out transactions. The processor 640 is operative to communicate through at least one appropriate interface in a network 652. The network 652 enables the machine to communicate with at least one remote computer 654. The remote computer 654 can include for example, a financial transaction computer (e.g., a transaction host computer) which transfers funds and keeps track of accounts held by users of the machine. In various embodiments the machine may communicate through numerous different networks and with numerous different remote computers. The configuration shown in FIG. 56 is merely schematic.

Principles like that applied in connection with the exemplary user keypad 630 may also be applied through other machine transaction devices that are operative to receive sensitive user inputs, such as the card reader 644. The card reader includes at least one internal processor. The card reader processor is in operative connection with at least one data store.

In an exemplary embodiment the machine senses that a user has presented a card to an opening 648 (e.g., card entry slot) associated with a card reader. In response to this sensing, the computer instructions of the processor 640 cause the card reader 644 to be in a ready read state, in which data can be read from the card by the card reader 644. The card reader processor can cause the card reader to provide encrypted outputs which correspond to the data (e.g., account number) read from the card. That is, the card reader operates in accordance with its programming (and/or instructions from the at least one machine processor 640) to encrypt the read card data. The card reader 644 can also include a visual indicator 646 which indicates to a machine user that read card data will be encrypted.

The card reader 644 can then operate in accordance with its programming (and/or instructions from the at least one machine processor 640) to cause the encrypted card data to be sent to the EPP 630. In an exemplary embodiment the encrypted card data travels from the card reader 644 to the machine processor 640 and then to the EPP 630. As previously discussed, the EPP 630 can decipher the received encrypted card data, then encrypt the card data, and then send the newly encrypted card data back to the machine processor 640. The machine processor 640 can then cause the EPP-encrypted card data to be sent to a remote transaction host computer.

Thus, the new and improved features and relationships achieve at least one of the above stated objectives, eliminate difficulties encountered in the use of prior devices and systems, solve problems, and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means known to those skilled in the art capable of performing the recited function, and shall not be limited to the structures shown herein or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries and principles of the invention, the manner in which it is constructed and operated, and the advantages and useful results attained; the new and useful structures, devices, elements, arrangements, parts, combinations, systems, equipment, operations, methods, processes, and relationships are set forth in the appended claims.

We claim:

1. A tangible, non-transitory computer readable medium with instructions encoded thereon for execution by a processor and when executed operable to:
   obtain data representative of a card position from a sensor located adjacent to a card entry slot;
   wherein the card entry slot is a size that allows at least part of a card to enter a card reader module coupled with the card entry slot;
   wherein the card reader module includes a gate located adjacent the card entry slot;
   wherein the gate is movable to an open position and a closed position;
   wherein when the gate is in the closed position, the gate closes an opening;
   wherein when the gate is in the closed position, a card is unable to enter through the opening;
   wherein when the gate is in the open position, a card is able to enter through the opening;
   wherein the card reader module includes a drive in operative connection with the gate;
   wherein the drive is operable to cause the gate to move between the open position and the closed position;
   wherein based on signals received from the sensor, the instructions are operable to cause the processor to determine from a card that is adjacent to the gate while the gate is in the closed position whether a leading edge of the card is a long edge of the card, whether a magnetic stripe on the card is positioned adjacent the leading edge, and whether the magnetic stripe is positioned on a correct side of the card; and wherein the instructions are operable, responsive at least in part to a positive determination that the leading edge of the card is the long edge of the card, the magnetic stripe is positioned adjacent the leading edge, and the magnetic stripe is positioned on a correct side of the card, to cause the drive to cause the gate to move from the closed position to the open position.

2. The computer readable medium according to claim 1, wherein the card entry slot leads inward toward the opening, wherein the card entry slot allows a leading long edge of a card to be therein while the gate is in the closed position.

3. The computer readable medium according to claim 1, wherein the sensor includes leading edge sensors spaced from each other in a manner that allows the processor to determine whether a card is oriented long-edge first.

4. The computer readable medium according to claim 3, wherein the leading edge sensors are spaced from each other a distance greater than a short edge of a card.

5. The computer readable medium according to claim 3, wherein the card entry slot includes a width sized to receive a long edge of a card, wherein the leading edge sensors are part of a sensor array that spans the width.

6. The computer readable medium according to claim 1, wherein the sensor includes a magnetic sensor, wherein the magnetic sensor is operable to detect the presence of a magnetic stripe.

7. The computer readable medium according to claim 6, wherein the magnetic sensor is operable to detect the presence of a magnetic stripe within a limited distance, wherein the limited distance includes a portion of a card positioned adjacent to the gate, wherein the portion includes a card area located outward from the leading edge of the card.

8. The computer readable medium according to claim 7, wherein the magnetic sensor allows the processor to determine whether a magnetic stripe is positioned adjacent the leading edge of the card.

9. The computer readable medium according to claim 7, wherein the magnetic sensor allows the processor to determine whether a magnetic stripe is positioned on a correct side of the card.

10. The computer readable medium according to claim 1, wherein the card entry slot comprises a width greater than a long edge of a card, wherein the width allows a long edge to be inserted into the slot at different positions along the width, wherein the sensor includes a sensor array that spans a distance greater than the long edge of a card, wherein the sensor array allows the processor to calculate the length of a leading edge of a card, and wherein the processor is operable to determine from the calculated length whether the leading edge corresponds in length to a long edge of a card.

11. The computer readable medium according to claim 1, wherein the opening is a part of the card entry slot.

12. A tangible, non-transitory computer readable medium with instructions encoded thereon for execution by a processor and when executed operable to:

receiving signals from a sensor indicating that a card is positioned adjacent to the gate which has a leading edge and magnetic properties;

wherein in a closed position, the gate prevents card entry into the card reader module;

wherein in an open position, the gate allows card entry into the card reader module;

cause opening of a card access gate that controls card entry into a card reader module responsive at least in part to the signals from the sensor indicating that the card is positioned adjacent to the gate, the leading edge corresponds to a long edge of the card, and wherein the magnetic properties are both adjacent to the leading edge, and on an expected side of the card.

13. The computer readable medium according to claim 12, wherein the sensor comprises a magnetic sensor, wherein the magnetic sensor is operable to detect the presence of a magnetic stripe;

wherein the sensor further comprises a proximity sensor, wherein the proximity sensor is operable to detect the presence of a long edge of a card that is positioned adjacent to the gate.

14. The computer readable medium according to claim 13, wherein the magnetic sensor is operable to detect the presence of a magnetic stripe on one side of a card that is positioned adjacent to the gate.

15. The computer readable medium according to claim 13, wherein the magnetic sensor is operable to detect the presence of a magnetic stripe within a limited range; and wherein the limited range excludes the trailing edge of a card that is positioned adjacent to the gate.

16. The computer readable medium according to claim 12 wherein the card reader module is part of an automated banking machine;

wherein the machine is usable to carry out financial transactions;

wherein the machine includes a cash dispenser;

wherein the cash dispenser is operable to selectively dispense cash stored in the automated banking machine to authorized machine users;

wherein the automated banking machine includes a user interface that comprises a card insertion slot, wherein the card insertion slot is sized to receive a card;

wherein the automated banking machine is operable to carry out a transaction on a financial account for a machine user, based at least in part on user data read by the data reader corresponding to the financial account, and the machine user being recognized as an authorized user of the machine.

17. The computer readable medium according to claim 16, wherein the automated banking machine includes a biometric reader, and a machine controller;

wherein the machine controller is operable during a user transaction session to cause read user data read by the data reader to be compared with card information stored in a information data store, and cause read biometric data read by the biometric reader to be compared with biometric information stored in the information data store;

wherein a computer associated with the automated banking machine is operable to authorize the user to request a cash dispense transaction responsive at least in part to both computer-determined correspondence between the read user data and stored card information, and computer-determined correspondence between the read biometric data and stored biometric information.

18. A tangible, non-transitory computer readable medium with instructions encoded thereon for execution by a processor and when executed operable to:

receive signals from a card sensor that includes a magnetic property sensor positioned adjacent to a card input opening that is blockable by an access gate which is movable to an opening unblocking position;

determine that a correctly oriented magnetic stripe card is present, based at least in part on signals received from the card sensor indicating that the magnetic stripe: is facing in a correct direction, and is located nearest to a long card edge of the card which is the leading card edge of the card relative to the card input opening; and move the access gate to an opening, unblocking position responsive at least in part to determining that a correctly oriented magnetic stripe card is present.

19. The computer readable medium according to claim 18 wherein the processor is operable to determine based at least in part on the signals received from the card sensor, whether a card has a magnetic stripe that is facing in a downward direction.

\* \* \* \* \*